US008745677B2

(12) United States Patent
Stanwood et al.

(10) Patent No.: US 8,745,677 B2
(45) Date of Patent: Jun. 3, 2014

(54) SYSTEMS AND METHODS FOR PRIORITIZATION OF DATA FOR INTELLIGENT DISCARD IN A COMMUNICATION NETWORK

(75) Inventors: Kenneth Stanwood, Vista, CA (US); David Gell, San Diego, CA (US); Yiliang Bao, San Diego, CA (US)

(73) Assignee: Cygnus Broadband, Inc., San Diego, CA (US)

(*) Notice: Subject to any disclaimer, the term of this patent is extended or adjusted under 35 U.S.C. 154(b) by 140 days.

(21) Appl. No.: 13/243,507

(22) Filed: Sep. 23, 2011

(65) Prior Publication Data

US 2012/0013748 A1 Jan. 19, 2012

Related U.S. Application Data

(63) Continuation-in-part of application No. 13/182,703, filed on Jul. 14, 2011, which is a continuation-in-part of application No. 13/155,102, filed on Jun. 7, 2011, and a continuation-in-part of application No. 12/813,856, filed on Jun. 11, 2010, now Pat. No. 8,068,440.

(60) Provisional application No. 61/421,510, filed on Dec. 9, 2010, provisional application No. 61/186,707, filed on Jun. 12, 2009, provisional application No. 61/187,113, filed on Jun. 15, 2009, provisional application No. 61/187,118, filed on Jun. 15, 2009.

(51) Int. Cl.
*H04L 12/26* (2006.01)
*H04N 7/26* (2006.01)
*H04N 7/12* (2006.01)
*G06K 9/00* (2006.01)

(52) U.S. Cl.
USPC .............. 725/95; 725/62; 382/100; 370/230; 375/240.25

(58) Field of Classification Search
None
See application file for complete search history.

(56) References Cited

U.S. PATENT DOCUMENTS 6,219,339 B1 4/2001 Doshi
6,222,841 B1 4/2001 Taniguchi
(Continued)

FOREIGN PATENT DOCUMENTS

WO 2006068445 A1 6/2006

OTHER PUBLICATIONS

R. Fielding et al., "Hypertext Transfer Protocol—HTTP/1.1", Network Working Group, Standards Track, Jun. 1999, 157 pages.

(Continued)

*Primary Examiner* — Joshua Taylor
*Assistant Examiner* — Adil Ocak
(74) *Attorney, Agent, or Firm* — Procopio, Cory, Hargreaves & Savitch LLP

(57) ABSTRACT

Capacity and spectrum constrained, multiple-access communication systems optimize performance by selectively discarding packets. Changes in the communication systems may be driven using control responses. Control responses include intelligent discard of network packets under capacity constrained conditions. Packets are prioritized and discard decisions are made based on the prioritization. Various embodiments provide an interactive response by selectively discarding packets to enhance perceived and actual system throughput, provide a reactive response by selectively discarding data packets based on their relative impact to service quality to mitigate oversubscription, provide a proactive response by discarding packets based on predicted oversubscription, or provide a combination thereof. Packets may be prioritized for discard using correlations between discards and bandwidth reduction and quality degradation. The quality degradation for video packets may be measured objectively.

27 Claims, 33 Drawing Sheets

(56) References Cited

U.S. PATENT DOCUMENTS

| | | |
|---|---|---|
| 2003/0195977 A1 | 10/2003 | Liu et al. |
| 2004/0073692 A1 | 4/2004 | Gentle et al. |
| 2004/0203832 A1 | 10/2004 | An |
| 2005/0021806 A1 | 1/2005 | Richardson et al. |
| 2005/0180351 A1 | 8/2005 | Peric |
| 2006/0165172 A1 | 7/2006 | Koh et al. |
| 2006/0171480 A1 | 8/2006 | Erving et al. |
| 2007/0223575 A1* | 9/2007 | Wang et al. ............ 375/240.1 |
| 2007/0263897 A1* | 11/2007 | Ong et al. .............. 382/100 |
| 2007/0286075 A1* | 12/2007 | Shoham et al. .......... 370/230 |
| 2008/0126803 A1 | 5/2008 | Ginter et al. |
| 2008/0267140 A1 | 10/2008 | Lee et al. |
| 2008/0291935 A1 | 11/2008 | Campion et al. |
| 2009/0010350 A1 | 1/2009 | Lee et al. |
| 2009/0034626 A1* | 2/2009 | Park et al. ............ 375/240.25 |
| 2009/0041130 A1* | 2/2009 | Yoon et al. ............ 375/240.26 |
| 2009/0147853 A1* | 6/2009 | Dane et al. ............ 375/240.16 |
| 2009/0185618 A1 | 7/2009 | Liu et al. |
| 2009/0193484 A1 | 7/2009 | Zhang et al. |
| 2010/0216467 A1 | 8/2010 | Ryan et al. |

OTHER PUBLICATIONS

M. Baugher et al., "The Secure Real-time Transport Protocol (SRTP)", Network Working Group, RFC 3711, Standards Track, Mar. 2004, 57 pages.
John A. Bocharov et al., "Portable encoding of audio-video objects, The Protected Interoperable File Format (PIFF)", Microsoft Corporation, First Edition Sep. 8, 2009, Revised Mar. 9, 2010, 32 pages.
"Adobe Flash Video File Format Specification", Version 10.1, Aug. 2010, 89 pages.
"HTTP Dynamic Streaming on the Adobe Flash Platform", Adobe, Sep. 2010, 18 pages.
"Advanced Systems Format (ASF) Specification", Microsoft, Revision 01.20.05, Jun. 2010, 110 pages.
"Protocol Analysis of PPlive and PPstream by Internet Measurement", Yunfei Zhang, China Mobile, Mar. 23, 2009, 13 pages.
http://wiki.theory.org/BitTorrentSpecification, last modified Jun. 7, 2011, 25 pages.
R. Pantos et al., "HTTP Live Streaming draft-pantos-http-live-streaming-05", Apple Inc., IETF draft, Nov. 19, 2010, 23 sheets.
"[MS-SMTH]: IIS Smooth Streaming Transport Protocol", Microsoft Corporation, Sep. 8, 2009, 55 pages.
"Flash Media Manifest File Format Specification", OSMF.org, Jun. 28, 2010, version 1.01, http://osmf.org/dev/osmf/specpdfs/FlashMediaManifestFileFormatSpecification.pdf, 5 pages.
"PSS: Progressive Download and Dynamic Adaptive Streaming over HTTP (3GP-DASH)", 3GPP Release 10, TS 26.247 V10.1.0, Nov. 2010, 92 pages.
"Dynamic adaptive streaming over HTTP (DASH)", MPEG System Technologies, Part 6, ISO/IEC (FCD) 23001-6, Jan. 28, 2011, 86 pages.
"Information technology—Coding of audio visual objects—Part 12: ISO base media file format, Amendment 3: Dash support and RTP reception hint track processing", ISO/IEC 14496-12, Jan. 28, 2011, 43 pages.
Thomas Stockhammer, "Dynamic Adaptive Streaming over HTTP—Design Principles and Standards", Qualcomm Incorporated, accessed on Aug. 11, 2011, 3 pages.
ITU-R Rec. BT.500-12, "Methodology for the subjective assessment of the quality of television pictures", BT Series, Broadcasting service (television), Sep. 2009, 46 pages.
Series P: Telephone Transmission Quality, Telephone Installations, Local Line Networks, Audiovisual quality in multimedia services, "Subjective video quality assessment methods for multimedia applications", ITU-T Rec. P.910, Apr. 2008, 42 pages.
ANSI T1.801.03-2003, "American National Standard for Telecommunications—Digital Transport of One-Way Video Signals—Parameters for Objective Performance Assessment."
Series J: Cable Networks and Transmission of Television, Sound Programme and Other Multimedia Signals, "Objective perceptual video quality measurement techniques for digital cable television in the presence of a full reference", ITU-T Rec. J.144, Mar. 2004, 156 pages.
"ITS Video Quality Research" Video Quality Metric (VQM) website, http://www.its.bldrdoc.gov/n3/video/standards/index.php, accessed Aug. 3, 2011, 3 pages.
Series J: Cable Networks and Transmission of Television, Sound Programme and Other Multimedia Signals, Measurement of the quality of service, "Perceptual audiovisual quality measurement techniques for multimedia services over digital cable television networks in the presence of a reduced bandwidth reference", ITU-T Rec. J.246, Aug. 2008, 42 pages.
Series J: Cable Networks and Transmission of Television, Sound Programme and Other Multimedia Signals, Measurement of the quality of service, "Objective perceptual multimedia video quality measurement in the presence of a full reference", ITU-T Rec. J.247, Aug. 2008, 108 pages.
Mylène C. Q. Farias, "Video Quality Metrics", Department of Computer Science, University of Brasilia (UnB), Brazil, Feb. 2010, 30 pages.
Z. Wang et al., "Image quality assessment: From error visibility to structural similarity", IEEE Transactions on Image Processing, vol. 13, No. 4, Apr. 2004, 14 pages.
"Cisco ASR 5000 Multimedia Core Platform", Cisco datasheet, Cisco Systems, Inc., 2010, 4 pages.
V. Vukadinovic, "Mobility and opportunistic resource allocation in wireless multimedia networks", Doctoral Thesis, Stockholm, Sweden, 2010, 46 pages.
F. Qian et al., "Characterizing Radio Resource Allocation for 3G Networks", Nov. 2010, 14 pages.
S. Kumar et al., "Error Resiliency Schemes in H.264/AVC Standard", Elsevier Inc., Aug. 24, 2005, 26 pages.
Nanying Yin et al., "Congestion Control for Packet Voice by Selective Packet Discarding," IEEE Trans. on Communications, May 1990, vol. 38, No. 5, Abstract, 1 page.
Kotikalapudi Sriram et al., "Voice Packetization and Compression in Broadband ATM Networks," IEEE Journal on Selected Areas in Communications, vol. 9, No. 3, Apr. 1991, Abstract, 1 page.
David W. Petr et al., "Priority Discarding of Speech in Integrated Packet Networks," IEEE Journal on Selected Areas in Communications, vol. 7, No. 5, Jun. 1989, Abstract, 1.
International Search Report and Written Opinion issued Feb. 1, 2011 in PCT/US2010/038357, 13 pages.
International Search Report and Written Opinion issued in corresponding PCT/US2011/053495 on Feb. 9, 2012, 8 pages.
International Search Report and Written Opinion issued in corresponding PCT/US2011/053493 on Apr. 9, 2012, 9 pages.
Maani et al. "Optimized Bit Extraction Using Distortion Estimation in the Scalable Extension of H. 264/AVC." Tenth IEEE International Symposium on Multimedia. Dec. 15, 2008, Piscataway, NJ, US. pp. 660-666.
Wang et al. "Comments to JMVM 1.0." Joint Video Team (JVT) of ISO/IEC MPEG & ITU-T VCEG (ISO/IEC JTC1/SC29/WG11 and ITU-T SG16 Q.6). vol. JVT-U103. 21st Meeting: Hangzhou, China. Oct. 20-27, 2006., pp. 1-6. Retrieved from http://ftp3.itu.ch/av-arch/jvt-site/2006_10_Hangzhou/JVT-U103.zip.
Partial European Search Report dated Jan. 24, 2013 in related EP 12185332.9, 7 pages.

* cited by examiner

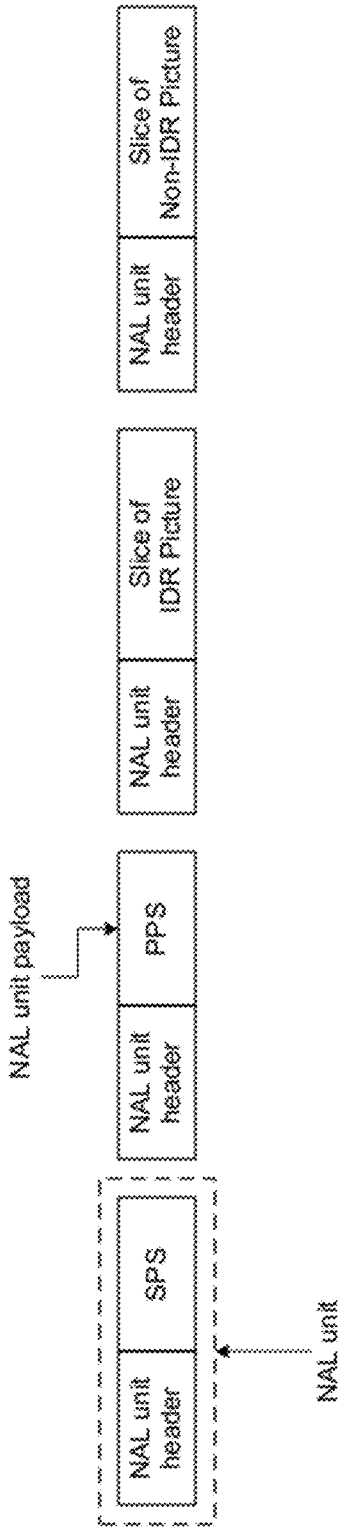
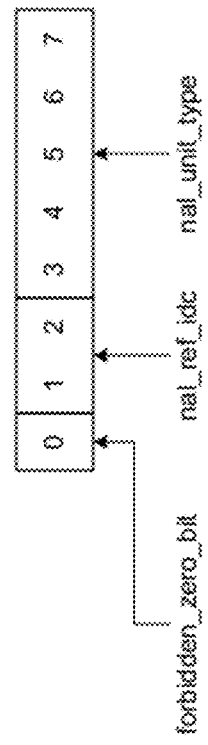
FIG. 7C
FIG. 7D

| Frame, j | X(j) |
|---|---|
| 1 | 3 |
| 2 | 1 |
| 3 | 1 |
| 4 | 1 |
| 5 | 1 |
| 6 | 1 |
| 7 | 1 |
| 8 | 1 |
| 9 | 1 |
| 10 | 1 |
| 11 | 1 |
| 12 | 1 |

| Frame, j | X(j) |
|---|---|
| 1 | 10 |
| 2 | 1 |
| 3 | 1 |
| 4 | 2 |
| 5 | 4 |
| 6 | 4 |
| 7 | 3 |
| 8 | 1 |
| 9 | 1 |
| 10 | 2 |
| 11 | 1 |
| 12 | 1 |

FIG. 17

Direct Frame Burden Table D — Dependent Frame (i)

| Frame (i) | 1 | 2 | 3 | 4 | 5 | 6 | 7 | 8 | 9 | 10 | 11 | 12 |
|---|---|---|---|---|---|---|---|---|---|---|---|---|
| 1 |   | 1 | 1 | 1 |   |   | 1 |   |   |   |   |   |
| 2 |   |   |   |   |   |   |   |   |   |   |   |   |
| 3 |   |   |   |   |   |   |   |   |   |   |   |   |
| 4 |   | 1 | 1 |   | 1 | 1 |   |   |   |   |   |   |
| 5 |   |   |   |   |   |   |   |   |   |   |   |   |
| 6 |   |   |   |   |   |   |   |   |   |   |   |   |
| 7 |   |   |   | 1 | 1 | 1 |   | 1 | 1 | 1 |   |   |
| 8 |   |   |   |   |   |   |   |   |   |   |   |   |
| 9 |   |   |   |   |   |   |   |   |   |   |   |   |
| 10 |   |   |   |   |   |   |   | 1 | 1 |   | 1 | 1 |
| 11 |   |   |   |   |   |   |   |   |   |   |   |   |
| 12 |   |   |   |   |   |   |   |   |   |   |   |   |

Weighted, Direct Frame Priority

| Frame | Priority |
|---|---|
| 1 | 15 |
| 2 | 1 |
| 3 | 1 |
| 4 | 5 |
| 5 | 1 |
| 6 | 1 |
| 7 | 7 |
| 8 | 1 |
| 9 | 1 |
| 10 | 5 |
| 11 | 1 |
| 12 | 1 |

SYSTEMS AND METHODS FOR PRIORITIZATION OF DATA FOR INTELLIGENT DISCARD IN A COMMUNICATION NETWORK

This application is a continuation in part of U.S. patent application Ser. No. 13/182,703 entitled SYSTEMS AND METHODS FOR PRIORITIZATION OF DATA FOR INTELLIGENT DISCARD IN A COMMUNICATION NETWORK filed Jul. 14, 2011, which claims the benefit of U.S. provisional patent application Ser. No. 61/421,510 entitled "SYSTEMS AND METHODS FOR INTELLIGENT DISCARD IN A COMMUNICATION NETWORK," filed on Dec. 9, 2010, is a continuation in part of U.S. patent application Ser. No. 13/155,102 entitled SYSTEMS AND METHODS FOR PRIORITIZATION OF DATA FOR INTELLIGENT DISCARD IN A COMMUNICATION NETWORK filed Jun. 7, 2011, and is a continuation in part of U.S. patent application Ser. No. 12/813,856 entitled "SYSTEMS AND METHODS FOR INTELLIGENT DISCARD IN A COMMUNICATION NETWORK," filed on Jun. 11, 2010 which claims the benefit of U.S. provisional patent application Ser. No. 61/186,707 entitled "SYSTEM AND METHOD FOR INTERACTIVE INTELLIGENT DISCARD IN A COMMUNICATION NETWORK," filed on Jun. 12, 2009, U.S. provisional patent application Ser. No. 61/187,113 entitled "SYSTEM AND METHOD FOR REACTIVE INTELLIGENT DISCARD IN A COMMUNICATION NETWORK," filed on Jun. 15, 2009, and U.S. provisional patent application Ser. No. 61/187,118 entitled "SYSTEM AND METHOD FOR PROACTIVE INTELLIGENT DISCARD IN A COMMUNICATION NETWORK," filed on Jun. 15, 2009, all of which are hereby incorporated by reference.

FIELD OF THE INVENTION

The present invention generally relates to the field of communication systems and to systems and methods for optimizing system performance by selectively discarding packets in capacity and spectrum constrained, multiple-access communication systems.

BACKGROUND

In capacity and spectrum constrained, multiple-access communication system, two goals are omnipresent: the successful transfer of information, and the minimization of such transmissions from disrupting other transfers. Often these goals are in conflict with each other, and thus represent opportunity for system optimization.

In a cellular network, for example, the creation of a positive user experience is the success criteria for the transport of information. Often this metric is further defined as the quality of service of a particular user task or application. In contrast, this activity can be viewed by its effect on other network users, specifically through the usage of limited system resources and through the creation of channel interference.

SUMMARY

Systems and methods for optimizing system performance of capacity and spectrum constrained, multiple-access communication systems by selectively discarding packets are provided. The systems and methods provided herein can drive changes in the communication system using control responses. One such control response includes the optimal discard (also referred to herein as "intelligent discard") of network packets under capacity constrained conditions.

In one aspect, the invention provides a communication device for managing packet discards in a communication network. The communication device includes: a video quality measurement module configured to receive packets containing frames of a video stream and to determine contributions of the frames to quality measurements of the video stream; a priority assignment module configured to receive the contributions of the frames to the quality measurement of the video stream and assign priorities to the packets utilizing the contributions of the frames to the quality measurements; and a selection module configured to select at least one of the packets for discard utilizing the assigned priorities and to supply the packets not selected for discard for transmission in the communication network.

In a further aspect, the video quality measurement module is further configured to calculate an objective video quality measurement for use in determining the contributions of the frames to the quality measurement of the video stream.

In another aspect, the invention provides a method for operating a communication device for managing packet discards before transmission in a communication network. The method includes: receiving packets for transmission, at least some of the packets associated with video streams; determining a priority for each of the packets, wherein the priority of the packets associated with the video streams includes impacts of discarding the packets associated with the video streams on video quality of the video streams; determining whether reduced bandwidth should be used to transmit the packets; selecting, utilizing the determined priorities, at least one of the packets for discard when it is determined that reduced bandwidth should be used to transmit the packets; and transmitting the packets not selected for discard to the communication network.

In a further aspect, determining the priority for each of the packets includes calculating a contribution to an objective video quality measurement for each of the packets associated with the video streams.

In another aspect, the invention provides a method for operating a communication device for managing packet discards before transmission in a communication network. The method includes: receiving packets for transmission; assigning a priority for each of the packets, wherein the priorities of the packets include impacts of discarding the packets on quality of services associated with the packets; placing the packets in queues before transmitting the packets; determining whether reduced bandwidth should be used to transmit the packets; selecting, utilizing the determined priorities, at least one of the packets for discard when it is determined that reduced bandwidth should be used to transmit the packets; transmitting the packets not selected for discard from the queues to the communication network.

In a further aspect, determining whether reduced bandwidth should be used to transmit the packets is based at least in part on a depth of packets in the queues.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 7C is a diagram showing the structure of an example H.264 bitstream;

FIG. 7D is a diagram of an H.264 NAL unit header;

FIG. 17 is a diagram of a weighting factor vector according to an embodiment;

FIG. 18 is a diagram of a frame burden table and frame priority vector according to an embodiment;

FIG. 20 is a diagram of a frame burden table and frame priority vector according to an embodiment;

FIG. 21 is a diagram of a weighting factor table according to an embodiment;

DETAILED DESCRIPTION

Figure 1:
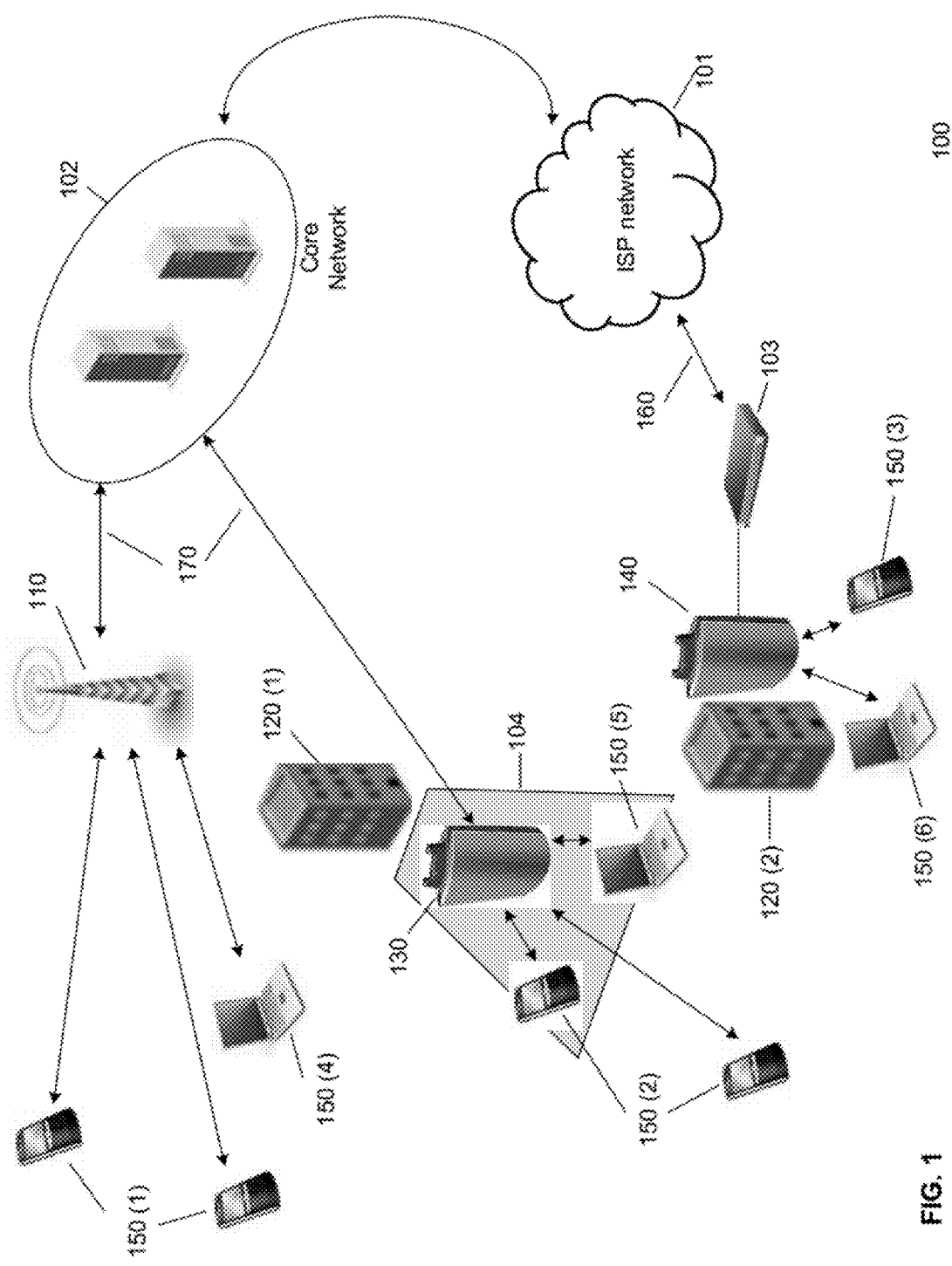
FIG. 1 is a block diagram of a wireless communication network in which the systems and methods disclosed herein can be implemented according to an embodiment.

Some embodiments provide systems and methods for a multivariate control system that can be implemented in a base station or other device. The control system can be configured for mitigating the effects of various interference scenarios in a capacity and spectrum constrained, multiple-access communication network. In other embodiments, the control system can be configured for making adjustments to or changing the overall bandwidth demands. The systems and methods provided herein can drive changes in the communication system using control responses. One such control responses includes the optimal discard (also referred to herein as "intelligent discard") of network packets under capacity constrained conditions. Some embodiments provide an interactive response by selectively discarding packets to enhance perceived and actual system throughput, other embodiments provide a reactive response by selectively discarding data packets based on their relative impact to service quality to mitigate oversubscription, others provide a proactive response by discarding packets based on predicted oversubscription, and others provide a combination thereof.

According to an embodiment, an interactive response technique is provided that allows transmission and radio access network (RAN)/radio frequency (RF) parameters to be optimized for robustness against interference from neighboring cells and optimized for mitigation of interference to neighboring cells. These optimizations are performed by determining and considering throughput levels and associated quality scores for a set of active services. A high quality user experience can be maintained where perceived and actual system throughput is controlled by selectively discarding packets.

According to an embodiment, a reactive response technique is provided that allows selected data packets to be discarded based on their relative impact to service quality in order to mitigate oversubscription caused by modification of transmission parameters or by varying the RAN/RF parameters to mitigate interference between neighboring cells. Reactively discarding packets in reaction to varying available bandwidth can provide an increase in perceived quality of the user experience for a given amount of bandwidth and can provide an increase in the number of services that can be maintained for a given amount of bandwidth.

According to an embodiment, a proactive response technique is provided that can improve the quality of the user experience and system throughput by predicting oversubscription and selectively discarding packets or marking packets for efficient discard prior to anticipated oversubscription. Proactively discarding packets in reaction to anticipated oversubscription can provide an increase in perceived quality of the user experience for a given amount of bandwidth and can provide an increase in the number of services that can be maintained for a given amount of bandwidth and for a given amount of change in bandwidth. In an embodiment, selectively proactively discarding packets can be used to optimize transmission and RAN/RF parameters to increase robustness against interference from neighboring cells and to mitigate interference to neighboring cells in anticipation of events which cause a need for such parameter changes. Proactively applying intelligent discard and considering intelligent discard to proactively modify transmission and RAN/RF parameters before a bandwidth limiting event occurs can provide a better user experience transition than can be achieved by waiting to apply intelligent discard and to modify transmission and RAN/RF parameters until after such a bandwidth limiting event.

Some embodiments provide systems and methods for a multivariate control system that can be implemented in a base station. The control system can be configured to mitigate the effects of various interference scenarios in a capacity and spectrum constrained, multiple-access communication network. In other embodiments, the control system can be configured for making adjustments to or changing the overall bandwidth demands.

The systems and methods disclosed herein can be applied to various capacity-limited communication systems, including but not limited to wire line and wireless technologies. For example, the systems and methods disclosed herein can be used with Cellular 2G, 3G, 4G (including Long Term Evolution ("LTE"), LTE Advanced, WiMax), WiFi, Ultra Mobile Broadband ("UMB"), cable modem, and other wire line or wireless technologies. Although the phrases and terms used herein to describe specific embodiments can be applied to a particular technology or standard, the systems and methods described herein are not limited to the these specific standards.

Although the phrases and terms used to describe specific embodiments may apply to a particular technology or standard, the methods described remain applicable across all technologies.

According to an embodiment, the systems and methods disclosed herein, including intelligent discard of packets, can be practiced within any entity within the communications system that performs scheduling. This includes the scheduling of downlink bandwidth by any form of base station, including macro cell, Pico cell, enterprise Femtocell, residential Femtocell, relays, or any other form of base station. According to an embodiment, intelligent discard can be performed by any form of device which transmits in the uplink direction including user devices, both fixed and mobile, and relay devices. According to an embodiment, intelligent discard can be performed by a scheduling algorithm or module, housed in the core network which centrally directs the actions of devices. According to an embodiment, intelligent discard can be predicatively performed by an entity such as a base station that allocates uplink bandwidth for use by another entity, such as a user device known to be capable of intelligent discard. The base station and the user device can negotiate whether or not the user device has intelligent discard capability, or in some embodiments, whether the user device has intelligent discard capability can be determined based on the model identification of the user device.

Basic Deployments

FIG. 1 is a block diagram of a wireless communication network in which the systems and methods disclosed herein can be implemented according to an embodiment. FIG. 1 illustrates a typical basic deployment of a communication system that includes macro cells, Pico cells, and enterprise Femtocells. In a typical deployment, the macro cells can transmit and receive on one or many frequency channels that are separate from the one or many frequency channels used by the small form factor (SFF) base stations (including Pico cells and enterprise or residential Femtocells). In other embodiments, the macro cells and the SFF base stations can share the same frequency channels. Various combinations of geography and channel availability can create a variety of interference scenarios that can impact the throughput of the communications system.

FIG. 1 illustrates a typical Pico cell and enterprise Femtocell deployment in a communications network 100. Macro base station 110 is connected to a core network 102 through a standard backhaul 170. Subscriber stations 150(1) and 150(4) can connect to the network through macro base station 110. In the network configuration illustrated in FIG. 1, office building 120(1) causes a coverage shadow 104. Pico station 130, which can be connected to core network 102 via standard backhaul 170, can provide coverage to subscriber stations 150(2) and 150(5) in coverage shadow 104.

In office building 120(2), enterprise Femtocell 140 provides in-building coverage to subscriber stations 150(3) and 150(6). Enterprise Femtocell 140 can connect to core network 102 via ISP network 101 by utilizing broadband connection 160 provided by enterprise gateway 103.

Figure 2A:
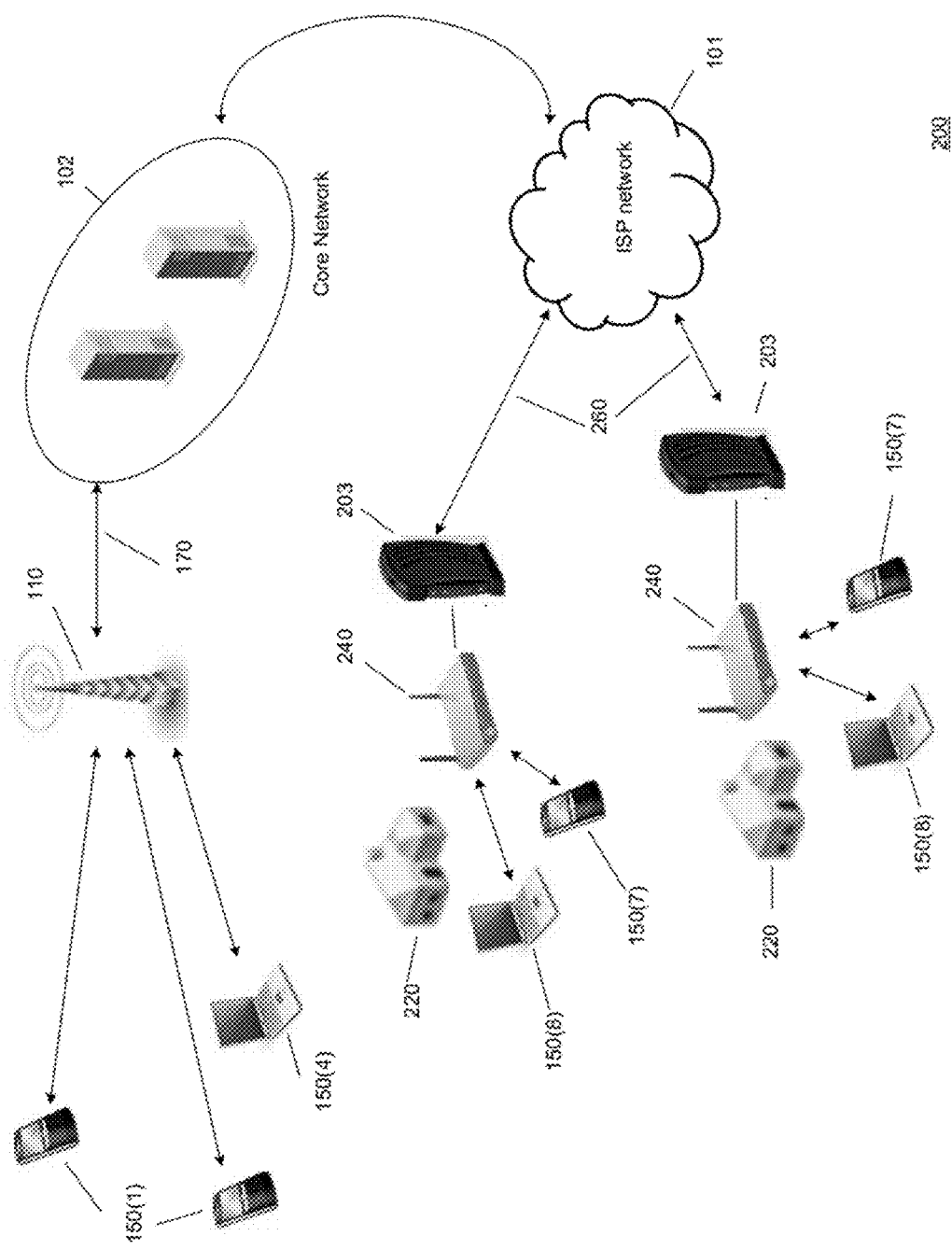
FIG. 2A is block diagram of another wireless communication network in which the systems and methods disclosed herein can be implemented according to an embodiment.

FIG. 2A is a block diagram of another wireless communication network in which the system and methods disclosed herein can be implemented according to an embodiment. FIG. 2A illustrates a typical basic deployment in a communications network 200 that includes macro cells and residential Femtocells deployed in a residential environment. Macro cell base station 110 can be connected to core network 102 through standard backhaul 170. Subscriber stations 150(1) and 150(4) can connect to the network through macro base station 110. Inside residences 220, residential Femtocell 240 can provide in-home coverage to subscriber stations 150(7) and 150(8). Residential Femtocells 240 can connect to core network 102 via ISP network 101 by utilizing broadband connection 260 provided by cable modem or DSL modem 203.

Figure 2B:
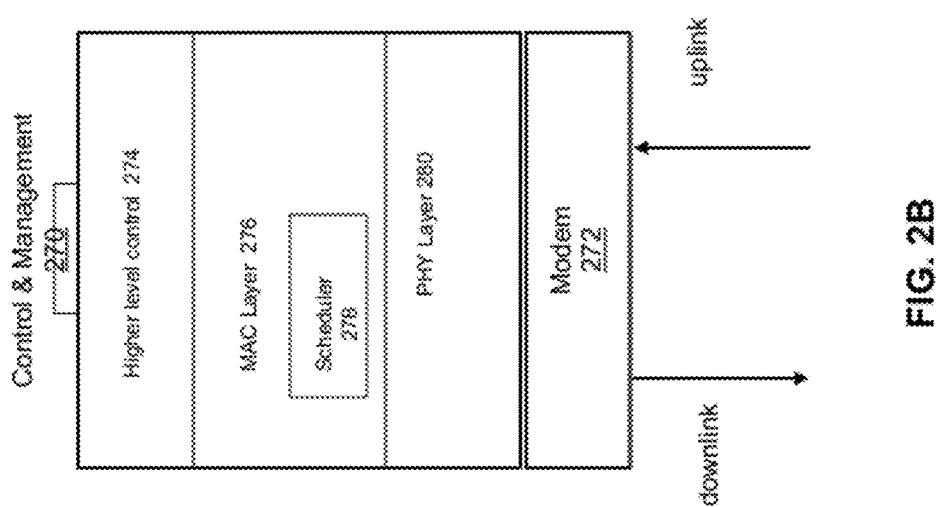
FIG. 2B is a block diagram of an access point or base station that can be used to implement the systems and methods illustrated in FIGS. 3-6 according to an embodiment.

FIG. 2B is a high level functional block diagram of an access point or base station. It should be noted that the same or similar functional blocks are also present in other elements of a wireless communication system (e.g., macro cells, Pico cells, enterprise Femtocells and subscriber stations) and reference herein to the system depicted in FIG. 2B are intended to also apply to such other elements. The base station includes a modem section 272 which transmits and receives wireless signals. The modem 272 is also sometimes referred to as an RF card. The modem can also measure and determine various characteristics of the received signals. The control and management section 270 is generally responsible for the operation of the base station. The control and management section 270 includes a higher level control section 274 and one or more MAC (medium access control) layers or modules 276 and PHY (physical) layers or modules 280. In general, the MAC layer 276 manages and maintains communications between stations (subscriber stations access points/base station) by coordinating access to a shared radio channel and utilizing protocols that enhance communications over a wireless medium. Within the MAC layer 276 is a scheduler 278. In general, the PHY layer 280 is responsible for the transmission of bits over the wireless link. In some embodiments described herein, the control and management section 270 implements the system and method described herein.

Interference Scenarios

Various interference scenarios can result in decreases in perceived and actual performance of the communications network. For example, the 3rd Generation Partnership Project (3GPP) has identified a number of interference scenarios in a technical report (3GPP TR 25.967), which is hereby incorporated by reference in its entirety. Some examples of interference scenarios include: (1) Uplink (UL) transmission from subscriber station to SFF base station interfering with UL of macro cell base station; (2) Downlink (DL) transmission of SFF base station interfering with macro cell base station DL; (3) UL transmission from subscriber station to macro cell base station interfering with SFF base station uplink; (4) DL transmission of macro base station interfering with SFF base station DL; (5) UL transmission from subscriber station to SFF base station interfering with UL of SFF station; (6) DL transmission of SFF base station interfering with SFF base station DL; and (7) interference to and from systems of other technologies.

Avoidance and Mitigation Techniques

Figure 3:
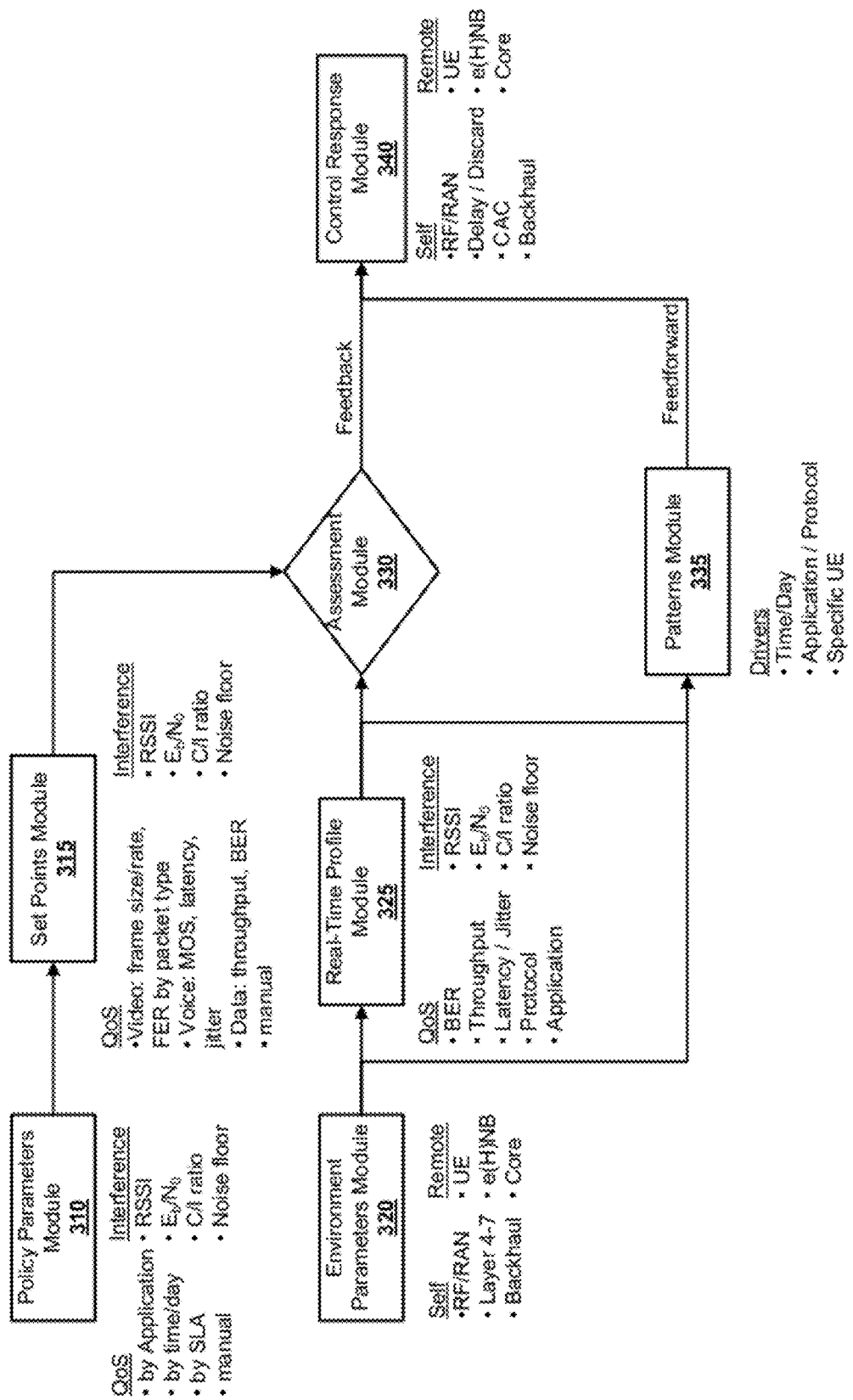
FIG. 3 is a logical block diagram of a system for mitigating effects of interference scenarios in a wireless communication network according to an embodiment.

FIG. 3 is a logical block diagram illustrating an example of the functional elements of a multivariate control system for mitigating the effects of various interference scenarios in a capacity and spectrum constrained, multiple-access communication network, such as those described above, according to an embodiment. The functionality of the system is show in FIG. 3 broken down into modules to more clearly illustrate the functionality of the control system. The control system can be implemented in a macro cell base station, Pico cell, or Femtocell, such as macro cell base station 110, pico station 130, and residential Femtocell 240 illustrated in FIGS. 1, 2A, and 2B. Alternatively, portions can be distributed to a base station controller (BSC) or other element of core network 102. In one embodiment, the control system is implemented in the MAC layer 276 of the base station shown in FIG. 2B.

In an embodiment, the control system can be configured to provide optimal responses in the following areas: (1) interference avoidance and (2) interference mitigation. The control system can avoid radio frequency (RF) interface through optimal control of RF/RAN parameters. The control system can also preserve packet quality of service ("QoS") when interference cannot be avoided or when interference avoidance or mitigation result in decreased bandwidth availability.

According to an embodiment, various types of input parameters can be used by the control system. In an embodiment, these input parameters can be divided into policy parameters and environment parameters. Policy parameters module 310 can be configured to receive policy parameters, and environment parameter module 320 can be configured to receive environment parameters. The policy parameters received by policy parameters module 310 are operational requirements defined by, for example, the network provider. These policy parameters can be broken down into two groups of system requirements: QoS policies and interference policies. In an embodiment, the policy parameters can include QoS policies at an application level, by time/day, by service level agreement (SLA), manually define QoS parameters, or a combination thereof. The policy parameters can also include policies related to various interference related parameters, such as received signal strength indicator (RSSI), energy per bit to noise power spectral density ratio ($E_b/N_o$), carrier-to-interference ratio (C/I), noise floor (the measure of the signal created from the sum of all of the noise source and unwanted signals), or other interference related parameters. The control system can use the policy parameters to determine the types of actions that can be undertaken to avoid interference and to mitigate interference when interference cannot be avoided.

The environment input parameters received by environment parameter module 320 comprise real-time information that describes the operating status of the RF network and system environment. This information can be obtained at a base station (e.g., a macro cell, Pico cell, or Femtocell as depicted in FIGS. 1, 2A, and 2B) or reported by a subscriber station and can also include information about neighboring cells. The environment input parameters 320 can be further divided into two categories of input parameters: self environment parameters and remote environment parameters. The self environment parameters are environment parameters related to or obtained by the station in which the control system is implemented. For example, in one embodiment, the self environment parameters can include Layer 1-7 parameters of both the RF and backhaul Femtocell or Pico cell ports. Remote environment parameters are related to or obtained from other cells and/or user equipment operating nearby the base station that can have an impact on the operating environment of the base station. For example, in an embodiment, the remote environment parameters can include Layer 1-7 parameters of the user equipment (UE), Core Network and other neighboring cells defined by base stations, such as evolved Node B (eNB or eNodeB), and pico stations and Femtocells, such as evolved Home Node B devices (eHNB or Home eNodeB), collectively e(H)NB devices.

From the policy parameters and environment parameters, additional sets of parameters can be derived including control set points, real-time profile, and patterns. Control set points module 315 is configured to derive control set points from the policy inputs received by the policy parameters module 310 from the network provider or can be derived manually. The control set points comprise quantitative parameters that can be used as control loop target values. These quantitative parameters can be divided into QoS parameters and interference parameters. Some examples of QoS parameters include frame size and frame rate, and frame error rate (FER) by packet type for video content. Some additional examples of QoS parameters include mean opinion score ("MOS"), latency, and jitter for voice content. Additional examples of QoS parameters are throughput and bit error rate (BER) for data content. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). The control set points can be used by assessment module 330 of the control system to assess the current state of the communication network based on a real-time profile 325 of the RF network and system environment and to determine whether feedback signals should be generated to adjust the operating state of the network.

The real-time profile module 325 is configured to generate a real-time profile of the communication system based on the environment input parameters received by environment parameter module 320. In an embodiment, the real-time profile comprises quantitative parameters that reflect current operating conditions of the communication network. The real-time profile can comprise QoS and interference related parameters. Some examples of QoS-related parameters include BER, throughput, latency/jitter, protocol-related parameters, and application-related parameters. The interference related parameters can include, but are not limited to, various interference related parameters, such as received signal strength indicator (RSSI), energy per bit to noise power spectral density ratio ($E_b/N_0$), carrier-to-interference ratio (C/I), and noise floor (the measure of the signal created from the sum of all of the noise source and unwanted signals). According to an embodiment, the real-time profile can comprise a datagram, spreadsheet, or other representation of the current operating conditions of the communication network.

Patterns module 335 is configured to generate patterns that comprise a set of historical quantitative parameter patterns that can be used to generate feedforward control responses. The patterns can be derived from the environment parameters received by environment parameter module 320 and the real-time profile generated by real-time profile module 325. These patterns can reflect usage patterns on the network. For example, in an embodiment, the patterns can include specific drivers related to the date and/or time, a specific application or protocol, and/or a specific UE.

The control set points generated by control set points module 315 and the real-time profile generated by real-time profile module 325 can be assessed by assessment module 330 to compare the current operating parameters of the communication network represented in the real-time profile with the control set points to determine whether current operating conditions of the network meet the operational requirements included in the policy parameters. If the current operating conditions of the network do not meet the requirements set forth in the policy parameters, the assessment module 330 can generate feedback signals indicating that operating parameters of the communication system need to be adjusted.

The control response module is configured to receive the feedback signals from the assessment module 330. The control response module 340 (also referred to herein as an optimization module) is configured to optimize the operating parameters of the communication network in an attempt to meet the requirements of the operator policy. The control response module 340 can be configured to generate control signals based on the feedback signals received from the assessment module 330. The control signals fall into two categories: "self" and "remote." Self control signals can be applied to the base station itself (the e(H)NB) to change the operating parameters of the base station and remote control signals can be applied to remote devices or components of the network, including UEs, the Core Network, and other e(H)NB to change the operating parameters of the remote devices or components of the network.

Figure 4:
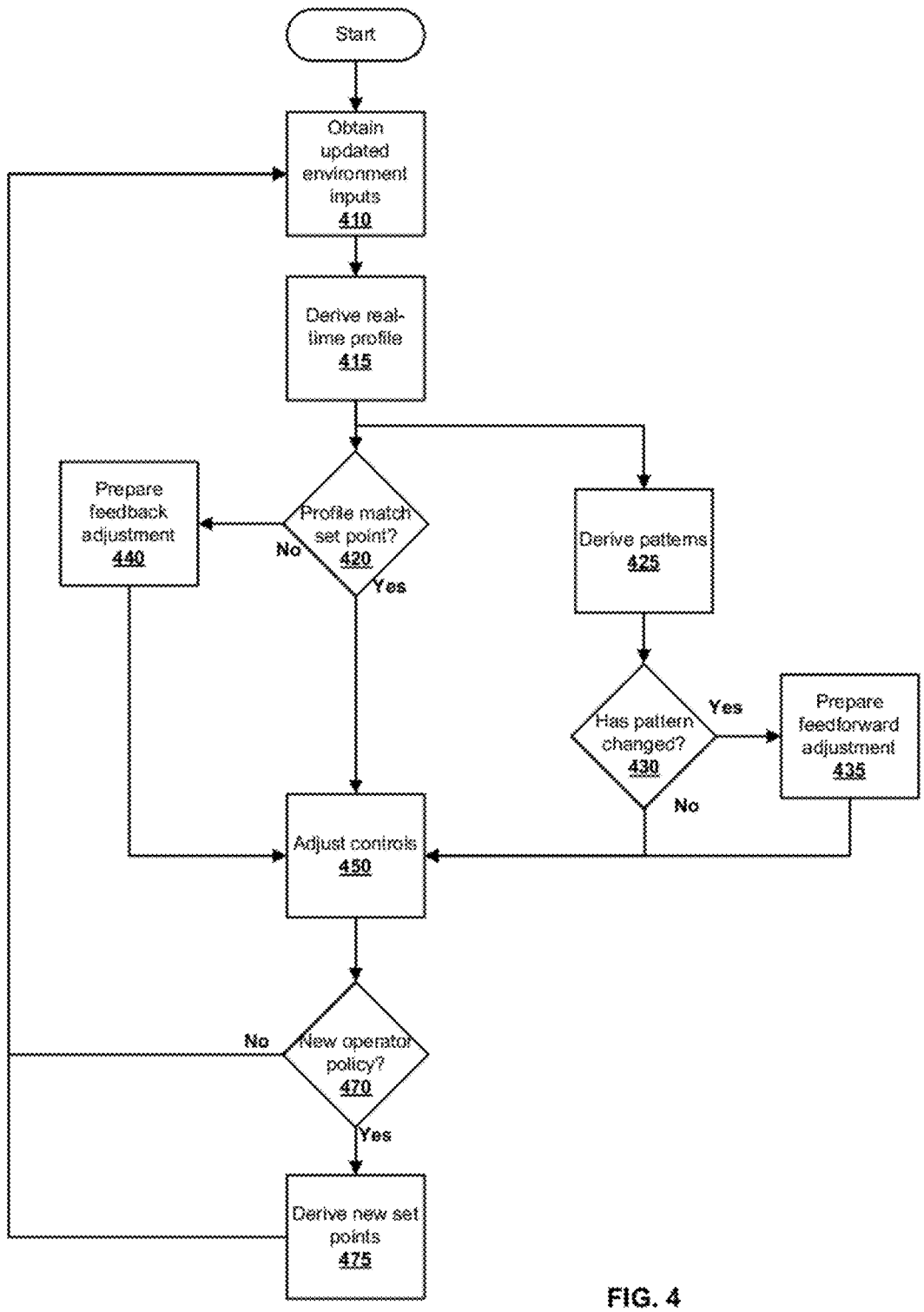
FIG. 4 is a flow diagram of a method that can be used to generate the feedforward and feedback adjustments of the radio frequency (RF) network and system environment using the system illustrated in FIG. 3 according to an embodiment.

FIG. 4 is a flow diagram of a method that can be used to generate the feedforward and feedback adjustments of the RF network and system environment using the system illustrated in FIG. 3 according to an embodiment. Updated environment inputs are obtained that represent the current state or new current state of the RF network and system environment (step 410). The environment inputs correspond to the environment parameters generated by environment parameter module 320 of the communication system. As described above, the environment parameters can comprise real-time information related to the RF network and system environment obtained from both the Pico cell or Femtocell, subscriber stations, and neighboring cells including macro cells, Pico cells, and Femtocells. A real-time profile is also derived from the updated environment inputs (step 415). In an embodiment, the real-time profile corresponds to real-time profile generated by real-time profile module 325 and can be generated from the environment input parameters obtained in step 410.

A determination can be made whether the real-time profile matches the set points generated by control set point module 315 (step 420). As described above, the control set points comprise quantitative parameters that can be used as control loop target values. The control set points can be derived from the policy parameters defined by the network provider. If the real-time profile does not match the set points, the real-time information collected related to the RF network and the system environment indicates that the operating state of the network has deviated from the set points that were derived from the network provider's operator policy. In response, the feedback adjustment control signals can be generated (step 440) to steer the communications network toward an operating state that is consistent with the policy parameters.

Patterns module 335 can derive patterns from the real-time profile and environment input parameters (step 425). In an embodiment, the patterns comprise a set of historical quantitative parameter patterns. A determination is made whether a pattern has changed (step 430), and if a pattern has changed, the historical quantitative parameter patterns that can be used to generate feedforward control responses (step 435) that can be used to adjust various operating parameters that can be used to steer the communication network toward a desired state.

The feedback signals generated in step 440 and the feedforward signals generated in step 435 can be used to generate a set of control signals (step 450) that can be applied to the 'self' e(H)NB and remote devices, including UEs, the Core Network and other e(H)NB.

A determination is made whether the network provider has made changes to the operator policy (step 470). If the network operator has made changes to the policy parameters, new set points can be generated by the control set points module 315 from the operator policy (step 475) before returning to step 410. Otherwise, the method returns to step 410 where the environment inputs are collected.

Inputs

The SFF base station can have access to various environmental information that can be used in generating feedback and feedforward signals for the control response module 340. This information can be part of the environment parameters 320 that can be used to generate the real-time profile generated by real-time profile module 325 and the patterns generated by patterns module 335. The information can be collected by the SFF base station during step 410 of the method illustrated in FIG. 4. For example; according to an embodiment, the following environmental input data is typically available (sensed, reported to, etc.) to an SFF base station: (1) signal strength from macro BTS(s), (2) signal strength from other SFF base station(s), (3) knowledge of whether the macro base stations and the SFF base stations are co-channel (or adjacent channel); (4) neighboring cell identification data; and (5) macro network specific information and system parameter thresholds. Some examples of additional information that can be available to an SFF base station include: DL co-channel carrier RSSI, DL adjacent channel carrier RSSI, common pilot channel (CPICH) Energy per Chip to Total Noise Power (Ec/No), received total wideband power (RTWP), public land mobile network (PLMN) ID, cell ID, Local Area Code (LAC), Routing Area Code (RAC), scrambling codes, co-channel CPICH received signal code power (RSCP), adjacent channel CPICH RSCP, P-CPICH Tx Power, macro cell data rate and macro cell dead-zone coverage. The macro cell data rate and macro cell dead-zone coverage can take into account various information, including macro station load, the number of active SFF base stations, distance of the SFF base stations to the macro station, fading environment, and time-of-day. The SFF base station can have macro station parameter information available to the SFF base station, including target SNR, measured SNR, and received power.

Adjustments

The following item are some examples of the type of parameters that can be adjusted in step 450 by an SFF base station in response to the environment information received via sensing: (1) DL power, (2) UL noise rise target (UL scheduler), (3) UL power, (4) control channel/data channel power ratio, (5) receiver gain, (6) carrier frequency, (7) DL scrambling code, (8) LAC, and (9) RAC.

Additional Inputs

The SFF base station can have access to additional input information. This information can be part of the environment parameters 320 that can be used to generate the real-time profile 325 and patterns 335. The information can be collected by the SFF base station during step 410 of the method illustrated in FIG. 4. For example, additional inputs such as real-time traffic metrics can also be available to an SFF base station and can be used to generate the real time profile 325. For example, real-time traffic metrics, such as the number of active UEs, the number of idle UEs, indicators of UE mobility and changes in position, the aggregate UL usage, the aggregate DL usage, the Layer 4-7 profile (Voice, video, web, FTP, etc.), the backhaul capacity, and the per connection BER. The per connection BER data can be obtained before hybrid automatic repeat request (HARQ) or other retry mechanisms or after HARQ or other retry mechanisms. In some embodiments, the per-connection BER can be obtained without HARQ. In some embodiments, the per-connection BER data can include statistics on retries.

Historical pattern data (such as patterns 335) can also be available to the SFF base station, such as time of day data, day of week data, local holiday data, known/unknown UE entering the network, typical usage rates, and typical usage durations. This historical data can be used to generate patterns 335, which can be used to generate feedforward control signals as described above.

Policy input data can also be available to the SFF base station, such as QoS requirements data, priorities data, packet inspection data, and advanced antenna inputs. This policy information can be part of the operator policy data 310 described above. The QoS requirements data can include delay tolerance data jitter tolerance data, BER/PER tolerance data, minimum acceptance rate data, and/or other QoS related data. The priority input data can include data related to priorities between users, between classes of service, between connections, and/or between packets from the same class of service. Packet inspection data and advanced antenna inputs data can also be available to the SFF base station.

Additional Parameters Adjusted

Additional parameters can be adjusted in step 450 in an attempt to remedy oversubscription. In one embodiment, RAN/RF parameters, such as modulation and coding, sub-channelization, time within frame, subchannel and time hopping, multiple-input multiple-output (MIMO) parameters, and beam forming can be used to remedy oversubscription on the communication system. In another embodiment, traffic policing can be used to remedy oversubscription. Various types of types of traffic policing can be used, including rate limiting, packet blocking, packet dropping and/or intelligent discard. Various techniques for intelligent discard that can be used to remedy oversubscription are described below.

Optimizing Performance

According to an embodiment, the described systems and methods include an optimization module to optimize performance by varying extended RAN/RF parameters based on QoS, priority, and policy (also referred to herein as the "optimization module"). According to an embodiment, the optimization module can be implemented in a base station, including a macro cell, Pico cell, or Femtocell base station.

In one embodiment, the optimization module is configured to establish the BER/PER or other quality metric level for each class of service (CoS) or connection. In one embodiment, the quality metric can be prioritized based on known/unknown user equipment, where known user equipment can be given priority over unknown user equipment. The user equipment can include mobile, transient, and stationary subscriber stations. In another embodiment, the quality metric can be prioritized based on specific UE identity, and in yet another embodiment, the quality metric can be prioritized based on the application.

According to an embodiment, the optimization module is configured to establish required/desired throughput for each class of service or connection. The required/desired throughput can be optionally modified based on whether a UE is known or unknown, based on a specific UE identity, or based on a specific application.

According to an embodiment, the optimization module is configured to use a standards based approach to derive baseline interference scenario and baseline RAN/RF parameters.

According to an embodiment, the baseline interference scenario and baseline RAN/RF parameters can change in real-time as conditions change in the communications network. For example, some of the changing conditions include the number of active/inactive UEs, traffic in neighboring cells, and indicators of change in position of UE, such as round trip delay, RSSI, and tracking via receive beam forming.

According to an embodiment, optimization module can vary the actual scenario and actual RAN/RF parameters in real time as conditions change. For example, in one embodiment, if the BER or quality metric of service drops below a threshold, the required physical parameters of service can be set to be more robust than a baseline value. For example, MIMO can be changed and beam forming advanced antenna techniques can be applied. Furthermore, modulation and coding changes can be made to improve robustness. Alternatively, a determination can be made whether to exceed baseline interference scenarios and/or RAN/RF parameters. For example, the determination can be based on sensing data, permission from/negotiation with central controller, permission from/negotiation with neighboring BTSs, or use spatial multiplexing (beam forming, etc) to minimize interference. Alternatively, a subchannel and time location in frame (e.g., Orthogonal Frequency Division Multiplexing (OFDM) symbol, time slot, etc.) can be chosen to avoid regular interference. Alternatively, subchannels and time location in the frames can be randomized to statistically avoid interference or selectively increase potential caused interference, but mitigate through randomization of impact.

In an embodiment, if demand exceeds new maximum aggregate throughput (DL or UL, including bandwidth for managing active and idles UEs) then optimization module can take steps to mitigate the oversubscription. In one embodiment, delay tolerant traffic can be delayed to temporarily reduce demand. For example, one approach includes delaying and buffering content, such as a live video. Live video can be delayed and buffered so long as the variation in delay (jitter) remains within the capacity/time constraints of the delay/jitter buffer. In another embodiment, substantial deferral of "download for later use" content is used to decrease demand on the network. For example, in one embodiment, downloads of music and/or video content that is not being consumed as the content is received (e.g., non-streaming content) can be temporarily deferred until demand on the network decreases.

In another embodiment, if demand exceeds the new maximum aggregate throughput, optimization module can selectively discard frames within a service to reduce demand on the network. For example, some Moving Picture Experts Group (MPEG) frames are less important than others and can be selectively discarded in order to decrease demand on the communication system. In another example, packets having above a minimum acceptable rate for a service can be discarded to reduce demand.

In yet another embodiment, if demand exceeds the new maximum aggregate throughput, call admission control (CAC) can be used to curtail services. In some embodiments, services can be curtailed based on priority, while in some embodiments services can be curtailed based on the application.

According to an embodiment, the various mitigating actions taken if demand exceeds the new maximum aggregate throughput can be reversed when conditions improve. For example, in one embodiment, hysteresis can be used to smooth reactions.

Figure 5:
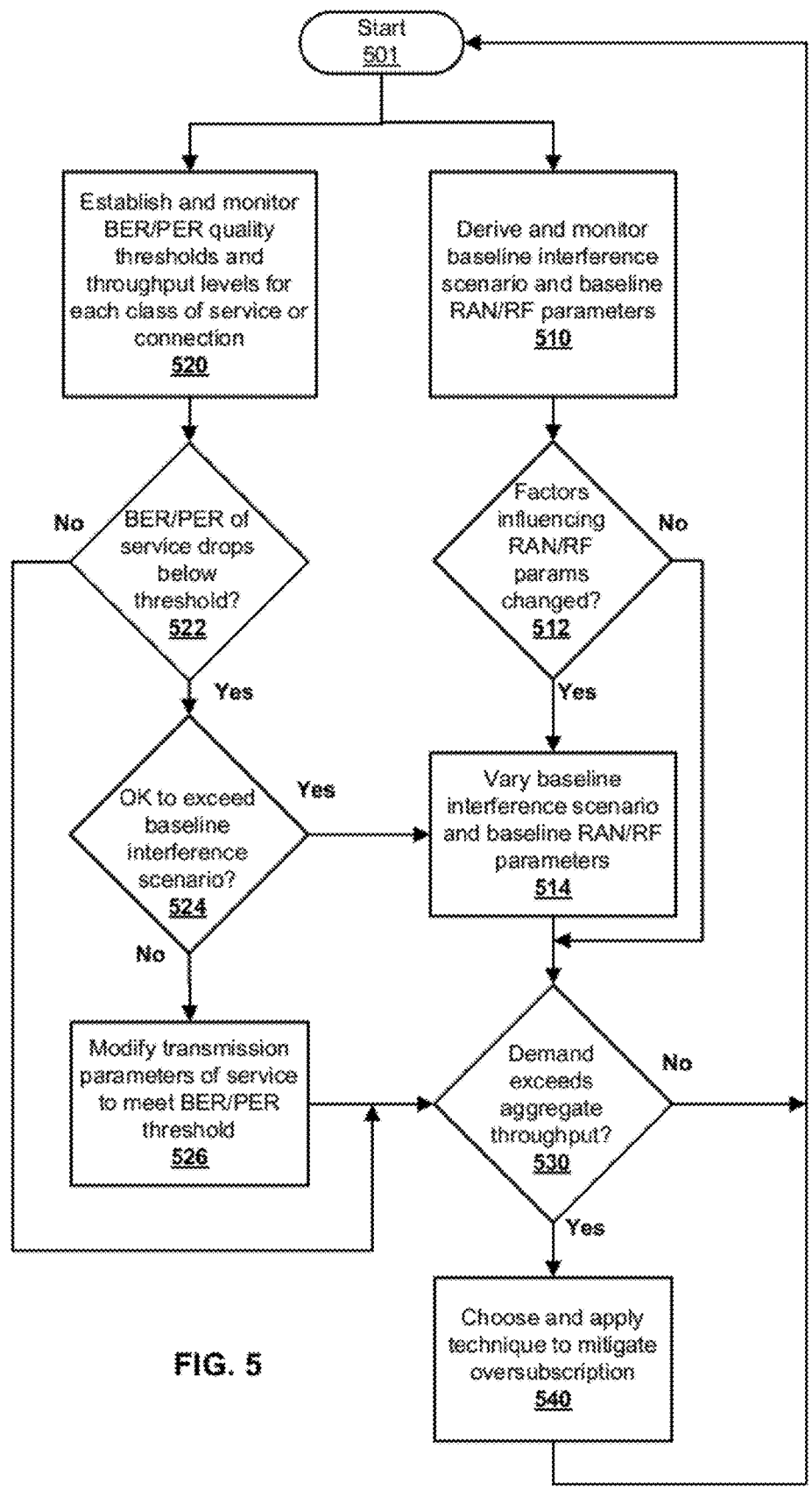
FIG. 5 is a flow diagram of a method for mitigating effects of interference scenarios in a wireless communication network according to an embodiment.

FIG. 5 is a flow chart illustrating a method that can be implemented by the optimization module described above to optimizing performance by varying extended RAN/RF parameters based on QoS, priority, and policy according to an embodiment. In an embodiment, the method illustrated in FIG. 5 can be implemented by the control system illustrated in FIG. 3, for example, in the MAC and PHY section. In an embodiment, the method of FIG. 5 can be implemented in step 450 of FIG. 4.

The method starts at step 501 where in parallel the method determines RAN/RF aspects of the system (steps 510, 512, and 514) and QoS and traffic management aspects of the system (steps 520, 522, 524, and 526).

In step 510, the baseline interference scenario is derived and monitored and baseline for RAF/RF parameter settings is created. In an embodiment, the inputs used to derive the baseline interference scenario can include typical inputs such as those suggested in the 3GPP TS 25.967, and additional inputs as suggested in this document, or both. The RAN/RF parameters adjusted can include typical inputs such as those suggested in the 3GPP TS 25.967, and additional RAN/RF parameters as suggested in this document, or a combination thereof. In one embodiment, step 510 can be performed by the assessment module 330.

In step 512, a determination is made in real-time whether any of the factors influencing the interference scenario and the RAN/RF parameters that represent the current state of the RF network and the system environment have changed. If these factors have not changed, this parallel activity continues with the method proceeding to step 530. If the factors have changed, the method proceeds to step 514 where the baseline interference and RAN/RF parameters are modified to account for the observed changes, and the method proceeds to decision step 530. In one embodiment, step 512 can be performed by the assessment module 330, and step 514 can be performed by the control response module 340.

The process of managing the influence on classes of service and individual connections, and conversely, managing the influence of individual services and their associated class of service on the interface environment can be begun in parallel with step 510. In step 520, the maximum or target bit error rate (BER) or packet error rate (PER) (or other quality metric) is established for each class of service or each individual service or connection. Each individual service or connection's actual BER, PER, or other quality metric can be monitored. The maximum or target BER and PER values can be determined based on the operator policy information 310 provided by the network provider. Additionally, in step 520, the throughput needs or targets of the service can also be determined. These throughput targets can have multiple levels, corresponding to multiple levels of QoS that require differing levels of throughput. The throughput targets can also take into account expected retransmissions based on knowledge of the applications or the transport mechanisms used at the various layers of communication protocol. In one embodiment, step 520 can be performed by the control set point modules 315.

In step 522, a determination is made whether the actual error rates, such as the BER or PER, or other actual quality metric exceeds a target threshold for the connection determined in step 510. If the BER or other quality metric exceeds the threshold for the connection, the method proceeds to decision step 524 to start the process of taking corrective action. Otherwise, if the quality metric are no worse than the target, the method proceeds to decision step 530. In one embodiment, step 522 can be performed by the assessment module 330.

In step 524, a determination is made whether it is acceptable for the affected service provider to operate in a manner that can exceed the baseline interference scenario and baseline RAN/RF parameters, which could cause greater interference to services active in neighboring cells. For example, a temporary slight increase in transmission power (e.g., 0.5 dB) can add a tolerable increase in interference to services in neighboring cells. If it is acceptable for the affected service provider to operate in manner that can exceed the baseline interference scenario and baseline RAN/RF parameters, the method proceeds to step 514 where the baseline interference scenario and RAN/RF parameters can be temporarily adjusted to accommodate the need for improved QoS for the service. According to an embodiment, this adjustment may be allowed solely for the affected service or connection, or can be allowed generally for the cell. In one embodiment, step 524 can be performed by the assessment module 330 and/or the control response module 340.

If in decision step 524 a determination is made that the baseline interference scenario cannot be exceeded, the method proceeds to step 526 where the transmission parameters of the service are modified to achieve the target BER/PER or quality metric without violating the current baseline interference scenario. In an embodiment, this can include changes in modulation and coding, transmit power or any of the other adjustable transmission parameters. In one embodiment, step 526 can be performed by the control response module 340.

According to an embodiment, when parameters are adjusted, there is a possibility that the bandwidth requirements to meet demand can exceed the current available aggregate throughput of the cell. Hence, both parallel paths of the method proceed to decision step 530, where a determination is made as to whether the demand exceeds the current available aggregate throughput. If the current available aggregate throughput of the cell is not exceeded, the method returns to step 501 and can continuously repeat. Otherwise, the method continues to step 540 before continuing to step 501 to repeat. In step 540, a method to mitigate oversubscription is selected and applied. Several methods for mitigating oversubscription are described below. In one embodiment, steps 530 and 540 can be performed by the control response module 340.

According to an embodiment, the method illustrated in FIG. 5 can include an uplink instance and a downlink instance that operate independently, for example in a Frequency Division Duplex (FDD) system. Conversely, in other embodiments, the uplink and downlink instances may need to share information in a Time Division Duplex (TDD) system where the uplink and downlink are on the same frequency and may, therefore, contribute interference in certain situations. This may be especially true of TDD systems that adapt the uplink/downlink ratio dynamically.

According to an embodiment, the optimization module can also implement another method to optimize performance based on historical data to perform anticipated adaptation to reduce potential oversubscription. According to an embodiment, the optimization module can implement this second method, which can be used to update the operator policy 310. A history of interference can be built through sensing and/or through the use of shared metrics received from other network elements (e.g., the core network, BTSs, UEs). The interference data can be grouped by date and/or time in order to build a picture of interference patterns for various time frames. For example, the interference data can be grouped by the time of day, the day of the week, or by marking the data as holiday or non-holiday. The sensing and/or shared metrics can also include traffic metrics for the SFF base station's own cell and/or for neighboring cells. The can also include "update with memory trail off" where weighted averaging, exponential averaging, or some other method is used to give higher importance to more recent data.

Preemptive decisions can be made based on the history of interference that has been built. For example, a determination can be made whether more or less strict CAC, policy, and/or power control may help to reduce the likelihood of oversubscription. In an embodiment, a determination can be made whether trading off likely robustness versus BER/PER.

According to an embodiment, real time monitoring based on the first method described above and illustrated in FIG. 5 can be used in case unexpected usage patterns disrupt the predictive interference method described in the second method. In an embodiment, predictive data can be used for a baseline scenario and the first method can be used for real-time optimization of the system. In another embodiment, predictive data generated using the second method can be used to update the operator policy 310, and the first method can be used to apply the updated policy.

Intelligent Discard

Referring to FIG. 5, intelligent discard can be used as one of the techniques of method step 540 to mitigate oversubscription caused by modification of transmission parameters in step 526 or caused by varying the interference scenario and RAN/RF parameters in step 514. This is the reactive form of intelligent discard. Alternatively, knowledge of available intelligent discard techniques may be used to influence the throughput level target in step 520, the transmission parameter modifications in step 526, and the changes to the interference scenario and RAN/RF parameters in step 514. This is the interactive form of intelligent discard. The interactive form may further be made proactive by using other system information to predict the future oversubscription of bandwidth.

According to an embodiment, intelligent discard can be practiced by any entity of the communications network that performs scheduling. This can include the scheduling of downlink bandwidth by any form of base station including macro cell, Pico cell, enterprise Femtocell, residential Femtocell, relays, or any other form of scheduling. Intelligent discard can be performed by any form of device that transmits in the uplink direction, including user devices, both fixed and mobile, and relay devices. In an embodiment, intelligent discard can be performed by a scheduling algorithm or module that is implemented in the core network, which centrally directs the actions of devices. In another embodiment, intelligent discard can also be predicatively performed by an entity, such as a base station, that allocates uplink bandwidth for use by another entity, such as a user device capable of intelligent discard. The base station and the user device can negotiate whether or not the user device has intelligent discard capability or it may be known based on the model identification of the user device. According to an embodiment, this approach where an entity, such as a base station, that allocates bandwidth for use by another entity in the network capable of intelligent discard, can coordinate with the other entity, such as a user device, can be referred to as cooperative intelligent discard.

Reactive Intelligent Discard

In step 530 of FIG. 5, a determination is made whether or not the application layer throughput demand for bandwidth currently exceeds the available aggregate throughput or whether a specific session or connection is exceeding its allocated throughput. For instance, in step 520, throughput level targets can be established for the active connections being serviced by the base station in question. These target levels can be expressed in such quantitative terms as bits per second or bytes per second. In an embodiment, these target levels can include allowances for retransmissions. Based upon the transmission parameters selected in step 526 and the RAN/RF parameters selected in steps 510 and 514, the throughput levels can be translated into required physical layer resources, such as the resource blocks used in 3GPP LTE, QAM symbols, OFDM symbols, subchannels, UL/DL ratio, or combinations thereof. The required physical layer resources can include allowances for HARQ or other retransmissions. Once converted to physical layer resources, the throughput level targets or demand can be compared against available physical layer resources as is indicated in step 530. This comparison may return a result indicting that demand for physical resources currently exceeds available physical resources. In this case, a reduction in physical resource demand is necessary in order to not exceed available physical resources. This in turn determines a necessary reduction in the current demand for bandwidth at the session, connection and/or application.

According to an alternative embodiment, other methods can be used to determine whether the demand for physical resource exceeds the available physical resources which can provide an available throughput metric that can be used for reactive intelligent discard.

Once a determination is made that application layer throughput demand exceeds available physical resources, intelligent discard can be used in step 540 to reduce the demand while minimizing the need to curtail individual services and while maximizing the quality perceived by the end user.

For instance, if the demand for resources for a VoIP service exceeds the available physical resources by 10%, random (not intelligent) discard may cause consecutive or near consecutive VoIP packets to be discarded. In contrast, reactive intelligent discard can identify the number packets that can be dropped in order to reduce at least a portion of the excess demand for bandwidth while preserving the perceived quality of the call. For example, in one embodiment, in an intelligent discard system, the scheduler 278 (see, FIG. 2B) can discard every tenth packet. This could include packets already queued by the scheduler, or packets as they are being queued, or both. The even distribution of discarded packets by the intelligent discard method may be less noticeable to the end user than clumping of discarded packets by a random discard algorithm. According to an embodiment, other patterns can be used to select the packets to be discarded, so long as the selected pattern minimizes the number of consecutive and near consecutive packets that are discarded.

According to an embodiment, the discard method can also be adjusted depending on the specific voice protocol and codec being used. Intelligent discard can allow the call to continue with acceptable quality, as determined by a quality score and compared to the operator, system, or local policy.

In another example, in MPEG-2 transmissions, audio packets are more important than video packets, because humans notice changes in audio quality in MPEG-2 transmissions more readily than they notice changes in video quality. Additionally, the video packets are comprised of intra-coded frames ("I-frames"), predictive-coded frames ("P-frames"), and bidirectionally-predictive-coded frames ("B-frames"). The loss of an I-frame is typically more detrimental to the quality of an MPEG-2 transmission than the loss of a P-frame or B-frame. In fact, the loss of an I-frame can result in the receiving device being unable to use a P-frame, even if the P-frame is received correctly. So, in MPEG-2 intelligent discard may discard P-frames and B-frames preferentially to I-frames and may discard all forms of video frames preferentially to audio frames.

For MPEG-4 transmission, in addition to the distinction between frames inherited from MPEG-2, there are 11 levels of spatial scalability, 3 levels of temporal scalability, and a variable number of levels of quality scalability depending upon the video application. Fine grain scalability combines these into 11 levels of scalability. In an embodiment, "marking" of packets with information can be performed and the markings can be used by intelligent discard to allow a fine grained varying of quality as available physical resources change.

As with the VoIP example, in the MPEG examples, intelligent discard can perform discard of already queued packets as well as discard upon entry to the scheduling queue. The intelligent discard of a percentage of packets can allow more services to be maintained and accepted by the system's call admission control (CAC) methods.

In step 540, there may be more than one choice of service that can have intelligent discard applied to meet the physical layer resource constraints. There are numerous criteria that can be used to choose the service or services to which to apply intelligent discard. For instance, intelligent discard can be applied in a round robin fashion, similarly impacting all services or all services within a selected class or set of services. Intelligent discard can be applied based on the identity of the end user or membership of the end user in some group. For instance, different users may pay more or less for different service level agreements with the operator of the network. Users with a lower level agreement may be impacted preferentially to users with a higher level agreement. Users that are roaming from another network may be impacted by intelligent discard preferentially to users that subscribe directly to the network. The decision can be based on service type or application. For instance, a VoIP call being made via a third party application such as Skype may be impacted preferentially to a VoIP call made via a VoIP service directly provided by the operator. Which service to impact can be determined algorithmically to maximize total throughput. The decision on how to apply intelligent discard is based on system, operator, or autonomous policy. For instance, a device may have a default policy which may be modified or overridden by a system or operator policy.

The decision as to which services to impact can be based on relative degradation, impacting first, for example, those service whose observed quality is least impacted by intelligent discard regardless of the relative quantity of discarded data. To facilitate this, step 540 can calculate a score for each of the possible throughput levels for the various services. These scores represent a relative level of observed quality for each throughput level. These scores may be based on subjective criteria, such as MOS scores used to score voice quality, or may be quantitative such as the elimination of a feature from the service. The scores can be used in step 540 as part of the determination of which service will have intelligent discard applied and to what extent. For example, once a set of scores for a set of possible throughput levels for services requiring bandwidth, a target bandwidth level can be selected for one or more of the services based on the set of scores calculated for the various throughput levels, and packets associated with each service can be selectively discarded to reduce the throughput associated with each of the services to the target throughput level associated with that service.

Reactive intelligent discard can be performed in any portion of the system that can make a choice regarding transmission or disposition of a packet. For instance, in one embodiment, a base station, pico station, femto station or relay station can include a transceiver for transmitting and receiving packets. According to a preferred embodiment, these stations can include a MAC layer 276 (see, FIG. 2B) responsible for allocation of bandwidth on the uplink and/or the downlink. The MAC layer preferably can contain or be associated with a scheduler (for example, scheduler 278 in FIG. 2B) and buffers for storing packets prior to transmission. In one embodiment, the intelligent discard techniques disclosed herein can be implemented in the portion of the MAC layer responsible for buffering ad scheduling the transmission of packets which is also referred to herein as the scheduler. Alternatively, the equivalent of the MAC scheduler can reside in a core network element that performs centralized scheduling, and possibly, buffering. For example, in one embodiment, the equivalent of the MAC scheduler could be implemented to coordinate simultaneous transmission of data, such as broadcast video or audio, on two or more base stations or other similar devices.

In an embodiment, the intelligent discard techniques can also be implemented in the MAC scheduler of a user device that schedules and buffers data prior to transmission in the uplink. According to an embodiment, the core network or base station (or equivalent device) can be configured to mark packets prior to buffering to facilitate making easier discard decisions in the downlink direction. Alternatively, a function preceding the buffering of packets for uplink transmission by the user device can mark packets for easier discard decisions by the MAC scheduler function in the user device.

Interactive Intelligent Discard

In addition to the previously described reactive intelligent discard, the intelligent discard method can interact with other aspects of the system control to gain improved performance. For example, referring now to FIG. 5, in one embodiment changing a particular RAN/RF network operating parameter, such as lowering the maximum transmit power in step 510, might benefit neighboring cells by reducing the observed interference of those cells.

Alternatively, choosing a more robust modulation scheme in step 526 can also have a similar effect. In a typical system, these changes could be undesirable due to the resulting decrease in available physical resources, causing the application layer throughput demand to exceed available bandwidth. In contrast, in a system employing interactive intelligent discard, in step 520, a set of throughput levels can be calculated for the active services. The set of throughput levels represents a larger range of physical resource demands when the possible transmission parameter choices of step 526 and possible RAN/RF parameters of step 510 are considered. Knowledge of these possible combinations of quality levels, transmission, and RAN/RF parameters allows the system in steps 510 and 526 to choose parameters that can substantially increase robustness of the system, temporarily or permanently, at the sacrifice of a small amount of quality to one or more services.

Alternative Implementation of Interactive Intelligent Discard

Figure 6A:
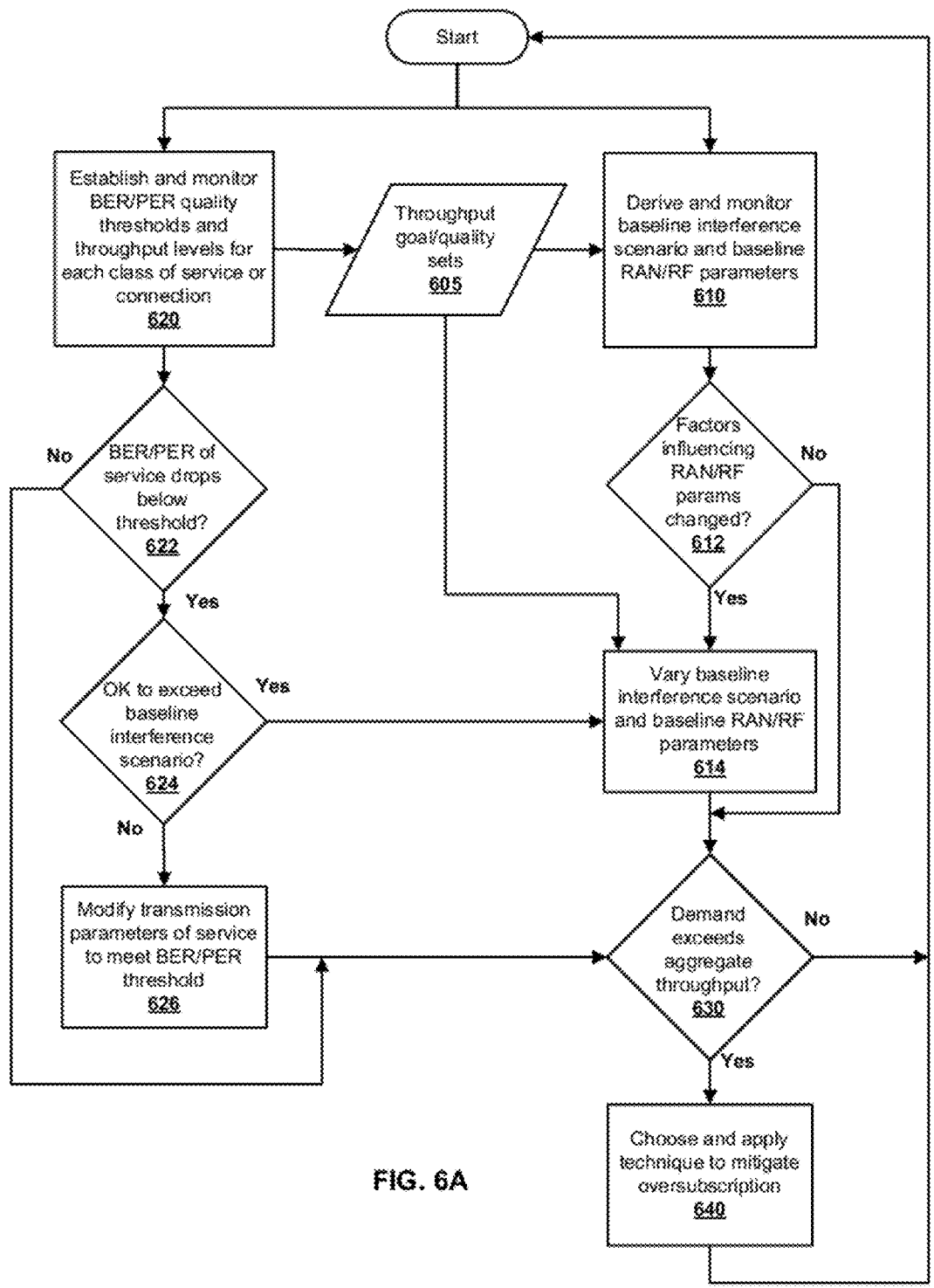
FIG. 6A is a flow diagram of a method for mitigating effects of interference scenarios in a wireless communication network according to an embodiment.

FIG. 6A is a flow diagram of a modified version of the method illustrated in FIG. 5 that enables other aspects of network operation, such as interference mitigation and power control, to make use of intelligent discard to further optimize system performance. In step 620, rather than creating a single quality (e.g., BER or PER) and throughput level for a service or connection (as in step 520 of FIG. 5), a set of throughput levels and/or range of quantitative quality thresholds (e.g., BER and PER) can be created (605). A score can be applied to each of the throughput levels. The score represents a relative level of observed quality for each throughput level. According to an embodiment, a score can be applied to each of the throughput levels to indicate a relative level of observed quality for each throughput level. The scores can be based on subjective criteria, such as MOS scores used to score voice quality, or the scores can be quantitative, such as the elimination of a feature from the service. The scores can be used in step 640 as part of the determination of which server will have intelligent discard applied and to what extent.

The set of throughput levels and scores, exemplified by data block 605, can be used by step 610, decision step 612, and modified step 614 to make tradeoffs between service quality and other system operational factors. Other steps, such as step 626 can also use the set of throughput levels and scores to optimize performance choices. For instance, based on the throughput levels and scores, the method in step 610 can choose to apply a more robust modulation and lower power the baseline parameters for a service, with the knowledge that the performance degradation to the individual service will be small relative to the reduction in interference caused to neighboring cells. In fact, the change in RAN/RF parameters can be a reaction to a request for interference reduction from a neighboring cell, or a command or request for interference reduction or noise floor reduction from a network management entity or other centrally located control function, or an autonomous decision to reduce power, interference potential, or some other aspect of network operation. In this way, step 610 and similar functions can assess the quality impact implied by the throughput impact resulting from potential alternative actions that can be applied to the previously independent task of choosing appropriate RAN/RF parameters.

In a preferred embodiment, an interactive intelligent discard method implements the discard function in the equivalent of the MAC layer scheduler (e.g., scheduler 278 in FIG. 2B) and packet buffering capability prior to transmission by the transceiver of the station, user device, or network function implementing interactive intelligent discard. The derivation of sets of quality thresholds, throughput levels, and scores can be performed by a function that can be implemented in the core network, the base station (macro, pico or femto), or user devices and provides the information to the interactive intelligent discard function which interacts with the buffering and scheduling in the MAC layer to perform intelligent discard. The interactive intelligent discard function can also interact with the physical layer functions, which monitor the RF environment, and interacts with core network functions or functions on other base stations or network elements to exchange information about the RF environments of neighboring cells. A network facing function within interactive intelligent discard can provide information regarding the services, user devices, and RF environment to a core network function or to an interactive intelligent discard function on neighboring devices. The interactive intelligent discard method can provide information to an RF or Physical Layer (PHY) control module, which adjusts the RAN/RF parameters for the transmission of certain information packets.

Proactive Intelligent Discard

According to an embodiment, proactive intelligent discard is a technique for predicatively performing intelligent discard in anticipation of oversubscription conditions and for performing the discard before the oversubscription conditions actually occur. Proactive intelligent discard can be used to reduce anticipated demand when the anticipated demand for network bandwidth exceeds anticipated available bandwidth.

Proactive intelligent discard may be applied reactively. For example, expectation of a handover creates expectation of more robust modulation and, therefore, lower throughput per physical layer resource unit as a mobile station approaches the edge of a cell. Proactive intelligent discard can be used to discard ahead of the actual event, allowing smoother handovers with controlled discard of data rather than random loss of data due to congestion.

Proactive intelligent discard can be applied interactively. For instance, it may be known from historical data that interference to or from neighboring cells increases at a certain time of day (daily commute, etc.). In proactive intelligent discard, step 612 can determine that the factors influencing the RAN/RF parameters are about to change, and in step 614 the RAN/RF parameters can be modified based on the assumption that the change will be needed in combination with the set of throughput levels and scores created by step 620 in order to proactively modify the system parameters so that intelligent discard can preserve optimal throughput and quality based on the systems policies regarding quality and throughput.

Proactive intelligent discard may be performed based on a variety of stimuli or trigger events. Some examples of the types of stimuli or trigger events that can be used to trigger the execution of proactive intelligent discard include:

(1) Motion—if it is determined that the device is not stationary or is exceeding some speed threshold, proactive intelligent discard may anticipate the need to perform intelligent discard based on expectations of motion caused changes in physical parameters that impact throughput availability.

(2) Expectation of handover—if it is determined that the likelihood of handover exceeds some threshold metric, intelligent discard can proactively discard data in a controlled fashion so as to minimize the quality impact of predicted decrease in resources.

(3) Time of day, day of week, or other historical patterns—historical data may show that decrease in resources may be expected at predictable points in time. Proactive intelligent discard can prepare the system for smooth transition to lower resources.

(4) Active/inactive user devices in a cell—The number of user devices in a cell may be used to predict fluctuations in demand that would cause reactive intelligent discard to take action.

(5) Reserve resources—proactive intelligent discard can aid in service quality preservation by proactively performing intelligent discard to keep resources in reserve for other functions such as Call Admission Control which may be able to serve more active calls if intelligent discard is applied (6) Changes to Neighbor Cells—information regarding changes in the quantity and configuration of neighboring cells, including but not limited to: number of neighbor cells, location of neighbor cells, Cell Operator, frequency and bandwidth of operation, number of active/idle UEs, RF/RAN parameters.

Additionally, proactive intelligent discard can provide a smoother transition from one level of discard to another, minimizing the impact on quality of service parameters such as jitter and individual packet delay.

In an embodiment, proactive intelligent discard can also be used in an implementation where the discard occurs before being needed, applying a lower throughput in anticipation of lack of resources. In an alternative embodiment, proactive intelligent discard can be used in an implementation where the packets to be dropped during the period of expected lack of resources are tagged for quick discard, but only discarded in the event that the anticipated lack of resources actually occurs.

In an embodiment, the intelligent discard can also perform the inverse role: accelerating packet transmission into the channel before a capacity limitation comes into effect. This may allow the avoidance of a future short-term resource constraint.

The historical or other data that is used to create the patterns or history that is used to proactively implement intelligent discard can come from a variety of sources. For example, RF modules can collect information regarding the physical environment. In another example, the MAC layer can collect information regarding packet demand and throughput, and numbers of active or inactive user devices and services. In one embodiment, the information can be processed locally on a device to convert the inputs into historical trends, or in an alternative embodiment, the information can be forwarded to a function in the core network or any other processor for conversion into historical trends and patterns. The historical trends and patterns can be used locally by a device or may be shared between devices, such as in the case where interactive intelligent discard is applied proactively.

In the following paragraphs various additional embodiments related to discarding packets are described. Some of the embodiments are described with reference to particular standards. However, it will be appreciated that the embodiments described herein may be applied to other systems and standards. It will also be appreciated that the embodiments of intelligent discard described below may be implemented using the systems and methods described above including reactive intelligent discard, proactive intelligent discard, and interactive intelligent discard. For example, the embodiments described below may be used in conjunction with the embodiments of intelligent discard describe above with respect to FIGS. 4-6. Further, the embodiments described below may be implemented using embodiments of the systems described above such as the systems described with respect to FIGS. 1-3.

In particular, discarding packets according to one or more of the embodiments described below can be practiced within any entity within the communications system that performs scheduling. This includes the scheduling of downlink bandwidth by any form of base station, including macro cell, Pico cell, enterprise Femtocell, residential Femtocell, relays, or any other form of base station. In another embodiment, discarding packets according to one or more of the embodiments described below can be performed by any form of device which transmits in the uplink direction including user devices, both fixed and mobile, and relay devices. According to another embodiment, discarding packets according to one or more of the embodiments described below can be performed by a scheduling algorithm or module housed in the core network which centrally directs the actions of devices or which schedules a service common to multiple end user devices such as a multicast or broadcast video service.

According to another embodiment, discarding packets according to one or more of the embodiments described below can be predicatively performed by an entity such as a base station that allocates uplink bandwidth for use by another entity, such as a user device. The base station and the user device can negotiate whether or not the user device is capable of discarding packets according to one or more of the embodiments described herein, or in some embodiments, whether the user device has intelligent discard capability can be determined based on the model identification of the user device.

According to another embodiment, the prioritization of packets described below can be performed in one device, such as a device performing deep packet inspection, and may result in a marking of packets where such marking is used by another device, such as a wireless base station, which is performing intelligent discard.

Figure 6B:
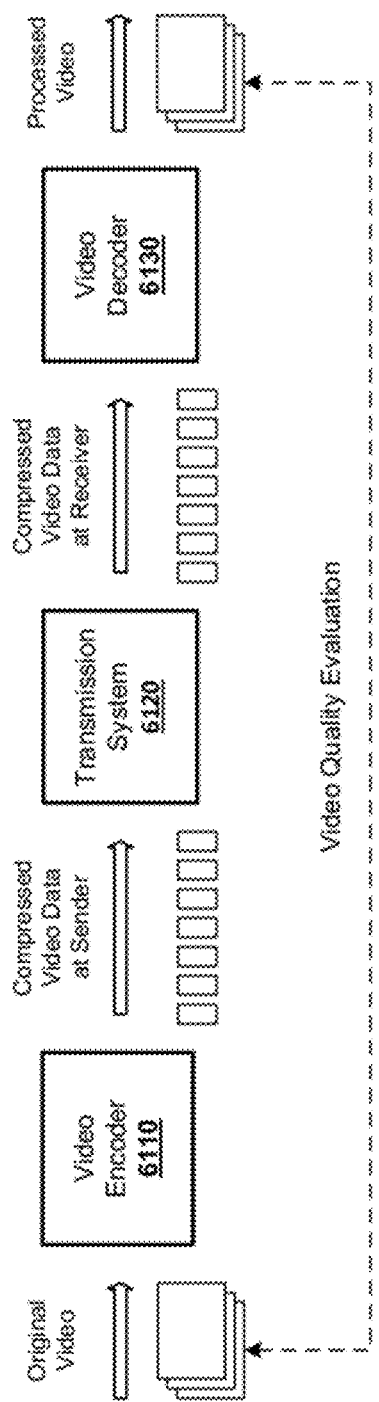
FIG. 6B is a diagram showing data flow in a network video application according to an embodiment.

FIG. 6B illustrates an end-to-end network video application with three major modules, namely video encoder 6110, transmission system 6120, and video decoder 6130. In one embodiment, transmission system 6120 comprises devices of the communications network 100 (FIG. 1) including the control system illustrated in FIG. 3.

Figure 7A:
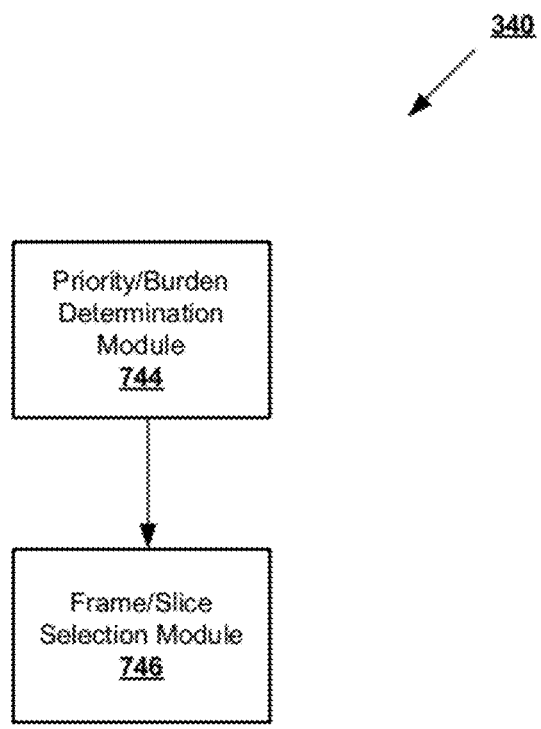
FIG. 7A is a logical block diagram of a control response module in a system for mitigating effects of interference scenarios in a wireless communication network according to an embodiment.

FIG. 7A is a functional block diagram of one embodiment of control response module 340 of FIG. 3. As described above, in one embodiment, if demand exceeds maximum aggregate throughput for the network, the control response module 340 can respond by selectively discarding frames within a service to reduce demand on the network. In the embodiment of FIG. 7A, the control response module 340 comprises a priority/burden determination module 744 ("determination module") and a frame/slice selection module 746 ("selection module"). As described in greater detail below, the choice of which frame or slice to discard can have significant effects on the quality of the viewing experience in the resulting video. In one embodiment, determination module 744 determines a value, e.g., burden or priority, that represents the relative importance of that frame compared to other frames. The selection module 746 then selects one or more to discard or drop based on the determined value. The operation of the determination module 744 and the selection module 746 are described in greater detail below.

Intelligent Discard Based on Video Quality Measurement

Figure 7B:
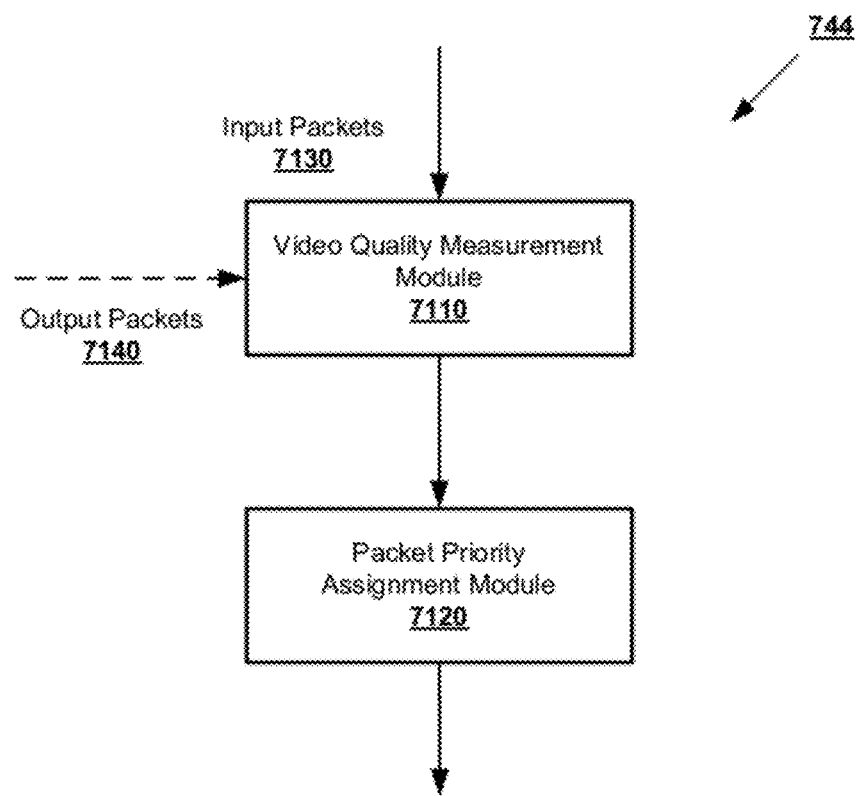
FIG. 7B is a diagram of a packet priority/burden determination module based on objective video quality measurement according to an embodiment.

FIG. 7B illustrates an embodiment of Priority/Burden Determination Module 744. In this embodiment, the determination module 744 comprises a video quality measurement module 7110 and a packet priority assignment module 7120. Input packets 7130 are the packets received by a device implementing control response module 340. Output packets 7140 are the packets output by the device after intelligent discard. In some embodiments, the video quality measurement module 7110 receives identifiers of the discarded packets rather than the output packets 7140. The video quality measurement module 7110 calculates the contribution of a video packet to the overall video quality based on an objective video quality measurement. The packet priority assignment module 7120 assigns the priority of a video packet based on the output from the video quality measurement module 7110. A packet is assigned a higher priority if it contributes more to the overall video quality than another packet.

Video quality can be measured either subjectively or objectively. Subjective video quality measurement generates a Video Mean Opinion Score (VMOS), which may include multiple scores or averages of scores, based on human observation. Humans are typically the final consumer of the video, so human opinion about the video quality is vitally important. However, subjective video quality measurement is expensive because of human involvement and the result is often not precisely reproducible. More importantly, the subjective video quality measurement cannot be incorporated into a system to make automated decisions for intelligent discard at run time. In contrast to subjective video quality measurement, objective video quality measurement relies on mathematical computations to evaluate the video quality. The result generated from the objective video quality measurement may be correlated with that from subjective measurement. In this description, VMOS may refer to the result from either subjective or objective video quality measurement.

Objective video quality measurement algorithms may be categorized into three categories, namely full-reference, reduced-reference, and no-reference objective video quality measurement. The major difference among the categories lies in how much information about a reference video is available and used in the objective measurement. The reference video refers to the video that is not compromised by the system under test. For example, if it is desired to measure the performance of the end-to-end system of FIG. 6B from input to the video encoder 6110 to the output of the video decoder 6130, the reference video is the original video input to the video encoder 6110, and the video to be evaluated is the processed video output from the video decoder 6130.

A full-reference video quality measurement algorithm measures the quality of processed video with the presence of a full reference video. Examples of full-reference video quality measurement algorithms include PSNR (Peak Signal to Noise Ratio) and more sophisticated algorithms, such as those standardized in ITU.T J.247 ("Objective perceptual multimedia video quality measurement in the presence of a full reference"). If a full-reference objective quality measurement algorithm is used, the input packets 7130 include packets corresponding to the reference video (referred to as reference video input packets) in addition to packets corresponding to the video under test (referred to as test video input packets). The reference video input packets are used as information in the video quality measurement module 7110 and are not transmitted over the communication link as part of the output packets 7140.

A reduced-reference video quality measurement algorithm uses side information extracted from the reference video, instead of full reference video, in evaluating the quality of processed video. The side information often requires much less bandwidth to transport, so it can be more readily made available than full reference video. Examples of reduced-reference video quality measurement algorithms include those standardized in ITU.T J.246 ("Perceptual visual quality measurement techniques for multimedia services over cable television networks in the presence of reduced bandwidth reference"). If a reduced-reference quality measurement algorithm is used, the input packets 7130 include reference video input packets, which contain information extracted from the reference video, in addition to packets corresponding to the test video input packets. The reference video input packets are used as information in the video quality measurement module 7110 and are not transmitted over the communication link as part of the output packets 7140. The amount of data in the reference video packets used in a system employing reduced-reference video objective quality measurement is much less than the amount of data in the reference video input packets used in a system employing full-reference video quality measurement. This reduces, for example, the traffic over the backhaul (e.g. standard backhaul 170 in FIGS. 1 and 2A or broadband connection 260 in FIG. 2A).

A no-reference video quality measurement algorithm measures the quality of processed video without any information from the reference video. An example of a no-reference video quality measurement algorithm measures the quality of the video after packet discard based on the type of frame in the packet payload and the amount of data discarded. Some examples of such algorithms are described in more detail in the following sections.

The video quality measurement module 7110 measures the quality based on the output packets 7140 which are the packets output by the device after intelligent discard, in addition to the test video input video packets, as well as the reference video input packets, if either a full-reference or a reduced-reference video quality measurement algorithm is used. The impact of dropping a packet to the video quality depends on the output packets 7140. For example, if a packet "A" containing a reference frame has already been dropped, a packet "B" contains a frame which is predicted from that reference frame will have different priority compared with a case when the packet "A" is not dropped.

In various embodiments of the invention, the video quality measurement module 7110 may implement a full-reference, a reduced-reference, or a no-reference objective quality measurement algorithm. Additionally, in some embodiments, the video quality measurement module 7110 may implement multiple types of algorithms. For example, a reduced-reference objective quality measurement algorithm may be used for one video stream and a no-reference objective quality measurement algorithm may be used for another video stream.

Prioritization for Intelligent Discard

As discussed in part above, in MPEG-2, MPEG-4, and H.264-AVC (MPEG-4 Part 10) a video stream is encoded into different types of frames: intra-code frames or I frames, sometimes referred to as Intra frames, predictive-coded frames or P frames, and bidirectionally-predictive-coded frames or B frames. A frame represents what is displayed on the viewing screen at the frame rate of the viewing device. For instance, the NTSC standard used in the United States operates at 29.97 frames per second. The frames are comprised of macroblocks. A macroblock corresponds to a 16×16 pixel region of a frame.

The different frame types have different dependencies which can impact error propagation in the video signal. I frames are encoded such that they are not dependent on any other frames. This causes I frames to typically contain the largest amount of data. P frames are encoded based on an I frame or P frame. This allows encoding of primarily the differences between the current P frame and the I or P frame on which it is dependent. This in turn allows P frames to typically contain less data than I frames, i.e. they are smaller and consume less bandwidth to transmit. However, an error in the frame on which a P frame is dependent will propagate errors into the decoding of the P frame even if it is received error free. B frames are dependent on both a preceding I or P frame and a following I or P frame. This dual dependency allows B frames to typically contain less data than either I frames or P frames, but furthers error propagation. I frames and P frames are often referred to as anchor frames or reference frames.

These dependencies are realized at the macroblock level. I frames only contain I macroblocks which are encoded without dependencies on macroblocks in other frames. P frames may contain I macroblocks or P macroblocks, or both. P macroblocks are encoded based on a previous (or next) I frame or P frame. B frames may contain I, P, or B macroblocks or any combination. B macroblocks are bidirectionally encoded based on both a previous and a subsequent I or P frame.

The pattern of I frames, P frames, and B frames and the associated decode dependencies are referred to as a group of pictures (GOP) or a predictive structure. The ability to predict or the knowledge of the GOP and the relative error propagation or information carrying potential of frames or portions of frames can be used, as described later, to create rules for discarding packets that take into account the degradation in service quality such discard imparts to that service and relative to other services.

In addition, H.264-AVC augments the allowable dependencies with multi-reference predictive structure such that a P frame may be dependent on multiple I or P frames. It also adds hierarchical predictive structures which allow B frames to be dependent on other B frames rather than only I and P frames. Embodiments involving both the baseline implementation and the augmentations are described below.

H.264 is different from earlier standards such as MPEG-2 in that it decouples whether a picture is used as a reference picture (signaled in nal_ref_idc in NAL unit header) from how the picture is encoded (slice_type in slice header). Such a design offers greater flexibility in addition to the hierarchical predictive structure.

H.264 bitstream structure is conceptually specified in two different layers, Video Coding Layer (VCL) and Network Abstraction Layer (NAL). VCL is specified to efficiently represent the content of the video data, while NAL provides network friendly encapsulation of VCL data and ancillary data needed in decoding VCL data. NAL units can be classified into VCL NAL units and non-VCL NAL units. VCL NAL units include coded slice NAL units and coded slice data partition NAL units. Other NAL units are non-VCL NAL units, such as sequence parameter set (SPS) and picture parameter set (PPS), which define the sequence-level and picture-level parameters that are referred to in the coded slices.

Note that H.264 defines a picture as a collective term for a frame or a field in interlaced video, because two fields of an interlaced frame can be encoded separately. Also note that H.264 encodes each picture into one slice or multiple slices. Each slice has its own slice header which includes a syntax element slice type to indicate whether the slice is an I slice, P slice, or B slice, among other slice types. However, apart from some common parameters defined in SPS and PPS, there is no picture header associated with each coded picture. The payload of a VCL NAL unit is a coded slice or coded slice data partition rather than a coded picture. H.264 specification allows that a picture may be encoded into slices of different types, although a practical encoder may encode a picture into slices of the same type. An IDR (Instant Decoding Refresh) picture is a special type of picture. All coded pictures that follow an IDR picture in decoding order can be decoded without inter prediction from any picture that precedes the IDR picture in decoding order. The first picture of each coded video sequence in decoding order is an IDR picture. A slice in an IDR picture can be either an I slice or an SI slice. In some H.264 related discussions in this description, frame and picture are used interchangeably. In this case, a frame is equivalent to a coded picture consisting of slices of the same type. For example, an I frame means a coded picture that consists of only I slices.

Each NAL unit is formed with a 1-byte NAL unit header and NAL unit payload. FIG. 7C shows the structure of a simple H.264 bitstream as an example. In this particular example, the bitstream contains one SPS and one PPS, and the IDR picture only contains one slice. However, there can be one or more instances for each of these NAL units in the bitstream.

The NAL unit header contains three fields: forbidden_zero_bit, nal_ref_idc, and nal_unit_type. This structure of NAL unit header is shown in FIG. 7D along with the bit width of each field. Field forbidden_zero_bit is always zero in a H.264 bitstream. Field nal_ref_idc indicates whether a NAL unit is used in decoding a reference picture. A reference picture is a picture that may be used in decoding subsequent pictures in the decoding order. If nal_ref_idc is zero, it means the NAL unit is not used in decoding subsequent pictures in the decoding order. Field nal_ref_idc should have the same value for all the slices in the same picture. Although field nal_ref_idc has two bits, what is meaningful to an H.264 decoder is whether field nal_ref_idc is zero or non-zero.

NAL units of many different types can have nal_ref_idc set to 0. Examples are, a NAL unit that contains a coded slice of a non-reference picture, a NAL unit that contains a coded slice data partition of a non-reference picture, a Supplemental Enhancement Information (SEI) NAL unit, an Access Unit Delimiter NAL unit, an End of Sequence NAL unit, an End of Stream NAL unit, or a Filler Data NAL unit.

The NAL unit structure used in an H.264 bitstream is also extended to H.264 RTP payload format (H.264 RTP payload format is described in IETF RFC 6184, Y-K Wang, et al., "RTP Payload Format for H.264 Video"). When H.264 data is carried in RTP packets, field forbidden_zero_bit may be set to 1 if it is detected that the NAL unit contains a bit error or syntax violation. Field nal_ref_idc may be set to a value of finer granularity, instead of just zero or non-zero, to indicate the relative transport priority as determined by the encoder or any other device that performs post-processing on the bitstream.

A GOP starts with an I frame and may be characterized by two numbers M, the distances between anchor frames (I or P frames), and N, the distance between I frames. The gaps between anchor frames are filled with B frames. A common GOP structure is the M=3, N=12 open GOP shown in FIG. 8A. The GOP is considered open because the last B frames of the GOP are dependent upon the last P frame of the current GOP and the I frame of the next GOP.

Figure 8A:
FIG. 8A is a diagram of plurality of frames in a group of pictures according to an embodiment.

FIG. 8A shows the viewing order of the frames in a GOP. The viewing order is indicated with the frame numbers 1 through 12. The frame number 1' indicates the first frame in the next GOP. The letter below each viewing order frame number indicates the type of frame, I, P, or B at that frame number. The arrows indicate which frame a particular frame is dependent upon. For instance, frame 4 is a P frame dependent upon I frame 1. Frame 10 is a P frame dependent upon P frame 7. Frames 5 and 6 are B frames dependent on P frames 4 and 7. It can be seen that an error in I frame 1 could propagate through all eleven other frames in the GOP and the last two B frames of the preceding GOP. Worse yet, a loss of frame 1 would make frames 2 through 12 and the last two B frames of the preceding GOP useless to the decoder. Delaying frame 1 past the time it is to be displayed can have the same effect as the loss of frame 1. Conversely, in this example, loss or erroneous reception of a B frame does not propagate errors and affects only the individual B frame. Note that there are modes in H.264 where B frames can be dependent on other B frames creating a more complex hierarchy, but there will be "leaf node" frames on which no other frames are dependent. These leaf nodes are usually indicated by setting nal_ref_idc to zero in their NAL unit header.

In some systems, control and management section 270 addresses this problem of error propagation by applying greater protection to I frames than P frames and B frames, reducing the impact of poor signal quality on the decoder's ability to decode and display the video. However, while beneficial, this causes the I frames, which are already large, to consume even more bandwidth. This approach can also cause problems with out of order transmission of frames which is not supported by many video decoders.

In other systems, the control response module 340 can respond by dropping frames. One approach is for the control response module 340 to select a frame to drop based on the types of frames being transmitted. For example, given the choice between I, P, and B frames, the control response module can be configured to drop B frames before P frames and P frames before I frames. The decision of which frame amongst several of the same type can be made, for example, at random. For an H.264 video stream, field nal_ref_idc in NAL unit header can be checked so a NAL unit with nal_ref_idc equal to 0 is discarded before a NAL unit with nonzero nal_ref_idc. NAL units of many different NAL unit types can have nal_ref_idc set to 0. In one embodiment, Filler Data NAL units, if they are present, can be discarded before NAL units of other NAL unit types. In another embodiment, among the NAL units with nal_ref_idc equal to 0, the non-VCL NAL units may be discarded before VCL NAL units. A NAL unit, referred to as "NAL_c" for the purpose of discussion, originally with nal_ref_idc equal to a non-zero value may be no longer used in decoding a reference picture, after the NAL units that depend on "NAL_c" are discarded. In one embodiment, the control response module 340 may modify the nal_ref_idc value of NAL unit "NAL_c" from a non-zero value to zero.

In contrast, in other embodiments described herein, the control response module 340 analyzes and takes advantage of the frame dependencies to preserve the quality of the experience (QoE) of the viewer while intelligently degrading the quality of service (QoS) of the transmission of the video data to use less bandwidth to react to congestion in the transmission medium or to allow more video or data services on the medium simultaneously.

In one embodiment, the control response module 340 goes beyond mere classification of I, P, and B frames and determines the relative importance of the frames. As described above, there is an importance attributable to error propagation and the ability for the encoder to use a subsequent frame. But, there is also an element of importance based on the distribution of frames that have equal error propagation importance. These will both be described with reference to FIG. 8B. After the determination of the relative importance of frames, the decision of which frame to drop may be made for a video stream individually. Alternatively, as will be described later, the control response module 340 can consider not just the impact of a dropped frame on a single stream but may consider the relative impact of dropping a frame from one or the other of two different streams, choosing to drop the one with the least overall impact.

Figure 8B:
FIG. 8B is a diagram of plurality of frames in a group of pictures according to an embodiment.

FIG. 8B shows the same GOP with the same dependencies that was used in FIG. 8A. In addition, in a column with each frame order number and frame type are values indicative of priority, burden, and alternative formulations of burden. In one embodiment, the priority, burden, and alternative burden values are determined by the determining module 744. The manner in which the priority and burden values are determined by the determination module 744 are described in greater detail below.

In some embodiments, the frame priority and burden values shown are suitable for marking, for instance by a deep packet inspection (DPI) device preceding the transmitting device. Thus, the functionality described herein with respect to the determining module 744 may be performed by another device including a device other than a device comprising the system described with respect to FIG. 3. In such a case, the selection module 746 uses the previously determined priority burden values to select the frames to be dropped. However, for the purpose of explanation, the priority and burden determination functionality is described with respect to determination module 744. In some embodiments the described functionality of determination module 744 may be contained and implemented in Real-Time Profile Modules 325 or may advantageously have its functionality distributed between the Environment Parameters Module 320, which may for instance determine that a data stream is a video stream, the Real-Time Profiles Module 325, which may for instance make real-time assessment of a video frame's priority, and Patterns Module 335, which may for instance determine the GOP structure through observation over time.

In the present description, a lower priority number indicates a greater frame importance, although it should be clear that the reverse relationship could be used. These priorities indicate a relative importance that would allow the transmitting device to intelligently discard frames when faced with congestion or oversubscription of the transmission medium. Frames with a higher priority number are discarded in preference to frames having a lower priority number.

With respect to the GOP of FIG. 8B, in one embodiment, the I frame is necessary to be transmitted for all other frames to be useful, so the determination module assigns the I frame at frame 1 a priority value of 1. The P frames chain their dependence off of the I frame, so the determination module assigns the first P frame a lower priority (higher number) than the I frame, but a higher priority (lower number) than the subsequent P frame. Following this pattern, the determination module gives the P frames in the GOP the priority numbers 2, 3, and 4 respectively. One skilled in the art would recognize that lower priority numbers could instead map to lower actual priorities, and higher priority numbers could map to higher actual priorities.

In one embodiment, since a B frame is dependent upon other frames, the determination module assigns the B frame a lower priority (higher number) than any frames on which they are dependent. This works well for B frames numbered 8, 9, 11, and 12 in the transmission order since they are all dependent upon P frame number 10 which has priority 4 and is the lowest priority P frame. However, B frames numbered 2 and 3, are less important than P frame 4 as well, even though they don't depend on it. This is for two reasons. First, as previously described, discard of B frame 2 or B frame 3 does not propagate errors while discard of P frame 4 requires the discard of B frames 8, 9, 11, and 12 as well. Second, the P frames are evenly distributed in the GOP. Discarding P frames tends to cause numerous frames in a row to be missing, not merely one in a row. So, in one embodiment, the determination module assigns B frames lower priority (higher numbers) than any P frames.

Importantly, all B frames are not themselves entirely equal in importance. In particular, the importance of a B frame can change based on whether or not an adjacent B frame is discarded. This occurs because, under certain circumstances, dropping multiple consecutive frames has a worse effect on video quality than dropping frames that are not consecutive. For example, if B frame 5 were discarded, then subsequently discarding B frame 6 would lead to 2 frames in a row being discarded. However, a subsequent discard of B frame 12 instead would not cause this to occur.

Advantageously, the determination module can predict and account for this change in importance. To do so, in one embodiment, the determination module assigns an initial priority number of 5 to all B frames in the GOP. However, where there are consecutive B frames, the B frame having a higher frame number in the GOP is assigned a lower priority (higher number) by the determination module. Thus, in the example of FIG. 8B the determination module assigns the B frames alternating priorities of 5 and 6 to predict their change in importance after a neighboring B frame is discarded. In another embodiment, the determination module assigns all B frames the same priority values and the selecting module 746 could select B frames for discard uniformly rather than in clusters if and when discard was necessary.

The functionality of the determining module for determining priority can be summarized as follows: An I frame is assigned priority 1. A P frame dependent on frame with priority y, is assigned priority y+1. If z is the largest priority number of any P frame then either: all B frames are assigned priority z+1, or B frames between two anchor frames are assigned priorities z+1, z+2, . . . z+(M−1), where M is the spacing between anchor frames. Alternatively, B frames between two anchor frames are assigned priorities z+(M−1), z+(M−2), . . . , z+1.

In another embodiment, the determination module can determine the importance of a frame based, at least in part, on how many other frames are dependent upon it. For instance, the I frame at position 1 in the GOP of FIG. 8B has 13 other frames that are directly or indirectly dependent upon it. This includes the other 11 frames in this GOP and, since this GOP is open, the last two B frames of the previous GOP which depend on the I frame. The B frames all have 0 other frames dependent upon them. The P frames 4, 7, and 10 have 10, 7, and 4 frames dependent upon them, respectively. This value determination based on dependency is referred to herein as burden. FIG. 8B shows the burden values for the frames in the GOP.

Figure 9:
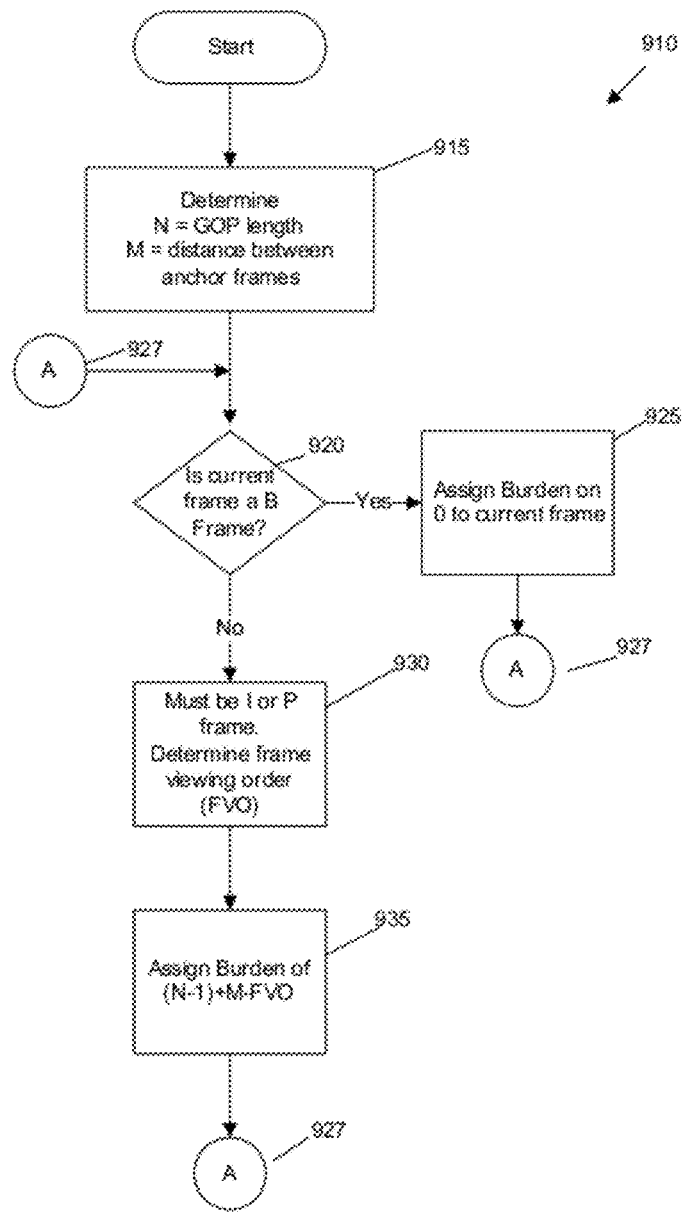
FIG. 9 is a flow diagram of a method for determining priority for frames in a group of pictures according to a embodiment.

FIG. 9 describes one embodiment of a method 910 for determining burden for frames in a GOP. As described above, the method may be implemented by the determination module 744. In another embodiment, the method may be implemented by another device or module. For the purpose of explanation, the method is described with respect to the determination module. At step 915, the determination module determines the value N, the number of frames in the GOP, and M the distance between anchor (I or P) frames in the GOP. In the example GOP of FIG. 8B, N=12 M=3. This determination can be made by analyzing the frames in the GOP. Alternatively, if these values have previously been determined, the determination module can obtain the previously determined values.

At decision step 920, the determination module determines if the current frame being considered is a B frame. If so, the method proceeds to step 925 and the determination module assigns the current B frame a burden of 0. In one embodiment, the assigned burden can be stored in a data structure associated with the frame or the GOP. After the assignment, the next frame in the GOP is made the current frame and the method returns to point 927 before decision step 920.

Returning to decision step 920, if the current frame is not a B frame, the method proceeds to step 930. At step 930 the determination module determines the frame viewing order (FVO) of the current frame. Again this value can be determined by analyzing the frames in the GOP or by obtaining a previously determined FVO. At step 935 the determination module assigns a burden to the current frame equal to the result of equation 1:

$$\text{Burden}=(N-1)+M-FVO \qquad \text{Eq. 1})$$

After the assignment, the next frame in the GOP is made the current frame and the method returns to point 927 before decision step 920. This process continues until the determination module has assigned a burden value for each frame in the GOP.

As shown in FIG. 8B, when determining burden, the determination module may alternatively count each frame as burdening itself as well. In this embodiment, the determination module assigns a burden of 1 to each B frame. The anchor frames are assigned a burden according to equation 2:

$$\text{Burden}=N+M-FVO \qquad \text{Eq. 2)}$$

Using either burden calculation, the selection module 746 can intelligently select frames for discarding by discarding those with the lowest burdens first. For frames with the same burden, the selecting module can discard uniformly, i.e., not clumps of adjacent frames, when discard is needed. Alternatively, the selecting module can select between frames of the same burden for discard based on size. For instance, two B frames may be of different sizes because one contains more I or P macroblocks than the other does. If available bandwidth resources allows transmission of the larger B frame, the selection module can preferentially select for discard the smaller B frame over the larger B frame since it contains less information and its loss should, therefore, degrade the video quality less than discarding the larger B frame. However, if available bandwidth resources will not accommodate transmission of the larger B frame due to its size, the selection module can discard the larger B frame instead of the smaller B frame.

Figure 10:
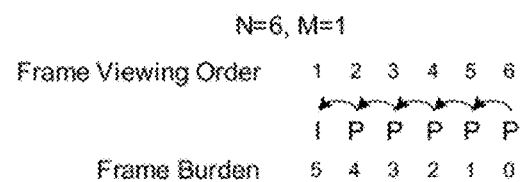
FIG. 10 is a diagram of plurality of frames in a group of pictures according to an embodiment.

FIG. 10 illustrates a GOP that does not contain any B frames. The method described above with respect to FIG. 9 works with these types of GOPs such as those from MPEG-1 and the H.264-AVC baseline profile, or MPEG-2, MPEG-4, or H.264-AVC GOPs for applications that do not want the extra decoding delay caused by B frames. These frames are inherently not open since there are no B frames to have bidirectional dependencies. The determination module can use the same methods for analyzing this type of GOP.

Figure 11A:
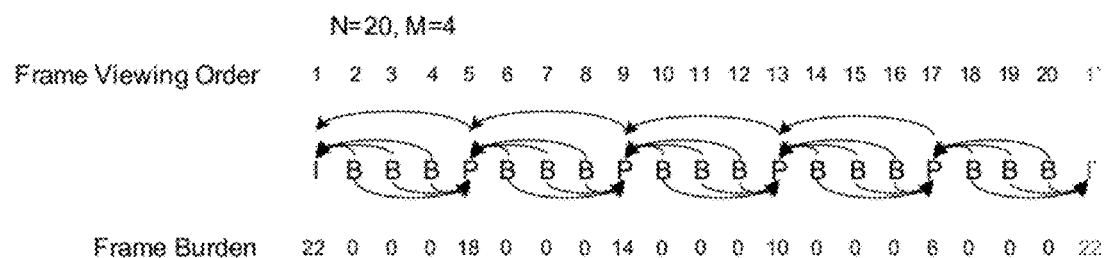
FIG. 11A is a diagram of plurality of frames in a group of pictures according to an embodiment.

FIG. 11A illustrates another type of GOP three B frames between anchor frames (M=4). The method described above with respect to FIG. 9 works with these types of GOPs as well. In particular, the determination module can use the same methods for analyzing this type of GOP.

For an H.264 bitstream, nal_ref_idc in NAL unit header may have been set by the encoder to indicate the transport priority of the NAL unit. For example, RFC 6814 recommends that an encoder should set nal_ref_idc to 3 for SPS (sequence parameter set), PPS (picture parameter set) and coded slice of an IDR picture, to 2 for non-IDR coded slice of a reference picture and coded slice data partition A of a reference picture, and to 1 for coded slice data partition B or coded slice data partition C of a reference picture. In one embodiment, the nal_ref_idc value is used by the priority/burden determination module 744 in determining the priority or burden of a video packet. For example, the priority determination module 744 sets a P slice with nal_ref_idc equal to 0 to a lower priority than a P slice with nal_ref_idc equal to 2. In one embodiment where nal_ref_idc is set to a multiplicity of values, priority/burden determination module 744 forwards the setting of nal_ref_idc to frame/slice selection module 746 to use in choosing frames or slices for discard.

As discussed above, the value of nal_ref_idc that is meaningful to an H.264 decoder is zero or non-zero, so it is common for an encoder to choose a single nonzero value, such as 1, for any nonzero nal_ref_idc. In one embodiment, the control response module 340 modifies nal_ref_idc to reflect the transport priority of the packets more accurately, if it was not originally set properly by the encoder. This will help other functions in the transmission system 6120 which uses the priority of the video packets. For instance, the modified nal_ref_idc may be used by frame/slice selection module 746 in choosing frames or slices for discard.

Figure 11B:
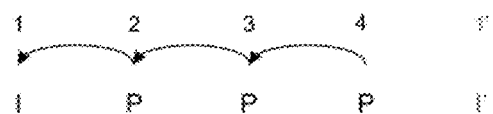
FIG. 11B is a diagram illustrating an example group of pictures with four frames including one I frame and three P frames.

In another embodiment, nal_ref_idc is modified in the control response module 340 to reflect the transport priority of the packets more accurately, if some leaked packets are discarded. FIG. 11B illustrates a GOP of four frames including one I frame and 3 P frames. Assume that nal_ref_idc is set to 2 in all slices of frame 3. If frame 4 is discarded, nal_ref_idc in all slices of frame 3 is lowered. This will help other functions in the transmission system 6120 which use the priority of the video packets, such as frame/slice selection module 746.

Hierarchical and Multi-Reference Predictive GOP Structures

As previously mentioned, there exist features within standards such as H.264-AVC which allow for hierarchical or multi-reference GOP prediction structures. In the case of a hierarchical GOP, B frames can depend on previous and/or subsequent B frames. The use of multi-reference GOPs allows P frames to depend on one or more P or I frames.

Figure 12:
FIG. 12 is a diagram of plurality of frames in a group of pictures according to an embodiment.

FIG. 12 illustrates one example of a hierarchical GOP. In particular, FIG. 12 shows a 12 frame (N=12) hierarchical GOP structure in viewing order. The sequence begins with an I-frame, and being an open-GOP, includes references to the I-frame, 1', of the next GOP. There are no P frames and a subset of B frames reference other B frames. For example, B4 references both I1 and B7, and B3 references I1 and B4. The hierarchical set of relationships creates a distinction of purpose and importance among B frames not seen when analyzing non-hierarchical GOPs. This provides additional information for the determination module to consider when analyzing the propagation of errors through a GOP and when calculating frame burden and priority.

For example, in one embodiment, the control response module 340 can require that a single B frame be discarded to meet available capacity, then frames B2, B3, B5, B6, B8, B9, B11 or B12 would be preferable to frames B4, B7 and B10 since the former list contains all 'leaf' nodes whose discard would have no effect on subsequent frames. In this embodiment, the control response module 340 discards a leaf node instead of a node from which other frames depend. In one embodiment, after some leaf nodes are discarded, a frame which used to have nal_ref_idc equal to a nonzero value may no longer have any frame depending on it. In this case, the control response module 340 may set nal_ref_idc of all NAL units corresponding to this frame to zero.

Figure 13:
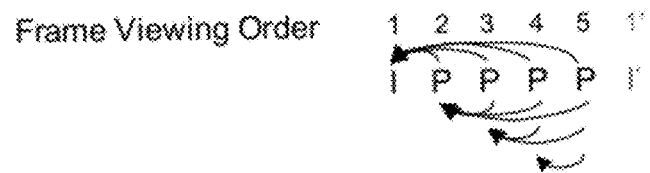
FIG. 13 is a diagram of plurality of frames in a group of pictures according to an embodiment.

FIG. 13 illustrates one example of a multi-reference GOP. In this example, frame P2 has just one reference frame, I1. However frame P3 references two preceding frames, P2 and I1. Frame P4 references P3, P2 and I1. These additional references improve the data compression and reduce the size of the later P frames within the GOP.

Figure 14:
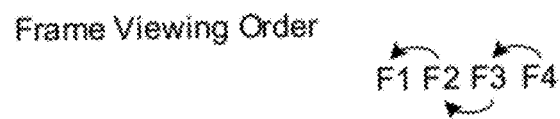
FIG. 14 is a diagram of plurality of frames in a group of pictures according to an embodiment.

In one embodiment, the determination module applies an alternative determination process to hierarchical and multi-reference GOP structures such as the GOPs of FIGS. 12 and 13. In one embodiment, the determination module assigns a burden to each frame based on the quantity of frames dependent on it, within a GOP. In making this assessment, the determination module considers two classes of dependencies: direct and indirect. FIG. 14 illustrates a set of 4 generic frames F1-F4 for the purpose of discussion. Frame F2 is considered a direct dependent of Frame F1 since Frame F2 directly references Frame F1 for the decoding of its information. Frame F3 is a first level, indirect dependent of Frame F1 since Frame F3 references Frame F2 directly and Frame F2 references Frame F1 directly. By extension, Frame F4 is a second level, indirect dependent of Frame F1.

Figures 15, 16:
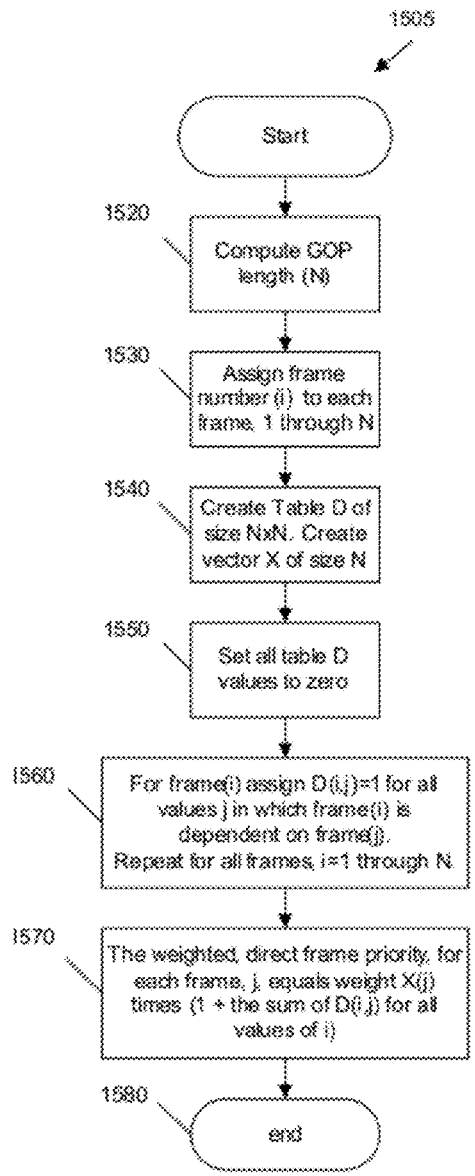
FIG. 15 is a flow diagram of a method for determining burdens for frames in a group of pictures according to a embodiment.
FIG. 16 is a diagram of a weighting factor vector according to an embodiment.

FIG. 15 illustrates a method 1510 for calculating direct frame burden. As described above, the method may be implemented by the determination module 744. In another embodiment, the method may be implemented by another device or module. For the purpose of explanation, the method is described with respect to the determination module.

At step 1520, the determination module calculates N, the length or size of the GOP currently being processed. At step 1530, the determination module assigns a frame number to each frame, beginning at 1 for the leading I frame. In one embodiment, these frame numbers are the frame viewing order of the frames. At step 1540, the determination module creates a table, D, of size N by N for storing intermediate burden information. The determination module also creates a weighting vector, X, of size N. In another embodiment, the determination module utilizes an existing table and vector instead of creating new ones. At step 1550, the determination module initializes the table D by zeroing out each of its values. In another embodiment, the table may have been previously initialized.

At step 1560 the determination module creates a mapping between frames which are directly dependent on each other in the table D. In particular, for each frame, i, in the GOP, the determination module inspects and records the dependencies on all other frames, j, in the GOP. Once a dependency of frame i on frame j is identified, a value of one is assigned to table D at position (i,j), where i denotes the column and j denotes the row. For example, if frame 2 is the current frame under consideration (i) and depends on frame 1 (j), the determination module assigns a value of one in table D at position (2,1). One skilled in the art would recognize that the notation D(i,j) with i as the column and j as the row is logically equivalent to the notation D(j,i) as long as the notation is used consistently throughout the algorithm.

At step 1570 the determination module determines weighted direct frame priority for each frame. In particular, for each frame j, the determination module sums the values of table D(i,j) for all values of I and adds one. This sum is the number of direct dependencies on frame j. The determination module then multiplies the sum by the weight X(j) from the weighting vector X. The resulting values can be stored in a length N vector by the determination module. The values in this result vector represent the weighted, direct frame priority of the frames in the GOP.

FIG. 18 illustrates a direct frame burden table D. Table D of FIG. 18 was generated according to the method described with respect to FIG. 15 using the GOP shown in FIG. 12. As shown, each entry (i,j) in table D indicates whether frame (i) depends from frame (j). For example, since frame B3 is dependent on B4 in this GOP, a value of one is located at D(3,4). The resulting weighted, direct priority for each frame j, is also shown in FIG. 18. The result is the sum of the values for that that frame, i.e., the sum of the ones in that frame's row of table D, plus one, multiplied by the corresponding weight from weighting vector X shown in FIG. 16. As shown, Frame I frame I1 has the highest priority. However, in contrast to the burdens of B frames generated by the determining module according to the method described above with respect to FIG. 9, the burdens of the B frames shown in FIG. 18 are based upon the number of dependencies. Accordingly, the determination module assigns the B frames burdens of 1, 5 or 7 units.

In one embodiment, the determination module at step 1560 considers each frame to be dependent upon itself. In this embodiment, at step 1570 the determination module does not need to add one to the summation from table D.

In another embodiment, direct frame burden table D is replaced with a 1×N vector D' by the determination module. In this embodiment, at step 1590, the determination module increments D'(j) by one for each frame i that is dependent on frame j. The weighted, direct priority for frame j is then calculated by multiplying D(j) by X(j) for each element j.

As described, the method 1505 results in a relative description of priority between frames based on at least two factors: (1) the quantity of directly dependent frames and (2) the frame weight. The weighting vector X(j) may be created in a number of ways.

For example, in one embodiment, weighting vector X comprises values such that the weight assigned to I frames are larger than P frames, which in turn are larger than B frames. FIG. 16 illustrates a weighting vector X with this structure for the GOP shown in FIG. 12. In this example, weighing vector X has a value of 3 for I frames, 2 for P frames and 1 for B frames. Thus frame 1, the only I frame, is assigned a value of 3 and the remainder of the frames which are all B frames are assigned a value of 1.

In another embodiment, weighting vector X comprises values based upon the size of the frames. It some situations, it is advantageous to increase the priority of larger frames as they most likely contain additional scene detail or motion when compared to smaller frames. The use of size in weighting can be done independently of the type of frame (I, B or P) or both size and type of frame may be considered. For example, with reference to the GOP of FIG. 12, leaf frames B5 and B6 may contain important scene detail or motion. In this case, the sizes of these B-frames would be larger than the remaining leaf and non-leaf B frames. The weighting vector X can account for this by increasing the weighting values corresponding to frames B5 and B6.

In one embodiment, the weighting vector is assigned relative weights (for example 1-10) based upon the relative or absolute size of the frames. In one embodiment, the assignment is made using a closed form expression, a histogram function, or another type of function. In one embodiment, the assignment function creates weights of either integer or real number form. The function can be linear or non-linear.

FIG. 17 illustrates a weighting vector X where the weighting values incorporate the size of the frames as discussed above. The weighting vector corresponds to the GOP shown in FIG. 12. As can be seen in FIG. 17, frame I1 has the largest weight due to its size. Non-leaf node frames B7, B4 and B10 have weights larger than 1 due to the larger encoded size of these frames. Because leaf nodes B5 and B6 contain substantial amounts of detail or motion, their larger size results in weights higher than all other B frames.

Figure 19:
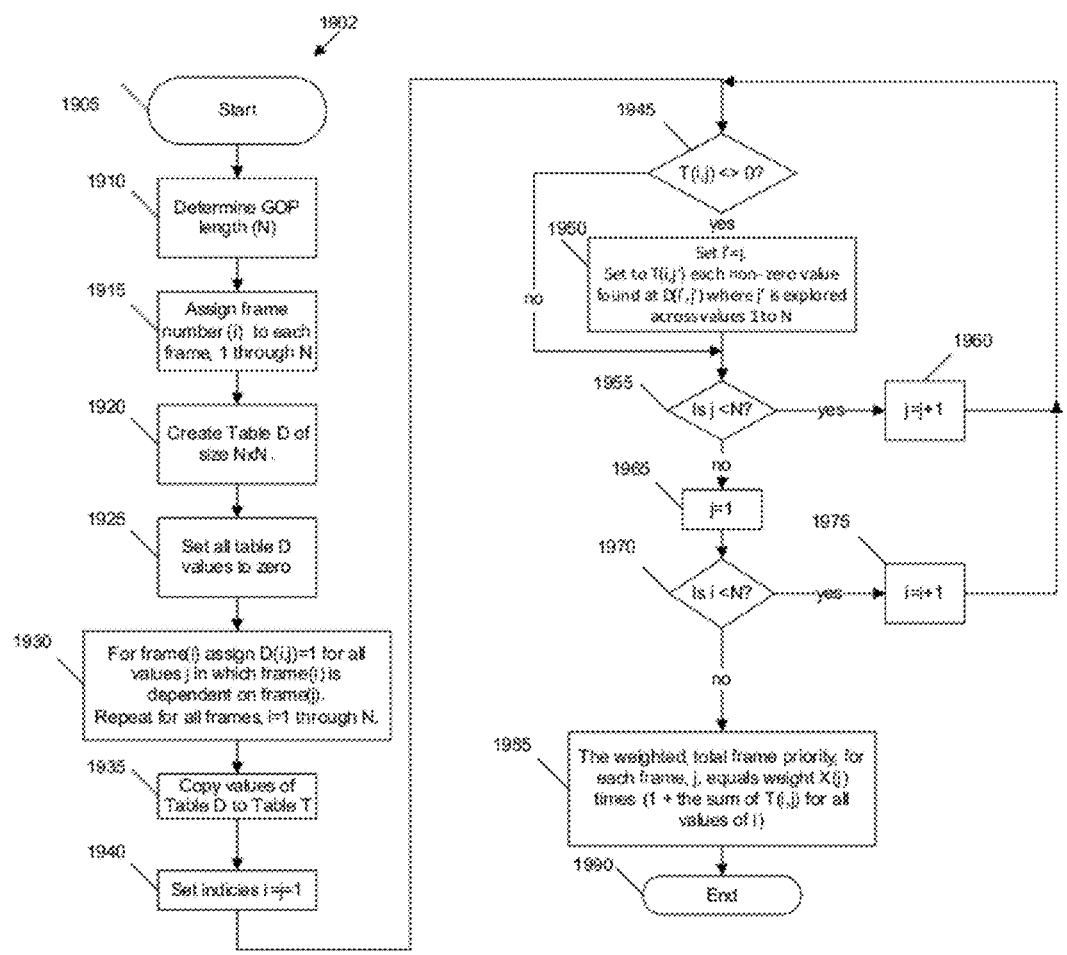
FIG. 19 is a flow diagram of a method for determining burdens for frames in a group of pictures according to an embodiment.

FIG. 19 illustrates a method 1902 for determining burden based on both direct dependencies and indirect dependencies. As described above, the method may be implemented by the determination module 744. In another embodiment, the method may be implemented by another device or module. For the purpose of explanation, the method is described with respect to the determination module.

Steps 1905, 1910, 1915, 1920, 1925, and 1930 are similar to the corresponding steps of method 1505 described in relationship to FIG. 15. For details on the implementation of these steps, refer back to the description with respect to FIG. 15. Continuing at step 1935, the determination module creates a total burden table T. The determination module copies the values of the table D, generated at step 1930, into table T. The total burden table T is an N×N table that the determination module uses to determine the effect of both direct and indirect dependencies on burden. For example, with respect to the GOP of FIG. 12, the determination module 744 uses this trace-back approach to account for the dependence of Frame B9 on Frame I1 (via B7). In particular, the determination module includes the burden of Frame B9 on Frame I1 in the burden value of Frame I1. In one embodiment, the determination module uses a trace-back approach in order to account for the indirect dependency of one frame on another.

Figures 20, 21:
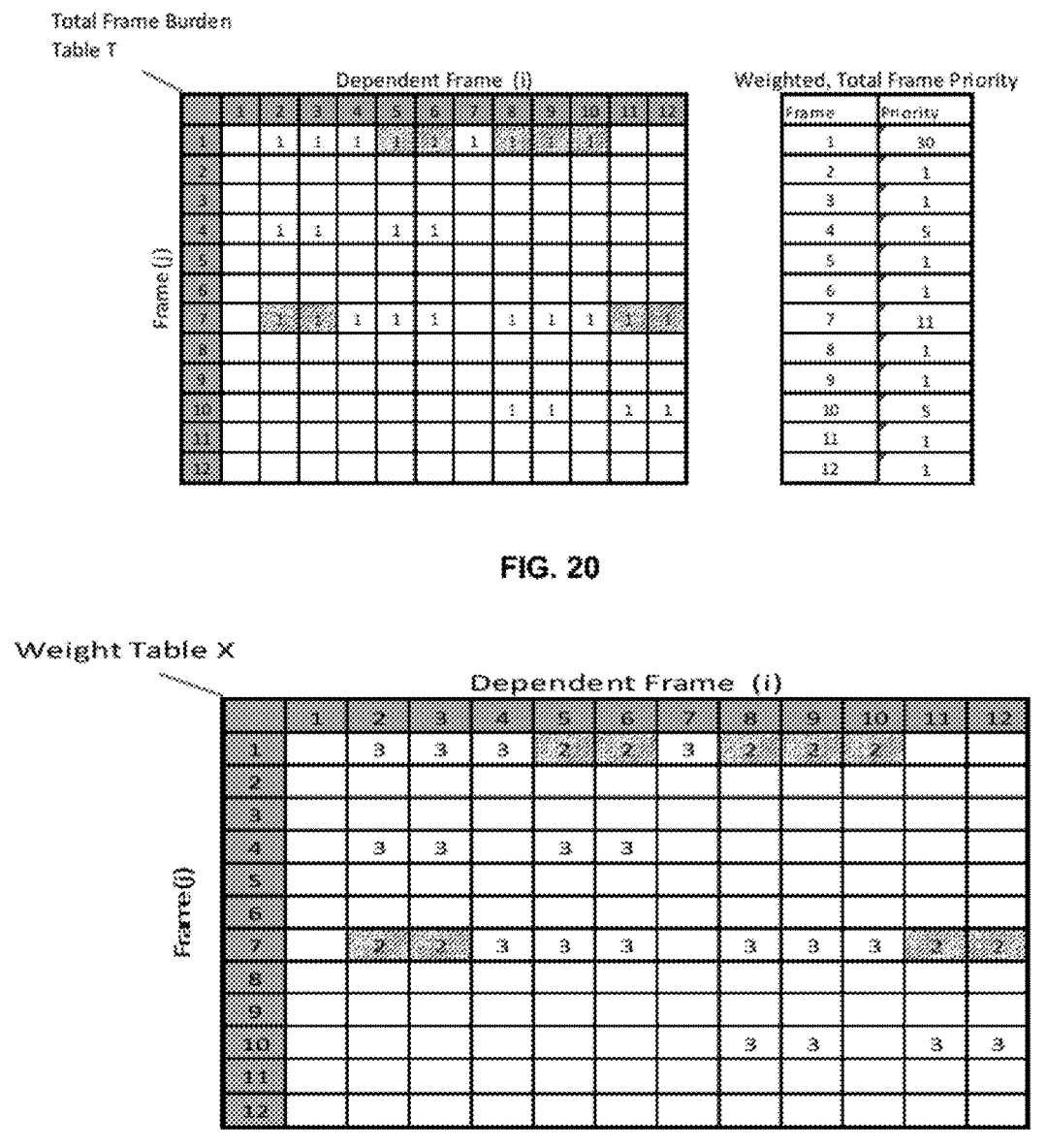

At step 1940, the determination module sets the values of its two indices, i and j equal to 1. At step 1945, the determination module determines if the value of table T at position (i,j) is greater than zero. In this manner, the determination module determines if the frame j has a dependent frame. If so, the method proceeds to step 1950. In step 1950, the determination module determines for the frame, j, using a dependent indirect burden table, D, if the frame j itself is dependent on any other frames. If so, then the dependent frame of frame j is included in the burden of the frame for which j is a dependent. For example, using the GOP referenced in FIG. 12 and table D of FIG. 18, the direct dependence of frame B9 on B7 is indicated in the direct burden table D as a value of D(9,7) equal to 1. At step 1250, the determination module determines if B7 itself is dependent on any frame. The determination module performs this process by searching column 7 of table D for the existence of any entries greater than zero. In this example, a 1 is found at table location D(7,1) indicating that frame B7 is dependent on frame I1. Therefore, by definition, frame B9 is a first level, indirect dependent of frame I1. This information is recorded by placing a 1 into total burden table T at position T(9,1). FIG. 20 shows the total frame burden table T described with respect to FIG. 19. The shaded values in table T indicated indirect dependencies captured by the determination module utilizing the method of FIG. 19.

Continuing from step 1950, or if the result of decision step 1945 is no, the method proceeds to step 1955. At step 1955, the determination module compares the index j to the value N. If j is less than N, the method proceeds to step 1960. At step 1960 the determination module increments the index j by one and the method returns to decision step 1945. Returning to decision step 1955, if the index j is not less than N, the method proceeds to step 1965. At step 1965 the determination module sets the index j equal to 1. Continuing at step 1970, the determination module determines if the index i is less than N. If i is less than N, the method proceeds to step 1975. At step 1975 the determination module increments the index i by one and the method returns to decision step 1945. Returning to decision step 1970, if the index i is not less than N, the method proceeds to step 1985.

The effect of steps 1940, 1955, 1960, 1965, 1970, and 1975 is for the determination module to evaluate the dependencies of the GOP using a two level 'nested' loop. Thus, the determination module explores all of the values in direct burden table D for tabulation in total burden table T.

The nested loops are complete after the determination module reaches a 'no' decision in step 1970. At that point, total burden table T contains the direct and first level indirect frame relationships between all GOP frames. At step 1985, for each frame j, the determination module sums the values of table T(i,j) for all values of i, adds one, and then multiplies the result by weight X(j). Note that adding one causes the burden to be non-zero, thereby allowing differentiation through different weights. For instance if two B frames with no dependencies (same burden) had different weights (e.g. if they were different sizes) not adding one would cause the burdens to be zero causing the product of the burden and the respective weights to be zero for both B frames. However adding 1 allows the product of the burdens and the weights to be not equal for the two B frames. The resulting N length vector is the weighted, total frame priority for the GOP. The total frame priority determined by the determination module is shown in FIG. 20 where the weighting vector used is the weighting vector shown in FIG. 16.

The 'trace-back' method described with respect to FIG. 19 will calculate the frame burden based upon the direct dependencies and a single level of indirect dependency. One skilled in the art will appreciate that this method could be extended to include the effect of all indirect dependencies, without limit to the number of dependency levels. In other words, the 'trace-back' can be designed such that the determination module follows dependencies from root to leaf nodes.

One embodiment to extend the dependency tracking is for the determination module to create n−1 additional burden tables T2, through Tn where each burden table represents the cumulative representation of all dependencies from direct dependencies through nth level indirect dependencies. For example table T3 would represent direct dependencies plus all first, second, and third level indirect dependencies. In terms of the method of FIG. 19, step 1935-1975 would be performed by the determination module for each table Tn. In those steps, the Tn takes the place of table T and table T(n−1) takes the place of table D. The determination module would finish generating tables once all the elements of a table Tn were equal to all the elements of a table T(n+1), i.e., no new dependencies are identified by the creation of an additional burden table, T(n+1).

In another embodiment, the determination module can take into account duplicate dependencies. For example, as depicted in the table of FIG. 18 based on the GOP of FIG. 12, the methods described above do not result in an increased frame burden if more than one dependency path exists between frames. For example, Frame I1 is awarded 1 unit of burden due to a dependent frame, B3, despite the fact that there are two dependency paths between I1 and B3. One is direct; the other is indirect via frame B4. In one embodiment, the determination module accounts for these duplicate references in order to further amplify the differences among frame burdens. For example, in the case above, frame I1 would be awarded one additional unit of burden due to the second, duplicate reference between frame B3 and I1.

The methods described with respect to FIGS. 15 and 19 consider intra-GOP dependency. In other embodiments the determination module can also consider inter-GOP dependencies present in an open GOP structure.

As described above, multiple approaches can be used to create a useful weight vector X for use by the determination module in calculating total frame priority. For example, as previously described above with respect to FIGS. 16 and 17, weights could be assigned based upon frame type (I, P or B), by frame size or some combination of the two.

In another embodiment, the weight vector is extended into the form of a weight table X, of size N×N. In this approach, additional information about frame dependency is considered when assigning weight and calculating priority. In one embodiment, weights are applied to dependencies based upon the 'directness' of the relationship between the frames being considered. That is, the weight applied to direct dependencies is larger than the weight applied to indirect dependencies. In another embodiment, first level, indirect dependencies are weighted higher than second level, indirect dependencies. Similarly, second level indirect dependencies are weighted higher than third level, and so on.

For example, weight values of 3, 2 and 1 can be applied to direct dependencies, first level indirect dependencies and second level indirect dependencies, respectively. FIG. 21 illustrates a weight table X for using this weighting scheme for the total frame burden table T of FIG. 20.

The weight table X of size N×N can replace weight vector X of size N in Step 1985 of FIG. 19. When using weight table X, the weighted total frame priority can be calculated for each frame j by summing the product of T(i,j)*X (i,j) for all values of i, from 1 to N.

Advantageously, this approach takes into account that error propagation may be mitigated by I macroblocks as frame errors propagate through the GOP. Thus the importance of dependencies may be reduced as the level of 'directness' between frames is also reduced.

Slices

In MPEG-2, MPEG-4, and H.264 frames may be further broken into slices. Slices contain an integer number of macroblocks all from the same frame. The dividing of a frame into slices can be implemented by using a single slice for a frame. A frame can also be divided into j slices, each containing a fixed number of macroblocks. Alternatively, a frame may be divided into k slices, each containing a variable number of macroblocks. The macroblocks within a slice are not dependent on the macroblocks in other slices from the same frame. If a slice is less than an entire frame, loss of the slice will impact the quality of the video less than the loss of the entire frame.

As with frames, there are I slices, P slices, and B slices. I slices only contain I macroblocks which are encoded without dependencies on macroblocks in other frames. P slices may contain I macroblocks or P macroblocks, or both. P macroblocks are encoded based on a previous (or next) I frame or P frame. B slices may contain I, P, or B macroblocks or any combination. B macroblocks are bidirectionally encoded based on both a previous and a subsequent I or P frames.

The same prioritization method, described previously for frames, can be applied to slices. For instance an I slice that is part of an I frame could be assigned the same burden and priority as the original I frame by the determination module. Similarly, the burden and priority for a P slice could be assigned the same burden and priority as the original P frame. The burden and priority for a B slice could be assigned the same burden and priority as the original B frame.

Since the macroblocks in one slice of a frame can be decoded independent of the macroblocks of the other slices comprising a frame, prioritizing slices allows a finer grain discard during times of congestion or other times when a reduction in data rate is necessary or beneficial.

In addition to prioritizing based on burden and frame or slice type, the determination module can further differentiate slices with the same burden based on the relative quantity of each variety of macroblock they contain. For example, if two P slices have the same burden, the P slice with more I macroblocks and fewer P macroblocks may be given priority over a P slice with fewer I macroblocks or more P macroblocks. Alternatively, the fine grain priority adjustment may be based on ratio of I macroblocks to P macroblocks within the slice. A similar fine grained priority adjustment can be applied to B slices based on the count or ratio of I, P, and B macroblocks. In another embodiment, since I macroblocks typically contain more data than P macroblocks and P macroblocks typically contain more data than B macroblocks, the determination module can adjust priority based on the average size of the macroblocks contained in the slice. This can be calculated by dividing the size of the slice in bytes by the number of macroblocks in the slice.

In one embodiment, the determination module implements a scoring system. For example, the determination module can apply an adjustment that accounts for the differences in macroblocks in slices of the same priority level or burden while not allowing slices to cross to a different priority level or burden. In one embodiment, the determination module uses a number such that adding or subtracting the number from a priority value moves the priority value less than half way to the next lower or higher priority. If the difference between priority levels is the integer value 1, then any number x greater than zero, but less than 0.5 could be used. For example, x could equal 0.4.

Figure 22:
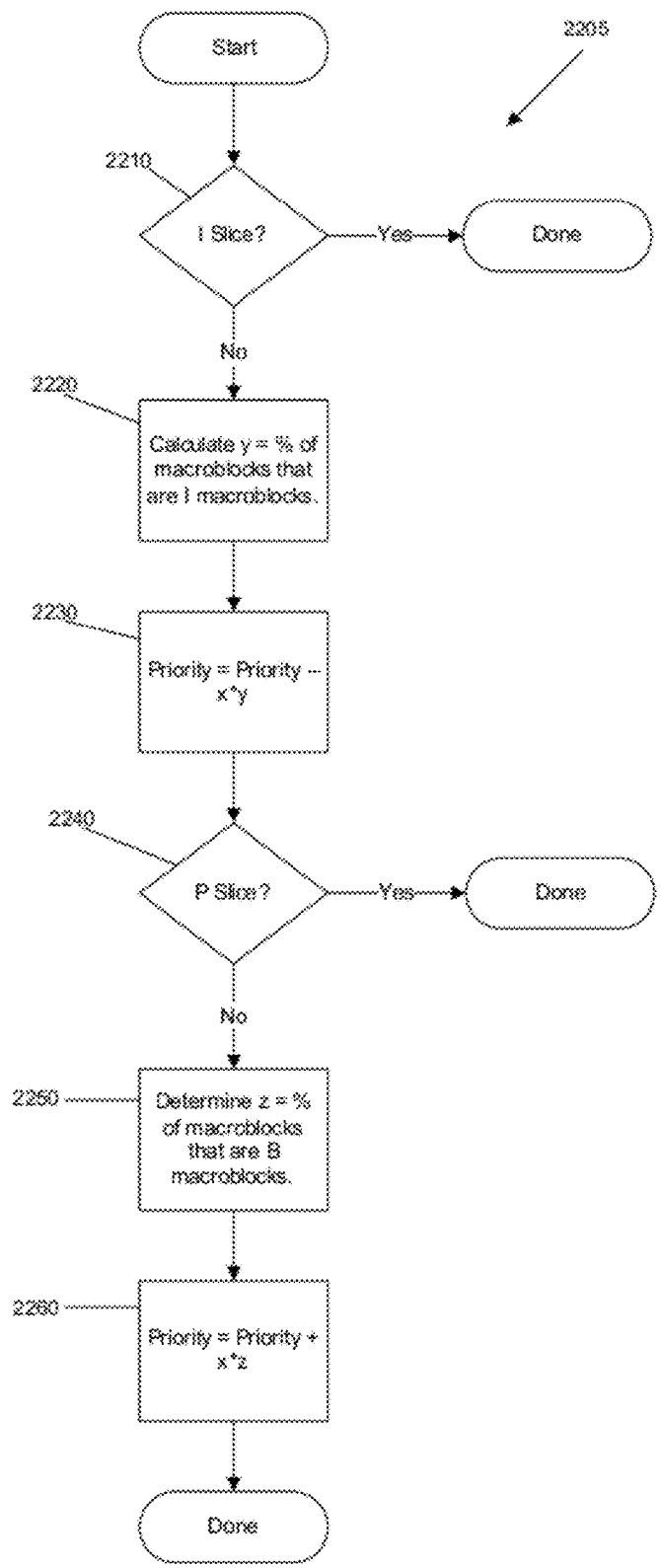
FIG. 22 is a flow diagram of a method for determining priority of a frame according to an embodiment.

FIG. 22 illustrates a method 2205 for modifying the priority of a slice based on the macroblocks in the slice. As described above, the method may be implemented by the determination module 744. In another embodiment, the method may be implemented by another device or module. For the purpose of explanation, the method is described with respect to the determination module. Further, in the present description, a lower priority numbers means a higher priority. One skilled in the art would recognize that this method can also be used for modifying the priority of a frame based on the macroblocks in the frame.

At decision step 2210 the determination module determines if a current slice in the frame is an I slice. If so, the evaluation of the current slice ends and the next slice is considered. If the current slice is not an I slice, the method proceeds to step 2220. At step 2220 the determination module determines a value, y, that is the percentage of macroblocks in the current slice that are I macroblocks. Continuing at step 2230 the determination module adjusts the priority of the current slice by multiplying x and y and subtracting the product from the slice's current priority. In this manner, the presence of I macro blocks in the slice results in a lower priority number for the slice, i.e., a higher effective priority.

Continuing at step 2240, the determination module determines if the current slice is a P slice. If so, the evaluation of the current slice ends and the next slice is considered. If the current slice is not a P slice, the method proceeds to step 2250. At step 2250 the determination module determines a value, z, that is the percentage of macroblocks in the current slice that are B macroblocks. Continuing at step 2260 the determination module adjusts the priority of the current slice by multiplying x and z and adding the product to the slice's current priority. In this manner, the presence of B macro blocks in the slice results in a higher priority number for the slice, i.e., a lower effective priority. In another embodiment, a different value for x can be used in this step than was used in step 2230 in order to provide greater control over relative priorities. As noted, the determination module can repeat this process for each slice in order to determine adjustments to the slices' priorities.

Figure 23A:
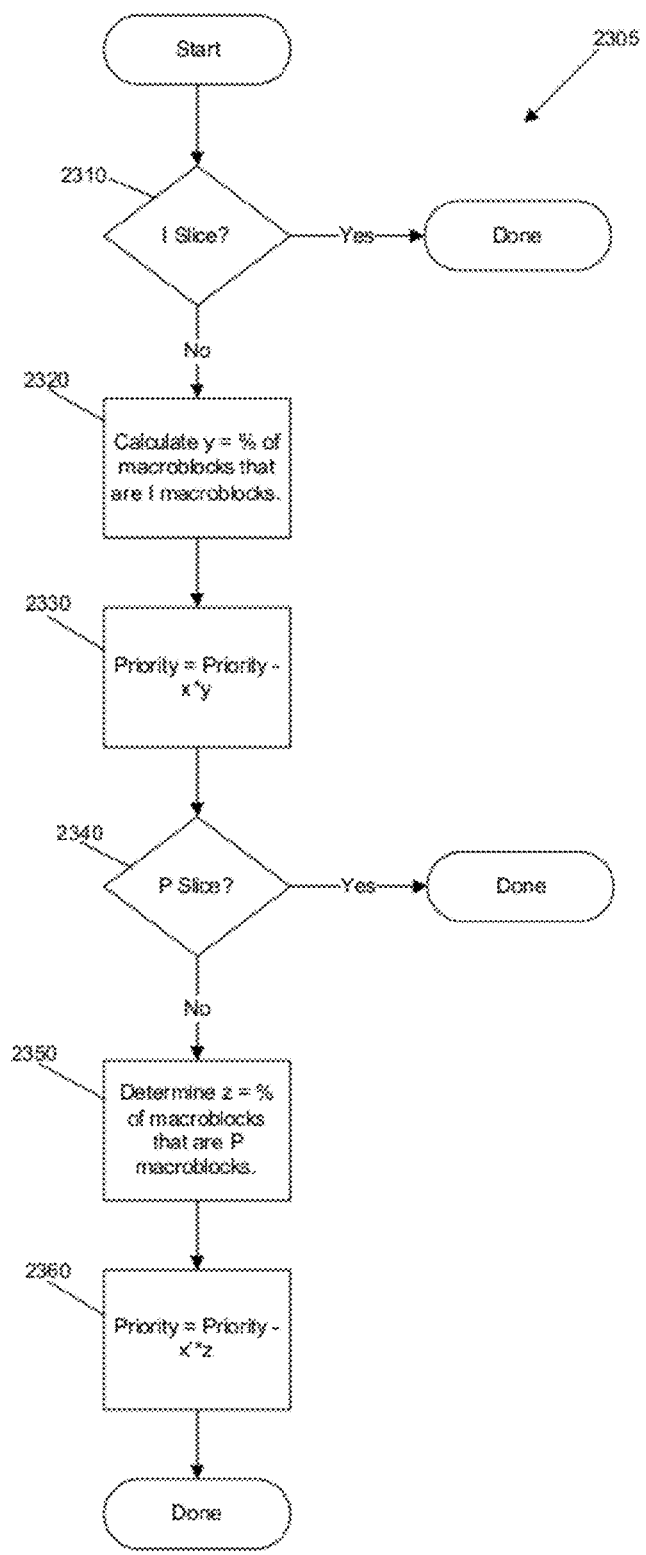
FIG. 23A is a flow diagram of a method for determining priority of a frame according to an embodiment.

FIG. 23A illustrates a method 2305 for modifying the priority of a slice based on the macroblocks in the slice. As described above, the method may be implemented by the determination module 744. In another embodiment, the method may be implemented by another device or module. For the purpose of explanation, the method is described with respect to the determination module. Further, in the present description, a lower priority numbers means a higher priority. One skilled in the art would recognize that this method can also be used for modifying the priority of a frame based on the macroblocks in the frame.

The steps 2310, 2320, 2330, and 2340 are identical to the corresponding steps of method 2205 of FIG. 22. For details of the implementation of these steps refer to description of the corresponding steps with respect to FIG. 22. Continuing at step 2350, the determination module determines a number, z, that represents the percentage of macroblocks in the current slice that are P macroblocks. Continuing at step 2360, the determination module adjusts the priority of the current slice by multiplying x' and z and subtracting the product to the slice's current priority. In this step, x' is calculated similar to x, but allows a different adjustment to be applied for P macroblocks than for I macroblocks in the B slice.

One skilled in the art would appreciate that other adjustments may be made to a slice or frame priority based on the number, percentage, or size of I, P, and B macroblocks.

Some video standards such as H.264-AVC allow redundant slices. Redundant slices carry redundant information in case an original frame is lost or damaged. For the purposes of prioritized discard, redundant slices are assigned a priority level lower than that of B slices since they generally will not be needed by the decoder.

Some video standards such as H.264-AVC allow switching slices that allow easier or faster switching between video streams. SI slices allow switching between completely different streams. In one embodiment, if no stream switching is expected, SI slices are assigned a lower priority than B frames since they generally will not be used by the decoder. However, if switching streams is expected to be common, such as in a multicast or broadcast system streaming multiple video streams simultaneously, policy may dictate the priority of SI slices, and they may be prioritized above B or P slices, but typically not above I slices. Similarly, SP slices allow easier or faster switching between streams of the same video content encoded at different rates or resolutions. Unless such a switch is to be made, SP slices are assigned a lower priority than B slices. However, if such a switch is to be made, SP slices are assigned a priority in the same manner as P slices.

Both SI and SP slices can be used for video playback and management functions under the control of a human viewer.

For example, a person may choose to fast forward or rewind the content currently being viewed. A person may choose to change viewing streams (or 'channels' as they are commonly described in broadcast video) or adjust the displayed resolution and/or screen size once such playback has begun. Depending on the video standard and encoding methods, these viewer requests may involve the use or increased use of SP and/or SI frames. Since user control response time is a critical performance metric for video transport and playback systems, the importance of SP and/or SI frames is substantially higher during such periods of user requests.

In one embodiment, dynamic prioritization for SI and SP frames is used to detect user requests and respond by increasing the frame priority for SI and SP frames. This can be implemented, for example by the control response module 340. The request detection can take several forms. One approach is to monitor uplink control traffic (traveling in the opposite direction of the video traffic) in order to detect specific user requests. Another form establishes a baseline frame rate for SI and SP frames, measured for example using frames per second, and to detect periods when the current SI or SP frame rate exceeds this baseline rate by some predetermined threshold, for example by a factor of 2×. Once a user request has been detected, the priority level for SI or SP frames is raised and can even surpass the priority level currently assigned to I frames. The increased priority level can be maintained for the duration of user request(s) plus some configurable timeout period.

Data Partitioning

In some video standards such as H.264-AVC, the data in a slice may be further arranged into data partitions. For example, a slice in H.264-AVC may be partitioned into three data partitions. Data partition 1 contains the slice header and the header data for each macroblock. Data partition 2 contains the data portion of I or SI macroblocks from the slice. Data partition 3 contains the data portion of P, B, and SP macroblocks from the slice. These data partitions may be transported separately. Data partitions 1 and 2 are both necessary to recover the I macroblocks, so they may be linked together for discard prioritization by the determination module. The priority of partitions 1 and 2 can have their priority adjusted by applying the slice priority adjustment method to data partition 2 and assigning the same priority to data partition 1. Alternatively, since data partition 1 is also necessary for use of data partition 3, data partition 1 can be assigned a priority that is slightly higher than the priority of data partition 2. The priority of data partition 3 can have its priority adjusted by applying the slice priority adjustment method to data partition 3.

Scalable Video Bitstream

H.264 has a Scalable Video Coding (SVC) extension. An SVC encoder can generate a video bitstream with a layered structure. The base layer of an SVC bitstream can be decoded properly by an H.264-compliant decoder. The enhancement layer can improve the video fidelity in different dimensions, such as Signal to Noise Ratio (SNR), spatial resolution or temporal resolution. Temporal scalability is a feature that exists in H.264, however, syntactical features introduced in SVC make it easier to use.

Herein, H.264 normally refers to the part of H.264 specification excluding SVC and MVC (Multi-view Video Coding) extensions, and SVC refers to Scalable Video Coding extension as specified in Annex G of the H.264 specification.

Figure 23B:
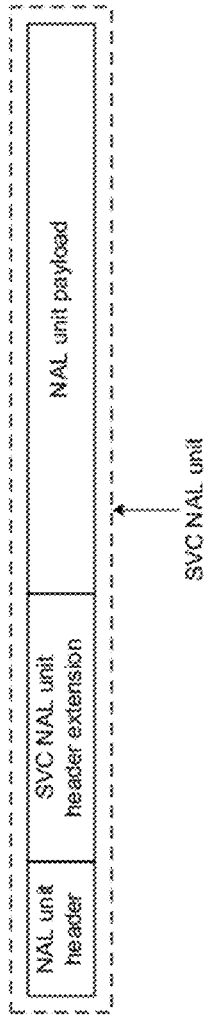
FIG. 23B is a diagram showing the structure of an SVC NAL unit according to an embodiment.

SVC is backward compatible with H.264, so an SVC decoder can decode all NAL units defined in H.264. SVC also introduces new NAL unit types whose values are reserved in H.264. An SVC bitstream may contain three NAL unit types that are not present in H.264. They are Prefix NAL unit (nal_unit_type equal to 14), Subset Sequence Parameter Set (nal_unit_type equal to 15), and Coded Slice Extension NAL unit (nal_unit_type equal to 20). The structure of a Subset Sequence Parameter Set NAL unit is the same as that of any H.264 NAL unit, but the Prefix NAL unit and Coded Slice Extension NAL unit have a different structure as illustrated in FIG. 23B. These two NAL unit types have a 24-bit NAL unit header SVC extension following the 8-bit H.264 NAL unit header.

Figure 23C:
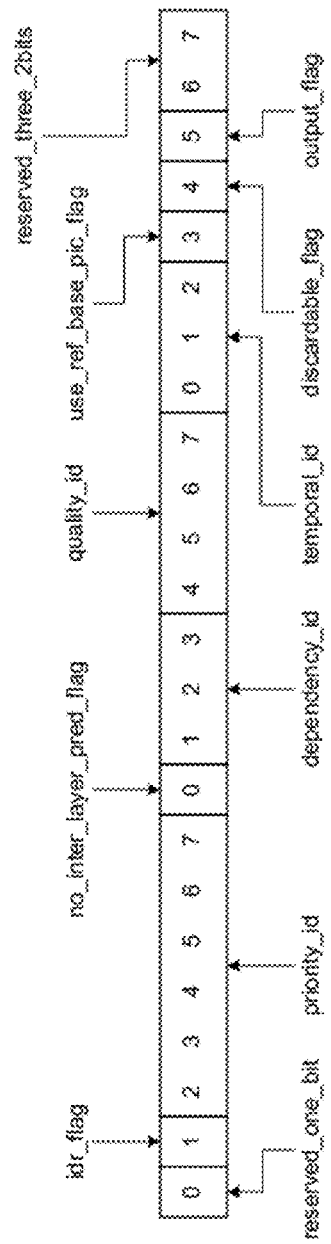
FIG. 23C is a diagram of the structure of NAL unit header SVC extension according to an embodiment.

FIG. 23C shows the structure of the 24-bit NAL unit header SVC extension. Field priority_id is a priority identifier. If it is set, a lower value of priority_id indicates a higher priority. However, its value does not affect the decoding process and may be set by the application if necessary within the constraints defined in the specification. Field dependency_id specifies the dependency identifier of an NAL unit. All NAL units with the same dependency_id belong to the same dependency representation. A dependency representation corresponds to either a spatial scalability layer or a coarse grain SNR (CGS) scalability layer with zero or more medium grain SNR scalability layer. CGS layer is similar to spatial scalability layer, and the layers use the same set of inter-layer prediction coding tools. CGS layer provides SNR enhancement to the video at the same resolution, while spatial scalability layer provides enhancement to the video resolution. Field temporal_id indicates the temporal scalability layer. Field quality_id is assigned to medium grain SNR (MGS) scalability layer. The MGS scalability layer also provides SNR enhancement to the video of the same resolution, but it achieves this by progressively refining the signal fidelity by transmitting additional transform coefficients.

Figure 23D:
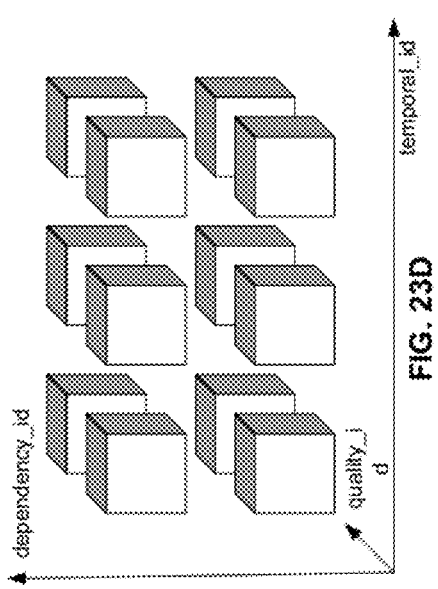
FIG. 23D is a diagram illustrating the structure of an example SVC bitstream.

FIG. 23D illustrates the SVC bitstream hierarchy. In this 3-dimensional diagram, each cube corresponds to all NAL units in the entire bitstream having the same tri-tuple (dependency_id, temporal_id, quality_id). Bitstream parsing and extraction can be performed with the aid of these 3 fields in the SVC extension of the NAL unit header.

Figure 23E:
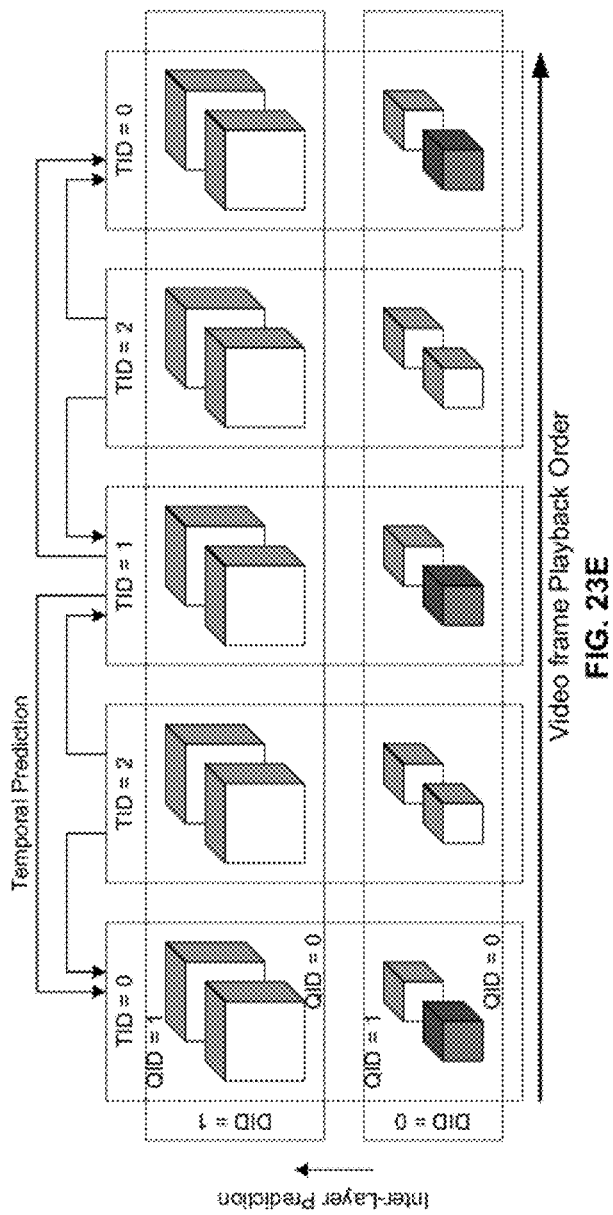
FIG. 23E is a diagram illustrating the structure of an example SVC bitstream for five video frames.

FIG. 23E illustrates the structure of a sample SVC bitstream having 3 temporal levels, 2 dependency levels, and 2 quality levels. The layer having higher dependency_id value is a spatial scalability layer with twice as much resolution in each dimension as that of the base layer which has smaller dependency_id value. In this diagram, each cube corresponds to all the NAL units having the same tri-tuple (dependency_id, temporal_id, quality_id) for one picture. This diagram shows the bitstream of 5 frames. If the user would like to extract the video bitstream with low resolution, it can be achieved by discarding all NAL units with dependency_id larger than 0. Temporal scalable layers can be extracted in a similar fashion except that temporal_id needs to be checked instead of dependency_id. Quality layers can be dropped to have fine control of trade-off between the bit rate and video quality. If the maximum frame rate is 30 frames per second (FPS), and it is desired to extract the bitstream with lower resolution at low quality level, at 15 FPS, the bitstream extractor can simply keep the NAL units with dependency_id equal to 0, quality_id equal to 0, and temporal_id less than 2 and discard all other NAL units. In FIG. 23E, cubes in dark color correspond to the part of the bitstream that is not discarded for this example.

In one embodiment, the control response module 340 uses nal_ref_idc in NAL units in an SVC bitstream in a similar way as in an H.264 bitstream discussed above.

An SVC encoder may set the priority_id field of Prefix NAL unit and Coded Slice Extension NAL unit to indicate the transport priority. In one embodiment, the value of field priority_id can be used in determining the order of discarding the packets. In another embodiment, the value of priority_id can be modified to reflect the transport priority of the packets more accurately, either when it was not set properly or when the priority of a packet is changed because of discarding of related NAL units.

Packet Prioritization Based on Other Video Characteristics

In an embodiment, packets are intelligently discarded based on the priority at least partially determined from the video characteristics, such as the video resolution, video frame rate video data rate, which are in turn determined or estimated from the video stream or signaling messages. The priority of a video packet, which determines how the packets should be discarded, may be adjusted depending on the data rate of the video stream. For example, when congestion just starts, the priority of a packet of a higher data rate stream is adjusted to be lower than that of a packet of a lower data rate. The priority of a packet may also be adjusted by an amount proportional to video frame size, but inversely proportional to frame rate. For example, an individual frame of a video stream operating at 60 frames per second is a smaller percentage of the data over a given time period than an individual frame of a video stream operating at 30 frames per second. Since the loss of a frame in a video stream operating at 60 frames per second would be less noticeable than the loss of a frame in a video stream operating at 30 frames per second, the stream operating at 30 frames per second may be given a higher priority than the stream operating at 60 frames per second.

Once video frames are prioritized, for example, using the techniques described above, a scheduler (e.g., scheduler 278 in FIG. 2B) in a transmitting device such as a wireless base station on the downlink or a subscriber station (e.g., a wireless fixed, portable, or mobile user device) on the uplink may use this information to intelligently discard during periods of congestion or to optimize the admission of calls and services into the system. In these systems, video frames are typically carried in data packets such as Internet Protocol (IP) packets.

Figure 24:
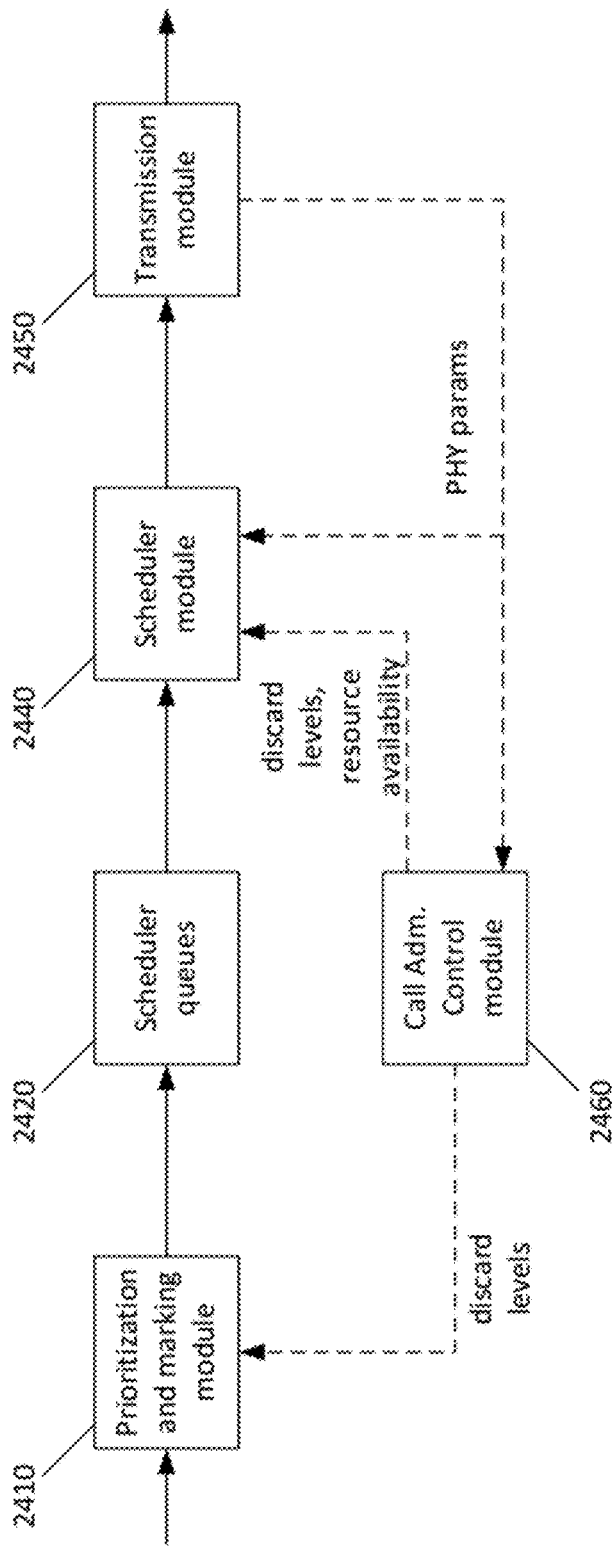
FIG. 24 is a functional block diagram of an embodiment of a system that uses the prioritization to determine which data packets to discard and which to transmit to the end recipient.

FIG. 24 is a functional block diagram of an embodiment of a system that uses prioritization to determine which data packets to discard when the available bandwidth is less than that which is required to transmit all packets to all recipients. The system can degrade certain services by dropping selected packets associated with those services in a manner that minimizes the degradation of the user's experience. In one embodiment, the previously described prioritization scheme for video is used. In one embodiment, the depicted system is implemented in the MAC layer 276 (see FIG. 2B) of a base station or access point or in the scheduler of a subscriber station. However, as noted below, the described functions can be implemented in different devices. In one embodiment the prioritization and marking module ("determination module") 2410, scheduler queues 2420 and the scheduler 2440 implement the functionality described above in connection with the Control Response Module (optimization module) 340 of FIG. 3.

The prioritization and marking module 2410 prioritizes packets for discard. This can use the previously described methods for prioritizing video packets, but one skilled in the art would recognize that different methods may be used for different types of data streams, e.g. video versus voice. The prioritization and marking module 2410 can be located in the transmitting device itself, or may be located in a separate device, such as a DPI device, that marks the frames, for instance appending or inserting bits to the packets carrying the video frames, prior to transferring them to the transmitting device. In one embodiment of the system depicted in FIG. 24, the prioritization and marking module 2410 implements the functionality described in connection with the Priority/Burden Determination Module 744 of FIG. 7A. Similarly, in one embodiment of the system depicted in FIG. 24, the scheduler 2440 implements the functionality described in connection with the Frame/slice Selection Module 746 of FIG. 7A and can therefore also be referred to as a selection module. This prioritization allows for the evaluation of the trade off between dropping packets associated with a type of service (e.g., video or voice) and the corresponding amount of degradation to that service as is more fully described below. After prioritization, the packets are transferred to the scheduler or transmission queues 2420.

Figure 25:
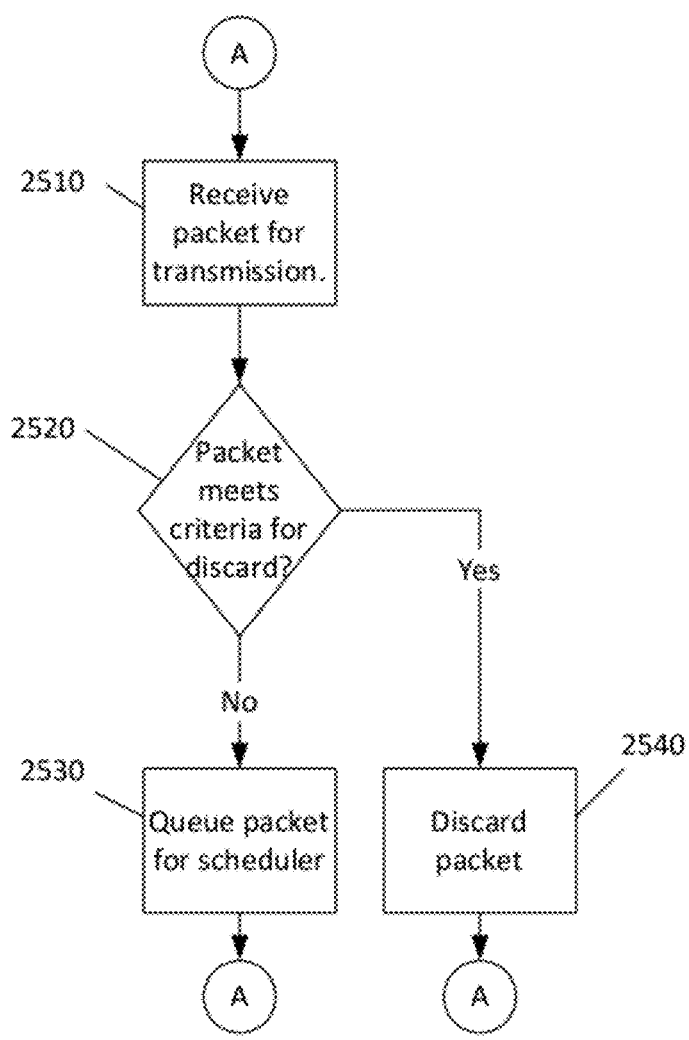
FIG. 25 is a flow diagram of a method of discarding packets as they are being queued by the scheduler according to an embodiment.
Figure 26:
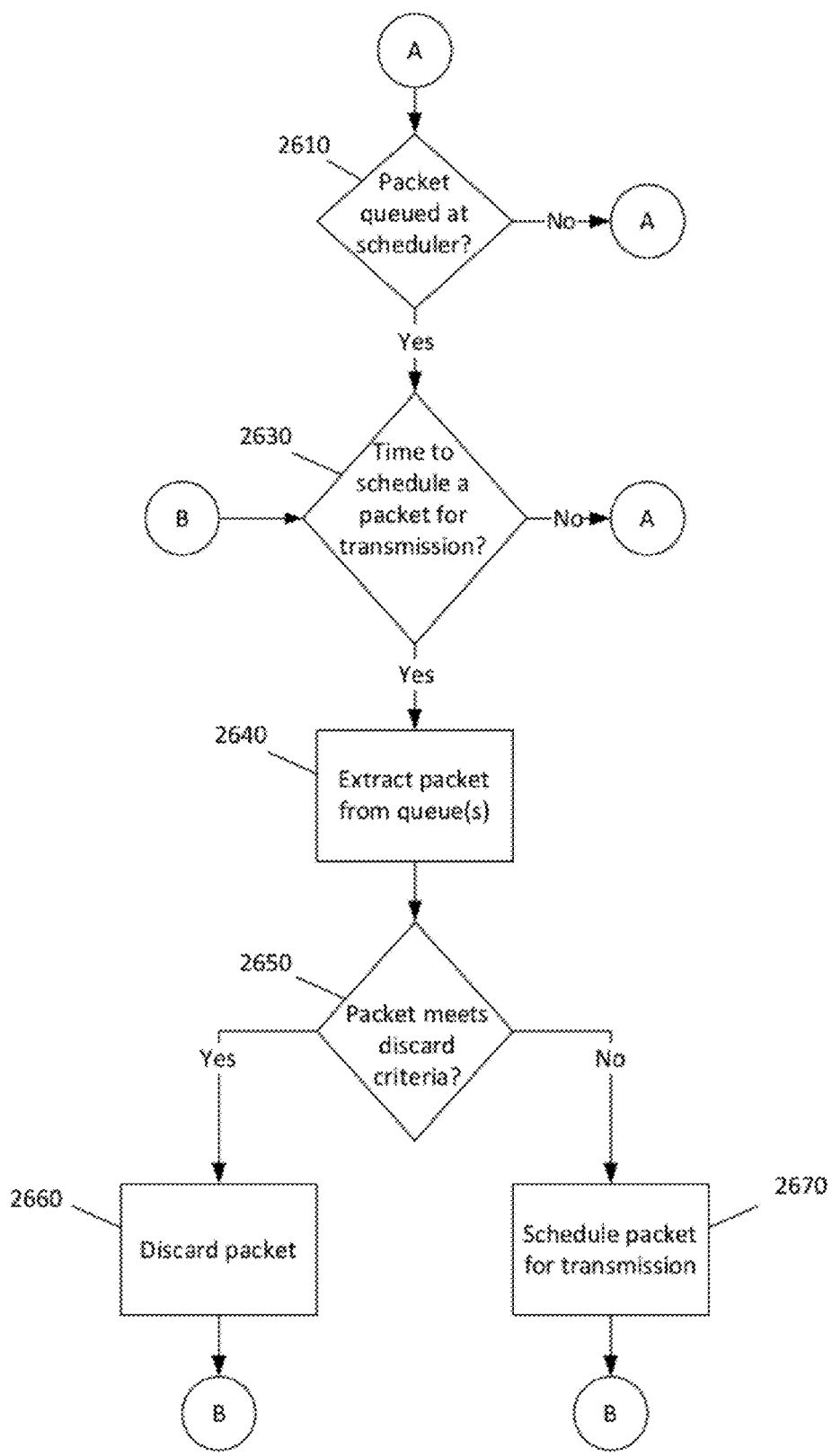
FIG. 26 is a flow diagram of a method of discarding packets after they are placed in the buffers used by the scheduler according to an embodiment.

Discard may occur as the packets (e.g. video frames) are being queued by the prioritization and marking module 2410 as represented by the flow diagram in FIG. 25, or packets may be discarded by the scheduler 2440 after they are placed in the queues 2420 used by the scheduler as represented by the flow diagram in FIG. 26. As shown in FIG. 25, packets received (step 2510) by the prioritization and marking module, for instance from a core network 102 over a backhaul 170, are evaluated by the prioritization and marking module 2410 to determine whether they meet the criteria for discard (step 2520). Alternatively, this function could be implemented in the scheduler. Packets that meet the discard criteria are discarded at a step 2540 and packets that do not meet the discard criteria are placed in the queue(s) 2420 of the scheduler at a step 2530. Flow then returns to step 2510. If packets are discarded as they are queued as shown in FIG. 25, then marking of the packets by the prioritization and marking function 2410 is not required.

As shown in FIG. 26, the discard process can also be performed for packets that are already queued in the queue(s) 2420 of the scheduler. At a step 2610 the scheduler waits for packets to be received in its queue(s). Checking for received packets may be periodic, for instance driven by a 1 millisecond timer, or may be aperiodic, for instance driven by the receipt of a packet to be queued. After packets are in the queue(s), the scheduler waits for a time to schedule a packet for transmission at a step 2630. When it is time for the scheduler to schedule a packet for transmission, one or more packets are extracted from a queue at a step 2640. At a step 2650 the extracted packets are evaluated against the discard criteria. In one embodiment, if the packet is a video packet, the above prioritization scheme may be used with the methods discussed below to determine eligibility for discard. Packets that meet the discard criteria are discarded at a step 2660 and packets that do not meet the discard criteria are scheduled for transmission at a step 2670. Flow then returns to step 2630. Alternatively, after packets are queued, in response to a stimulus such as congestion, an inspection of all packets within one or more queues is made whereby those packets which meet the criteria for discard are removed while leaving those that do not meet the criteria for discard. The packets that are not discarded would be scheduled for transmission at the appropriate time. One skilled in the art would understand that the methods of FIGS. 25 and 26 may be used in combination. That is, some packets can be discarded at queue ingress while other packets are marked or otherwise selected for discard at queue egress.

The decision of which packets to discard is influenced by the discard level which is a function of data rate, quality and system resources as described later. The discard level can be determined by (or based upon information received from) a system state module or function that is aware of the overall system state, for example, the call admission control (CAC) module 2460 shown in FIG. 24. The CAC module resides on a device responsible for determining whether new calls or services should be allowed. This can be a base station or the equivalent, and it can be a device in the core network such as a serving gateway. The CAC functionality may be distributed between multiple network devices. The CAC functionality may make use of PHY parameter information from the transmission module 2450, allowing it to know the conversion from bytes to physical resources for the various services.

The scheduler module 2440 determines which data packets should be transmitted over the communications network, in what order and when. The priority of the packets may be expressed to the scheduler 2440 based upon queue assignment, their order in the queues 2420, by markings created by the prioritization and marking module 2410 or some combination thereof. If packets are discarded as they are removed from the queues (as explained above in connection with FIG. 26), the scheduler 2440 performs this discard based on information from sources including queue assignment and order and marking created by the prioritization and marking module 2410, discard levels and the overall resource availability from a CAC module 2460 or similar module, and PHY parameters from the transmission module 2450. In a preferred embodiment, the scheduler resides on the transmitting device such as a base station or equivalent, but can reside on a device that provides the scheduling information to the transmitting device.

The transmission module 2450 is responsible for transmission of the packets across the physical medium such as radio waves over the air. This module can be implemented in the PHY layer 280 of FIG. 2B or its functionality can be split between the PHY layer and the Modem 272. In addition, the transmission module can make decisions regarding the PHY parameters, such as modulation and coding scheme, necessary for reliable transmission and reception. These parameters affect the capacity of the system and can be provided to other modules that may need them such as a CAC module 2460 and scheduler 2440.

In a wireless system with a physical layer (PHY) that adapts to environmental conditions, the bits per second capability of the system can change as a function of the PHY parameters such as modulation scheme and forward error correction (FEC) coding. The bits per second capability of the system can also be affected by fluctuations in retransmission rates due to packet errors. In a broadband wireless system these fluctuations in the bits per second capacity of the RF link can impact all services on the link, not just those to or from the user device experiencing PHY parameter changes. This can create congestion if the demand for bandwidth exceeds the new bits per second capacity of the system. It can also cause an oversubscription situation. That is to say, it can cause a situation where chronic congestion is likely to occur because the total time-averaged demand of admitted services exceeds the capacity of the RF link.

In systems where services have a single priority for all packets carried on the service, this chronic congestion can lead to some services being terminated. Alternatively, packets from services can be discarded only looking at the relative priorities of the services, not the priorities of the individual packets carried on the service or the impact of discard on different applications.

For video, however, prioritizing the individual packets based on the type of video frame they transport allows the system to intelligently discard packets based upon the relative importance of individual packets. Such a system can also make a quantitative estimate of the quality with which a user will experience the video stream after packet discard. Within the bounds of operator policy, a wireless network can gracefully degrade a video service rather than terminate the service or degrade the service in a manner that provides unacceptable quality as would be the case with random discard.

While optimal encoding of video can produce a highly variable bit stream, the variability is typically bounded. There are two reasons for this. First, many legacy systems, such as cell phone systems, expect a constant bit rate (CBR) over a given period of time. To ensure the decoder does not experience buffer overflow or underflow, a CBR encoder may make an a priori, non-optimal choice for the size of I frames, P frames, and B frames. This then allows buffer sizing at the encoder and decoder based on, for instance, the GOP and the frame dependency relationships it contains. Second, even in systems that implement variable bit rate (VBR) encoders and decoders, the bit rate variability and frame sizes are usually bounded to prevent buffer overflow or underflow.

The I, P, and B frame sizes may vary in a VBR video stream, but can be bounded by maximum values that are similar to the relationship used for CBR video streams. Alternatively, the average size of different frame types in a VBR stream may be calculated based on historical data for the video stream, for instance by using an exponential average or other techniques known to one skilled in the art. This method can also be used for CBR streams for which the entity interested in the bandwidth demand of the stream does not know the frame size bounds. The frame size bound or historical average frame size can then be used to estimate the bandwidth occupied by each type of video frame in a GOP.

Similarly, the GOP may be known a priori or may be detected based on received frames. The determination of the frame sizes and the GOP structure allows calculation of the bandwidth needed for a GOP and, therefore, the bit rate of the video stream. Variations in the bit rate and average frame sizes may be quantified by calculating the variance or standard deviation.

Figure 27:
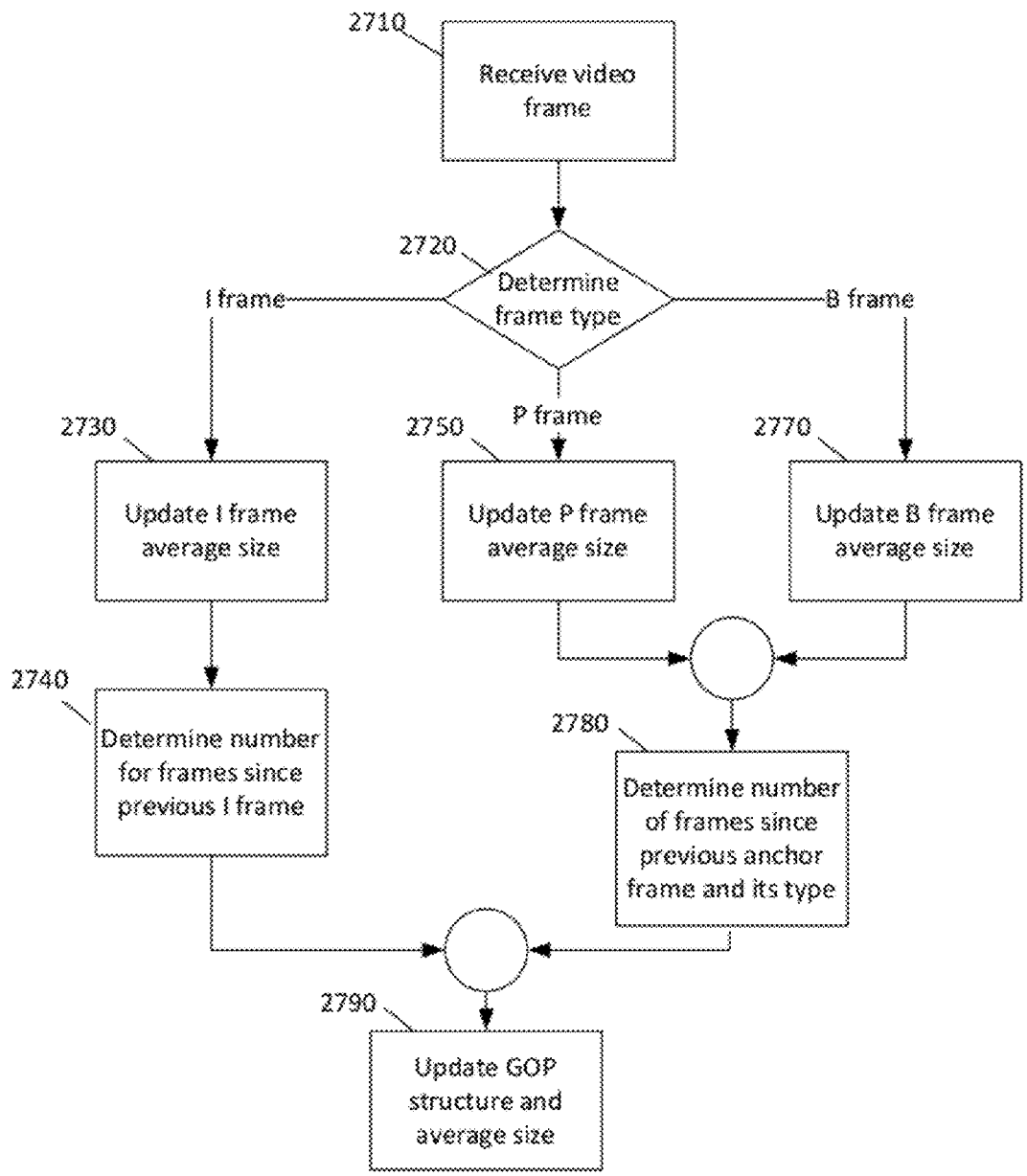
FIG. 27 is a flow diagram of a method for determining the GOP structure and average size according to an embodiment.

FIG. 27 is a flow diagram of a method for determining the GOP structure and average size. In one embodiment, the method is implemented by the prioritization and marking module 2410. At step 2710 a video frame is received. At step 2720, the type of the video frame is determined. This determination may be made by inspecting the header or contents of the video frame or the transport packet in which it is contained. Alternatively, it may be heuristically determined by a method such as comparing its size to the size of other packets in the same stream and to the average frame size for each frame type, once established. If the frame is an I frame, flow proceeds to step 2730 where the average size of I frames for this video stream is updated, for instance using exponential averaging. From step 2730 flow proceeds to step 2740 where the number of frames since the most recent I frame is determined. Flow then proceeds to step 2790 where the data collected and calculated in steps 2730 and 2740 are used to update the knowledge of the GOP structure and the average GOP size. If at step 2720 the video frame is determined to be a P frame, flow proceeds to step 2750 where the average size of P frames for this video stream is updated. Flow then proceeds to step 2780 where both the number of frames since the most recently received anchor frame is determined and the type of anchor frame (I or P frame) is also determined. Flow then proceeds to step 2790 where the data collected and calculated in steps 2750 and 2780 are used to update the knowledge of the GOP structure and the average GOP size. If at step 2720 the video frame is determined to be a B frame, flow proceeds to step 2770 where the average size of B frames for this video stream is updated. Flow then proceeds to step 2780 where both the number of frames since the most recently received anchor frame is determined and the type of anchor frame (I or P frame) is also determined. Flow then proceeds to step 2790 where the data collected and calculated in steps 2770 and 2780 are used to update the knowledge of the GOP structure and the average GOP size.

Figure 28:
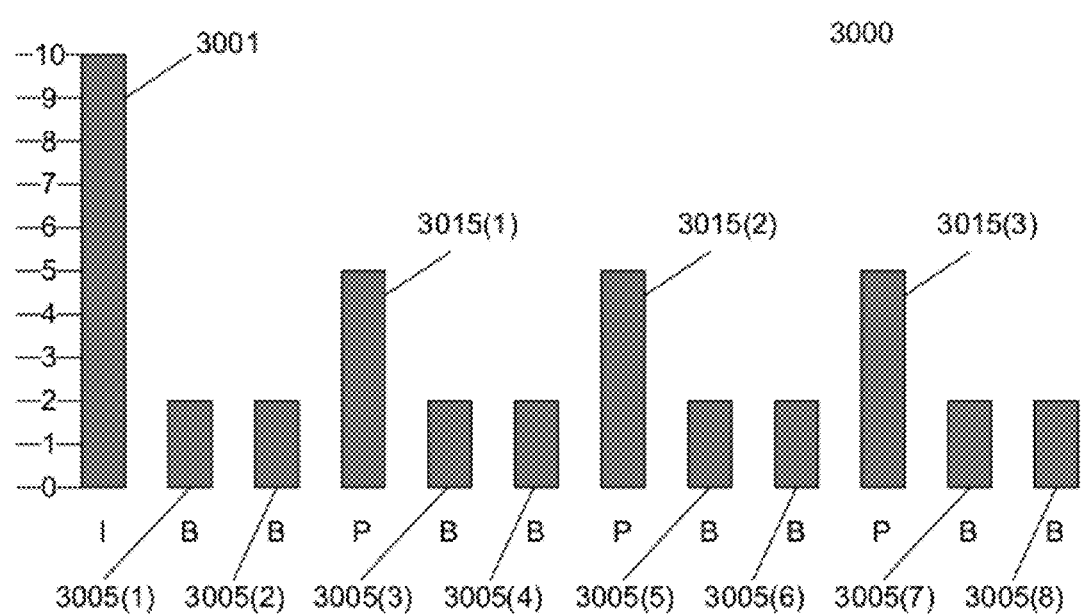
FIG. 28 is a graphical representation of an example of relative frame sizes for an N=12, M=3 GOP.

FIG. 28 is a graphical representation 3000 of an example of relative frame sizes for an N=12, M=3 GOP. In this example, P frames average half the size of I frames and B frames average one fifth the size of I frames. This is an example only and other relative frame sizes can occur depending upon the encoding. The frame size counter on the left of FIG. 28 is in units of 1000 bytes. In this example, I frame 3001 averages 10,000 bytes in size, P frames 3015(1)-3015(3) average 5000 bytes in size and B frames 3005(1)-3005(8) average 2000 bytes in size. This gives an average of 41,000 bytes per GOP. Since the GOP in this example is 12 frames in duration and a typical frame rate for display on a mobile phone is 25 frames per second, this gives an example average data rate of approximately 85,417 bytes per second or 683 kilobits per second. This is only an example, and one skilled in the art would know that other data rates are both possible and common. When an event happens that causes there to be only 79,000 bytes per second of bandwidth available for this service, older systems would terminate the service, unacceptably delay the video frames, or randomly drop frames. All of these scenarios are likely to result in unacceptable quality for the user.

Figure 29:
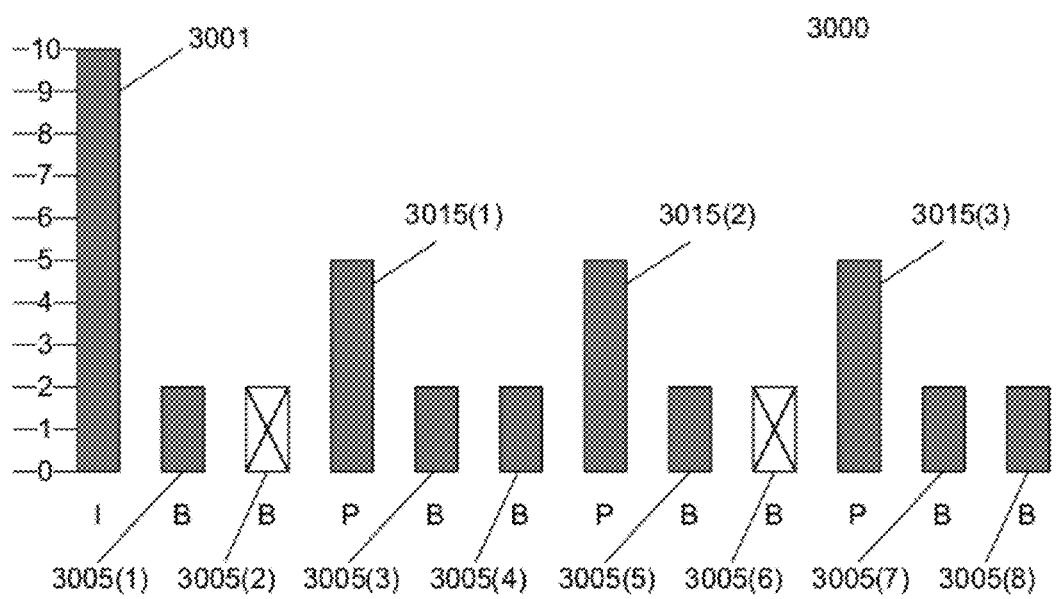
FIG. 29 is a graphical representation of the example of relative frame sizes for an N=12, M=3 GOP from FIG. 28 with selected frames discarded.

However, if the frames are prioritized within the video service, they can be intelligently discarded, based on a combination of burden or a similar metric and a desire for uniform spacing of discards amongst frames of the same priority. To minimize the impact to the quality of the video stream, it is desirable to discard the minimum number of frames necessary to fit within the new bandwidth constraint. By discarding 25% of B frames in a uniform fashion demand can be lowered to 77,083 bytes per second, fitting in the available bandwidth in the example. To further reduce the probability of degradation of the video quality, the B frames can be discarded uniformly thus allowing, for instance, interpolation systems in the video decoder to minimize recovery artifacts. In this example, B frames 3005(2) and 3005(6) are discarded as shown in FIG. 29. Alternatively, discarding B frames 3005(4) and 3005(8) gives a similarly uniform distribution of discards. These choices can be predetermined using the previously described prioritization method.

Quality of video streams may be measured using video mean opinion scores (VMOS) or alternative quantitative methods, examples of which have been described above. The degradation in VMOS attributable to discard policies can be predicted based on measurements which can be refined over time.

Figure 30:
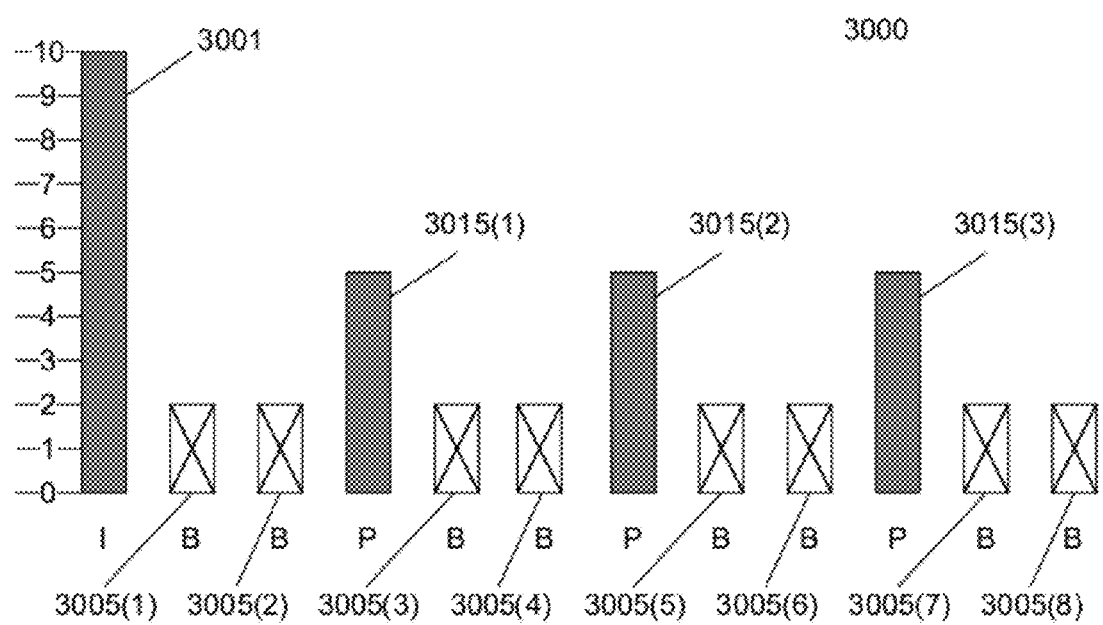
FIG. 30 is a graphical representation of the example of relative frame sizes for an N=12, M=3 GOP from FIG. 28 with further selected frames discarded.
Figure 31:
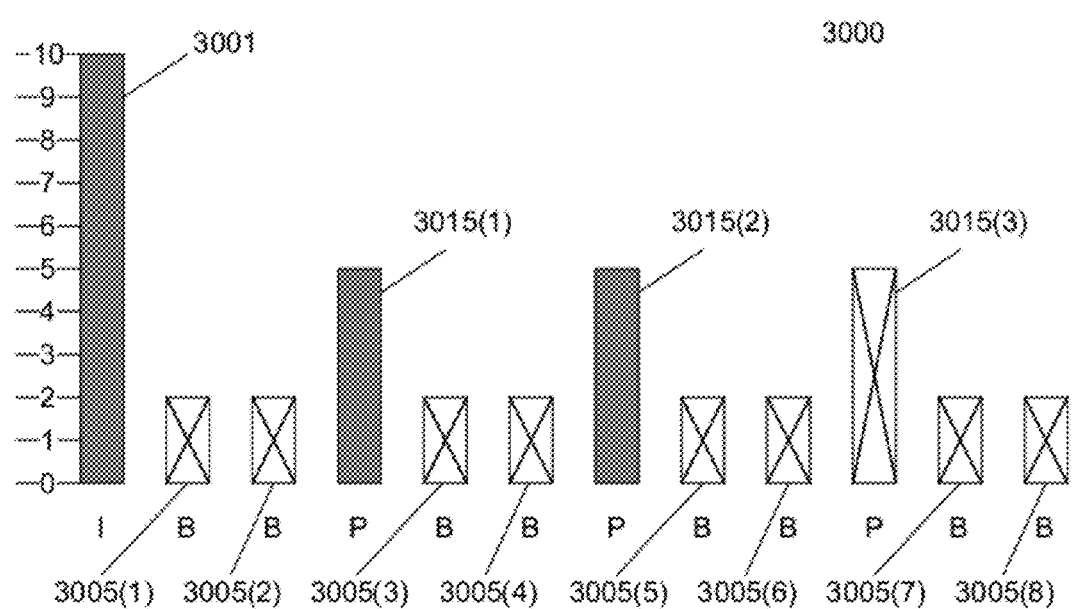
FIG. 31 is a graphical representation of the example of relative frame sizes for an N=12, M=3 GOP from FIG. 28 with still further selected frames discarded.

As seen in FIG. 30 and FIG. 31, using the prioritization of packets within a video stream as discussed earlier, progressively more frames can be discarded if needed, while minimizing the degradation of the video quality. How much the quality is allowed to be degraded before a service is terminated can be controlled by operator policy or user preferences.

The table below demonstrates that the foregoing techniques provides as many possible bandwidth demand or discard levels as there are frames in a GOP. Additionally, other finer grain discard levels may be achieved by discarding portions of frames, such as slices, or by using inter-GOP techniques such as discarding one B frame every other GOP or discarding two B frames every 3 GOP.

| Discard level | Average bytes of data in GOP | % reduction in bandwidth demand | VMOS degradation |
|---|---|---|---|
| no discard | 41,000 | 0% | none |
| discard 1 B frame | 39,000 | 4.9% | Δ1 |
| discard 2 B frames | 37,000 | 9.8% | Δ2 |
| discard 3 B frames | 35,000 | 14.6% | Δ3 |
| discard 4 B frames | 33,000 | 19.5% | Δ4 |
| discard 5 B frames | 31,000 | 24.4% | Δ5 |
| discard 6 B frames | 29,000 | 29.3% | Δ6 |
| discard 7 B frames | 27,000 | 34.1% | Δ7 |
| discard 8 B frames | 25,000 | 39.0% | Δ8 |
| discard 1 P frame (and all 8 B frames) | 20,000 | 51.2% | Δ9 |
| discard 2 P frames | 15,000 | 63.4% | Δ10 |
| discard 3 P frames | 10,000 | 75.6% | Δ11 |

Each of these discard levels degrades or decreases the quality of the video service. But, just as encoder and decoder performance can be quantified by metrics such as VMOS, the degradation due to intelligent discard can be quantified using these metrics. This can be accomplished by measuring VMOS degradation due to discard as described herein for a number of common GOP, and deriving metrics for use in estimating VMOS degradation.

In this way, a video service can have an associated set of bandwidth requirements each paired with a quality metric. Operator policy or user preferences can indicate the quality metric value where the service is considered unacceptable and is terminated rather than further degraded. For instance, a policy can be adopted that loss of more than every other B frame is unacceptable. In this example, shown in FIG. 29, four B frames per GOP could be discarded accounting for a 19.5% reduction in bandwidth demand. If a further reduction in bandwidth were necessary, the service would be terminated or suspended or alternatively, a different service may be terminated, suspended or have discard applied to reduce its demand, reducing overall system demand. The discard could be performed as previously shown in FIG. 25 or FIG. 26.

A similar set of relationships between bandwidth demand reduction and video quality degradation can be created for various discard scenarios for H.264 SVC video streams. For instance, each level of dependency_id, quality_id, and temporal_id for a particular video stream may be correlated to an estimated reduction in bandwidth required for the stream and also may be correlated to an estimated reduction in video quality. Similarly, each combination of levels for the set of parameters may be correlated to an estimated reduction in bandwidth coupled with a corresponding reduction in video quality. By creating these associations between bandwidth reduction and the resultant degradation, intelligent discard mechanisms can optimally discard a quantity of data necessary to mitigate or avoid congestion while keeping the video quality degradation within the constraints of policy.

One skilled in the art would understand that the quality metric value may be applied differently to individual video streams, video stream applications (e.g. Youtube versus Netflix), users, user SLA categories, classes of service, scheduler queues or combinations thereof. For instance, if an MPEG-4 and an H.264 SVC stream are simultaneously present, the application of the quality metric would be based in part on the characteristics of video technology. In an embodiment, packets in an MPEG-4 stream may be prioritized higher than packets in an H.264 SVC stream since video quality of the MPEG-4 steam is impacted more by discards than the H.264 SVC stream. Similar prioritizations may be used with other video encodings so that packets in video streams encoded using protocols with higher immunity to discards are more likely to be discarded.

In an embodiment, the discard criteria used in step 2520 of FIG. 25 may be based upon queue depth. If a queue serving a video stream reaches x % of its capacity, B frames may start being discarded until the queue falls below x % full. In some embodiments, hysteresis is provided by including a delta between the levels at which discarding begins and ends. Additionally, when the queue is x'% full, where x'>x, P frames may be discarded. Since queue depth increase can be a sign of overall link congestion or a sign of an individual stream desiring more bandwidth than it is allowed, for instance under the users service agreement, this technique allows intelligent discard to be applied to an individual stream regardless of whether the wireless link as a whole is congested. One skilled in the art would realize that the methods described in previous paragraphs that match rate reductions with quality degradations could also be applied in response to SLA limits rather than overall link congestion.

In another embodiment, when a queue is x % full, y % of B frames are discarded, preferably uniformly. When the queue is x'% full, where x'>x, y'% of B frames, where y'>y, may be discarded, preferably uniformly. This can be extended to additional levels of buffer fullness that may trigger discard of a percentage of P frames. This method may be applied to other types of data streams, as well. As previously described, there is value in uniformly discarding a percentage of VoIP frames. This intelligent discard of VoIP packets may be performed using buffer depth as the discard criteria. As an alternative to discarding in step 2520 of FIG. 25 as packets are placed in the queues, the discarding could be implemented in step 2650 of FIG. 26 as packets are extracted from the queues, which would cause the queue to drain more rapidly.

Figure 32:
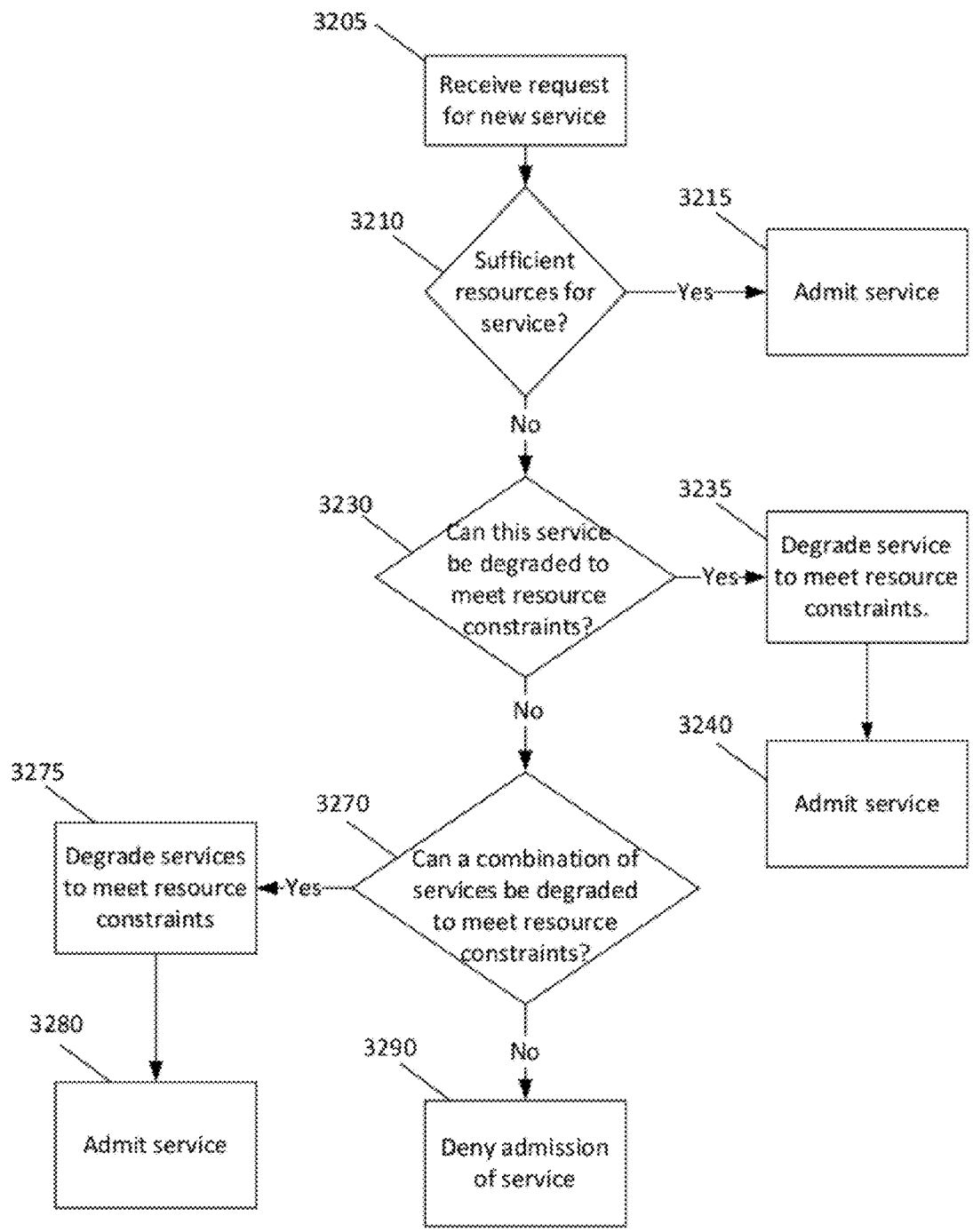
FIG. 32 is a flow diagram of a method for call admission according to an embodiment.

The relationship between rates and VMOS can be used for admitting new services. For instance, if a user wanted to initiate a video stream that, as in the previous example, required 85,417 bytes per second of bandwidth, but only 79,000 bytes per second were available, the system would know that the service could still be admitted, but at the degraded quality provided by discarding 2 B frames per GOP to achieve 77,083 bytes per second of bandwidth demand. If that degradation was acceptable to operator policy and user preferences, the service would be admitted rather than denied. Alternately, if a policy allowed a different service to have its bandwidth demand reduced, the system could apply a bandwidth reduction to that other service freeing up bandwidth to allow the new service to be admitted. This call admission control (CAC) method is represented in the flow diagram depicted in FIG. 32 and in one embodiment is implemented by the Call Admission Control module 2460 shown in FIG. 24.

At step 3205, a request for a new service is received by the system. This request may come from a user device requesting a service or may come from an external entity initiating the service, for example a video conferencing call between a room full of people and a participant on a mobile handset can be initiated by the user of the wireless handset or may be initiated using the landline attached to the conference room video conferencing equipment. At step 3210, a check is performed to determine if there are sufficient system resources to admit the service. Call admission control is commonly used in many communications systems and one skilled in the art would understand the standard methods for the particular communication system they were concerned with. For example, U.S. Pat. No. 7,529,204 (hereby incorporated by reference) describes call admission control for use in communication systems that employ adaptive modulation. If there are sufficient resources, the service is admitted in step 3215. If at step 3210 it is determined that there are insufficient resources to admit the service, then flow continues to step 3230 where a check is performed to see if the service can be admitted in a degraded form. If the service can be admitted in a degraded form, flow proceeds to step 3235 where the service is degraded, for example a discard level is chosen such that 25% of B frames will be discarded, after which the service is admitted in step 3240. If step 3230 determines that the service cannot be sufficiently degraded, within the bounds of policy, to fit within the resource constraints, flow proceeds to step 3270 where a determination is made whether a different service or some combination of services, possibly including the new service, can be sufficiently degraded to allow the new service to be admitted. If at step 3270 it is determined that a collection of services can be sufficiently degraded, flow proceeds to step 3275 where the identified services are degraded and the new service is admitted in step 3280. If at step 3270 it is determined that no collection of services can be sufficiently degraded, flow proceeds to step 3290 where the new service request is rejected.

In alternative embodiments, the set of steps 3230, 3235, and 3240 may be removed from the method. Conversely, steps 3270, 3275 and 3280 may be removed from the method.

This described CAC method may run in a wireless base station or the equivalent in another network, such as the head end in a DOCSIS cable modem system. Alternatively, it may run on a management entity in the core network, such as a serving gateway.

While the above CAC method is described in the context of video services that may be degraded using the methods of this invention, one skilled in the art would understand that it applies to all services that may be degraded, such as a data service that has a minimum guaranteed rate but is allowed to burst to a maximum data rate or a Voice over IP (VoIP) service for which policy would allow a certain percentage, for example 5%, of the packets to be lost or discarded.

Figure 33:
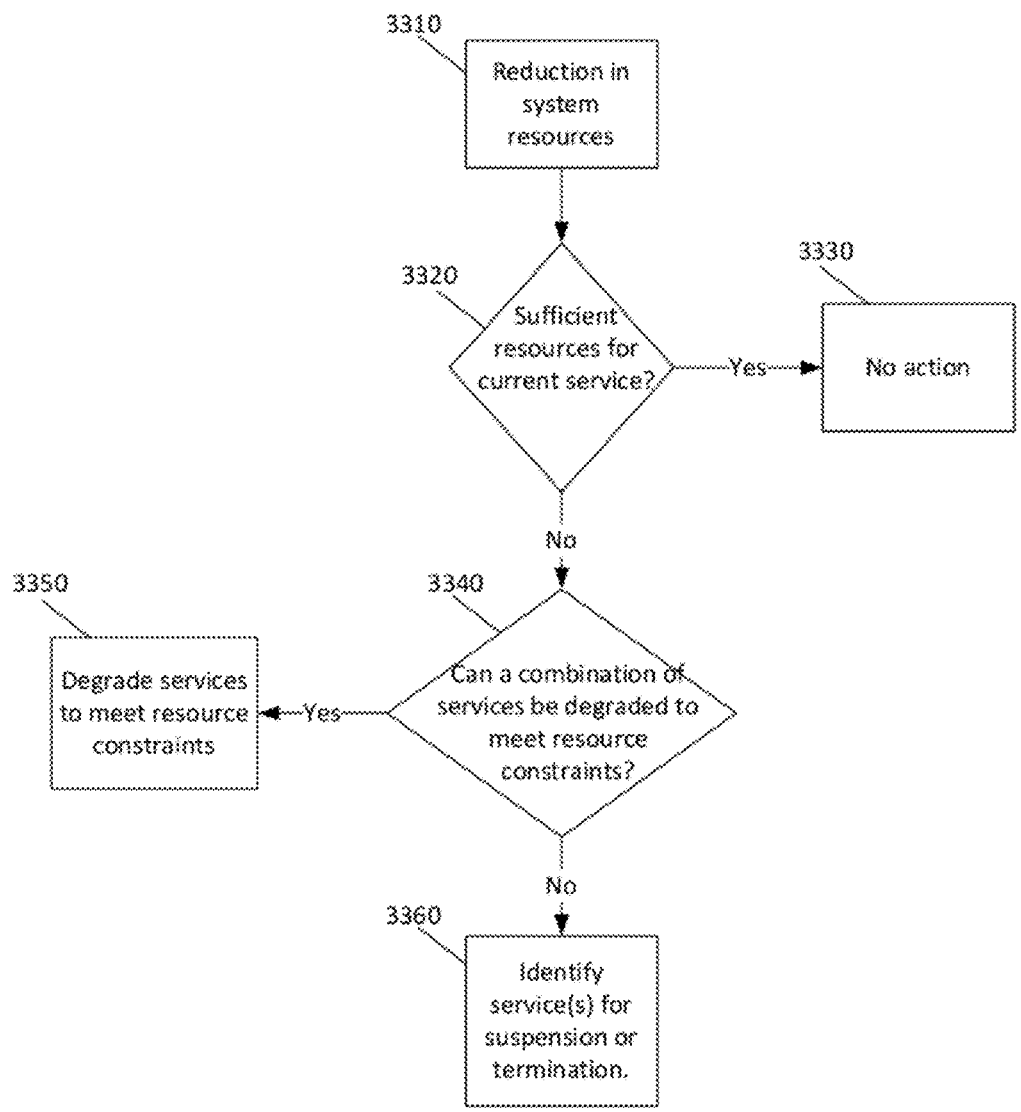
FIG. 33 is a flow diagram of a method that allows graceful degradation of services in resource reduction situations according to an embodiment.

In addition to setting degradation levels for services to allow a new service to be admitted, a similar approach may be used in system such as WiMAX and LTE where system resources may vary dynamically due to changing environmental conditions and their effect on the choice of PHY parameters such as modulation, coding, and MIMO mode. FIG. 33 is a flow diagram of a method that allows graceful degradation of services in resource reduction situations, avoiding random discard or excessive suspension or termination of services. In one embodiment, the method is implemented by the call admission control module 2460 shown in FIG. 2B.

At step 3310 an event occurs which reduces system resources and the reduction in system resources is recognized. This could be, for example, caused by a mobile handset moving to the edge of a cell and requiring more robust coding and modulation. Flow proceeds to step 3320 where a check is performed to determine if there are still sufficient resources for the current services in their current states. If at step 3320 it is determined that there are sufficient resources for the current services, flow proceeds to step 3330 where no action is taken. If step 3320 determines that there are no longer sufficient resources for the current services in their current states, flow proceeds to step 3340. At step 3340 a check is performed to determine if some combination of services may be degraded to allow continued operation of services within the new resource constraints. This determination can proceed as discussed in connection with step 540 of FIG. 5. In general, the system determines whether some combination of services may be degraded through the selective dropping of packets associated with some combination of services which imposes the overall minimum service degradation according to predetermined criteria and which does not exceed a maximum allowable degradation to any service. If there is a combination of services which may be degraded to allow continued operation of services, flow proceeds to step 3350 where those services are degraded. If there does not exist a combination of services which may be degraded to allow continued operation of services, flow proceeds to step 3360 where services are identified for suspension or termination. The choice of which services to suspend or terminate may be based upon many factors including amount of resources freed, priority of service, contracted service level agreement, and link quality to the user of the service. Step 3360 may optionally combine degradation of some services with suspension or termination of others to minimize the number of services that require suspension or termination.

One skilled in the art would understand that degradation of services can be relaxed and suspended services can be resumed after an increase in system resources such as when a mobile handset leaves the cell or changes to a more efficient modulation and coding scheme.

For VBR services, the preservation of quality and the efficient use of resources can be even greater. For VBR streams, the upper limit of frame size may be bounded, but the average frame size may be smaller. During some GOPs, many frames may be smaller. This can allow for some frames being retained that would necessarily be discarded in the CBR case. To allow for this, the preferred embodiment uses egress discard as was described with reference to FIG. 26. In the method shown in FIG. 26, step 2650 is augmented to allow a packet to be scheduled for transmission at step 2670 even if at step 2650 it is determined that the packet meets the criteria for discard if there are sufficient system resources. Such an event would occur, for instance, if the average size of GOP, in bytes, was sufficiently less than average at the time, creating less demand than expected when the discard level for the service was set.

Statistical multiplexing of VBR video streams in a broadband system further allows one stream to benefit when another stream has a temporarily low bandwidth demand. For instance, in one embodiment the augmented step 2650 of FIG. 26 allows a video frame that step 2650 determined meets the criteria for discard from one service to be scheduled for transmission by step 2670 if a different service or the combination of all services has used fewer system resources that was expected when the discard level was determined.

The priority scheme described can be used with schedulers that make last minute decisions to maximize frame retention or with schedulers that that proactively discard in anticipation of congestion. The priority scheme can also be used with a scheduler that uses proactive discard to get close to the target bandwidth consumption for a service yet stays above the target bandwidth consumption, and then performs last minute discard to maximize statistical multiplexing gains.

In another embodiment, priorities are used to apply unequal aging to packets from the same stream. For instance, the LTE standard requires packets to be aged out, i.e., discarded, after being queued for a certain, queue-specific time without being transmitted. With uneven aging, lower priority packets are allowed to stay queued a shorter time before being discarded than higher priority packets. During congestion, this approach causes lower priority packets to be discarded in preference to higher priority packets due to a shorter allowable time in queue. Such a scheme can associate a different allowable time in queue for each of a plurality of priority (or burden) levels. In this way, if bandwidth is available in time, packets are transmitted, but if congestion occurs then packets are discarded in priority order, allowing statistical multiplexing gains when there is a multiplicity of streams to which the mechanism is applied. It also allows a more instantaneous reaction to congestion.

One skilled in the art will appreciate that the prioritization described above may be used for purposes other than intelligent discard, for instance enhancing Call Admission Control by providing additional information regarding how much data from a video service may be discarded while maintaining a required service quality, thus allowing more services to be admitted than would be possible without this information.

As described above, the packet discard and frame analysis described above may be performed by communication devices or systems including, but not limited to, an access point, base station, macro cell, Pico cell, enterprise Femtocell, residential Femtocell, relay, small form factor base station, subscriber station, core network system or other device. In some embodiments, these communication devices may comprise one or more processors, transceivers, antenna systems, and computer-readable memories or media that operate to accomplish the functionality described herein.

Those of skill will appreciate that the various illustrative logical blocks, modules, units, and algorithm and method steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs").

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A base station for managing transmission of packets over a communication link in a communication network, the base station comprising:
    a transmission module configured to transmit packets over the communication link;
    a video quality measurement module configured to obtain packets containing frames of a video stream from a backhaul port, the frames comprising multiple frame groups, and to determine estimated contributions of a discard of all frames of each frame group to at least one video quality measurement of the video stream;
    a priority assignment module configured to receive the estimated contributions of each frame group to the at least one quality measurement and to assign a priority to each of the packets based at least on the frame groups associated with the frames in the respective packet; and
    a selection module configured to select at least one of the packets for discard utilizing the assigned priorities and to supply the packets not selected for discard to the transmission module for transmission over the communication link,
    wherein the video quality measurement module is further configured to receive indications of the packets that are selected for discard and to include the indications in determining the contributions of the frames comprising packets that have not yet been selected for discard to the at least one video quality measurement, and
    wherein the priority assignment module is further configured to utilize the contributions of frames comprising packets that have not yet been selected for discard to the at least one video quality measurement in assigning the priorities to the packets not yet selected for discard.

2. The base station of claim 1, wherein the video quality measurement module is further configured to calculate the at least one video quality measurement of the video stream.

3. The base station of claim 1, wherein the priority assignment module is further configured to assign the priority to each packet so that a packet having a frame associated with a frame group that has a greater contribution to the at least one video quality measurement of the video stream is assigned a higher priority.

4. The base station of claim 1, wherein some of the packets contain frames that are formatted according to H.264 and that include nal_ref_idc fields,
    wherein the video quality measurement module is further configured to set values in the nal_ref_idc fields based at least in part on the contributions of the frames to the at least one video quality measurement of the video stream, and
    wherein the priority assignment module is further configured to utilize the values in the nal_ref_idc fields in assigning the priorities to the packets.

5. The base station of claim 1, wherein some of the packets contain frames that are formatted according to H.264 and that include nal_ref_idc fields,
    wherein the video quality measurement module is further configured to modify values in some of the nal_ref_idc fields based at least in part on the indications of the packets selected for discard, and
    wherein the priority assignment module is further configured to utilize the values in the nal_ref_idc fields in assigning the priorities to the packets.

6. A method for operating a base station for managing transmission of packets over a communication link in a communication network, the method comprising:
    obtaining packets for transmission from a backhaul port, at least one of the packets being associated with a video stream;
    determining a priority for each of the packets, wherein the determination the priority for the at least one of the packets associated with a video stream is based at least in part on an estimated contribution of discarding the at least one of the packets to a video quality measurement of the associated video stream;
    determining whether a reduced bandwidth should be used to transmit the packets;
    selecting, based at least in part on the determined priority for each of the packets, at least one of the packets for discard when it is determined that a reduced bandwidth should be used to transmit the packets; and
    providing the packets not selected for discard for transmission over the communication link,
    wherein the estimated contribution of discarding the at least one of the packets for packets that have not yet been selected for discard to the video quality measurement of the associated video stream is determined at least in part on an indication of the at least one of the packets selected for discard, and
    wherein determining the priority for the packets that have not yet been selected for discard includes utilizing the estimated contribution of discarding the at least one of the packets for packets that have not yet been selected for discard to the video quality measurement of the associated video stream.

7. The method of claim 6, wherein determining the priority for each of the packets comprises calculating a contribution to an objective video quality measurement for each of the packets associated with a video stream.

8. The method of claim 6, wherein some of the packets contain frames that are formatted according to H.264 and that include nal_ref_idc fields, and wherein determining a priority for each of the packets includes utilizing values in the nal_ref_idc fields for the packets containing frames that are formatted according to H.264.

9. The method of claim 6, wherein some of the packets contain frames that are formatted according to H.264-Scalable Video Coding (SVC) and that include priority_id fields, and wherein determining a priority for each of the packets includes utilizing values in the priority_id fields for the packets containing frames that are formatted according to SVC.

10. The method of claim 6, wherein some of the packets contain frames that are formatted according to H.264-Scalable Video Coding (SVC), and wherein determining the priority of the packets formatted according to SVC utilizes values from at least one of dependency_id fields, quality_id fields, or temporal_id fields.

11. The method of claim 6, wherein the determined priority for each of the at least one of the packets associated with a video stream is based at least in part on a characteristic selected from the group consisting of a video resolution, a video frame rate, and a video data rate.

12. The method of claim 6, wherein each video stream is encoded according to at least one of multiple protocols and the determined priority of each packet is based at least in part on the protocol of the video stream associated with the packet.

13. The method of claim 7, wherein the objective video quality measurement is a full-reference video quality measurement.

14. The method of claim 7, wherein the objective video quality measurement is a reduced-reference video quality measurement.

15. The method of claim 7, wherein the objective video quality measurement is a no-reference video quality measurement.

16. The method of claim 8, wherein determining the priority for each of the packets containing frames that are formatted according to H.264 further includes assigning a lower priority when the associated nal_ref_idc field has a zero value.

17. The method of claim 8, further comprising modifying values in the nal_ref_idc fields in frames of other packets that are related to frames in the packets selected for discard.

18. The method of claim 8, wherein determining the priority for each of the packets associated with a video stream includes analyzing whether the packets include frames having video information that depends on video information in frames of other packets, and further comprising setting values in the nal_ref_idc fields based at least in part on whether the packets include frames having video information that depends on the video information in frames of other packets.

19. The method of claim 9, further comprising modifying values in the priority_id fields in frames of other packets that are related to frames in the packets selected for discard.

20. The method of claim 12, wherein the multiple protocols include MPEG-4 and H.264-Scalable Video Coding (SVC) and wherein a packet that is associated with a video stream formatted according to the MPEG-4 protocol has a higher priority than a packet that is associated with a video stream formatted according to the SVC protocol.

21. A method for operating a base station for managing transmission of packets over a communication link in a communication network, the method comprising:
obtaining packets from a backhaul port for transmission;
assigning a priority for each of the packets, wherein the assigned priority for each packet is determined based at least in part on an estimated contribution of discarding the packet to a service quality measurement for the service associated with the packet;
placing each packet into one of multiple queues before transmitting the packets;
determining whether a reduced bandwidth should be used to transmit the packets;
selecting, based at least in part on the assigned priority of each packet, at least one of the packets for discard when it is determined that a reduced bandwidth should be used to transmit the packets; and
providing the packets not selected for discard for transmission over the communication link,
wherein the estimated contribution of discarding the packet for packets that have not yet been selected for discard to the service quality measurement is determined at least in part on an indication of the at least one of the packets selected for discard, and
wherein assigning the priority for packets that have not yet been selected for discard includes utilizing the estimated contribution of discarding the packet for packets that have not yet been selected for discard to the service quality measurement.

22. The method of claim 21, wherein determining whether a reduced bandwidth should be used to transmit the packets is based at least in part on a pending number of packets in each of the queues.

23. The method of claim 21, wherein at least one of the packets in one of the queues are selected for discard when the one of the queues is more than a predetermined percentage full.

24. The method of claim 21, wherein packets are selected for discard when the packets have been present in one of the queues for a predetermined time.

25. The method of claim 23, wherein the number of the at least one of the packets selected for discard increases when the percentage full of the one of the queues is more than a second predetermined percentage full.

26. The method of claim 24, wherein the packets selected for discard when the packets have been present in one of the queues for the predetermined time are removed from the one of the queues.

27. The method of claim 26, wherein the predetermined time is greater for a packet that is assigned a higher priority.

* * * * *